(12) United States Patent
Shum et al.

(10) Patent No.: US 11,423,898 B2
(45) Date of Patent: Aug. 23, 2022

(54) VOICE IDENTIFICATION IN DIGITAL ASSISTANT SYSTEMS

(71) Applicant: Apple Inc., Cupertino, CA (US)

(72) Inventors: Stephen H. Shum, Walnut Creek, CA (US); Corey J. Peterson, Cupertino, CA (US); Sachin S. Kajarekar, Sunnyvale, CA (US); Benjamin S. Phipps, San Francisco, CA (US); Erik Marchi, Santa Clara, CA (US); Jessica Peck, San Jose, CA (US); Anumita Biswas, Santa Clara, CA (US); Chaitanya Mannemala, Fremont, CA (US)

(73) Assignee: Apple Inc., Cupertino, CA (US)

( * ) Notice: Subject to any disclaimer, the term of this patent is extended or adjusted under 35 U.S.C. 154(b) by 134 days.

(21) Appl. No.: 16/815,984

(22) Filed: Mar. 11, 2020

(65) Prior Publication Data

US 2020/0380980 A1 Dec. 3, 2020

Related U.S. Application Data

(60) Provisional application No. 62/855,778, filed on May 31, 2019.

(51) Int. Cl.
*G10L 15/22* (2006.01)
*G10L 15/18* (2013.01)
(Continued)

(52) U.S. Cl.
CPC .............. *G10L 15/22* (2013.01); *G06F 3/167* (2013.01); *G06F 21/32* (2013.01); *G10L 15/18* (2013.01);
(Continued)

(58) Field of Classification Search
CPC ......... G10L 15/22; G10L 15/00; G10L 15/06; G10L 15/065; G10L 15/07; G10L 15/08;
(Continued)

(56) References Cited

U.S. PATENT DOCUMENTS 7,487,089 B2 2/2009 Mozer
7,617,094 B2 11/2009 Aoki et al.
(Continued)

FOREIGN PATENT DOCUMENTS

CN 102402985 A 4/2012
CN 103426428 A 12/2013
(Continued)

OTHER PUBLICATIONS

"Link your voice to your devices with Voice Match", Google Assistant Help, Available online at: <https://support.google.com/assistant/answer/9071681?co=GENIE.Platform%3DAndroid&hl=en>, Retrieved on Jul. 1, 2020, 2 pages.
(Continued)

*Primary Examiner* — Qi Han
(74) *Attorney, Agent, or Firm* — Dentons US LLP

(57) ABSTRACT

Systems and processes for operating an intelligent automated assistant are provided. An example method includes receiving, from one or more external electronic devices, a plurality of speaker profiles for a plurality of users; receiving a natural language speech input; determining, based on comparing the natural language speech input to the plurality of speaker profiles: a first likelihood that the natural language speech input corresponds to a first user of the plurality of users; and a second likelihood that the natural language speech input corresponds to a second user of the plurality of users; determining whether the first likelihood and the second likelihood are within a first threshold; and in accordance with determining that the first likelihood and the
(Continued)

second likelihood are not within the first threshold: providing a response to the natural language speech input, the response being personalized for the first user.

50 Claims, 42 Drawing Sheets

(51) Int. Cl.
  *G10L 17/14* (2013.01)
  *G06F 3/16* (2006.01)
  *G06F 21/32* (2013.01)
  *G10L 17/00* (2013.01)

(52) U.S. Cl.
  CPC .............. *G10L 17/00* (2013.01); *G10L 17/14* (2013.01); *G10L 2015/223* (2013.01); *G10L 2015/225* (2013.01); *G10L 2015/227* (2013.01)

(58) Field of Classification Search
  CPC ....... G10L 15/14; G10L 15/18; G10L 15/183; G10L 15/26; G10L 2015/0631–0638; G10L 2015/223–228; G10L 17/06; G10L 17/00; G10L 17/08; G10L 17/12; G10L 17/14; G10L 17/20; G10L 17/22; G10L 17/26
  USPC ..... 704/246, 249, 250, 257, 270.1, 273, 270
  See application file for complete search history.

(56) References Cited

U.S. PATENT DOCUMENTS

| | | | |
|---|---|---|---|
| 8,010,367 | B2 | 8/2011 | Muschett et al. |
| 8,050,919 | B2 | 11/2011 | Das |
| 8,160,877 | B1 | 4/2012 | Nucci et al. |
| 8,224,649 | B2 | 7/2012 | Chaudhari et al. |
| 8,645,137 | B2 | 2/2014 | Bellegarda et al. |
| 8,831,949 | B1 | 9/2014 | Smith et al. |
| 9,218,809 | B2 | 12/2015 | Bellegard et al. |
| 9,262,612 | B2 | 2/2016 | Cheyer |
| 9,633,660 | B2 | 4/2017 | Haughay |
| 10,032,451 | B1 | 7/2018 | Mamkina et al. |
| 10,102,359 | B2 | 10/2018 | Cheyer |
| 10,186,266 | B1 | 1/2019 | Devaraj et al. |
| 10,255,922 | B1 | 4/2019 | Sharifi et al. |
| 10,490,195 | B1 * | 11/2019 | Krishnamoorthy ..... G10L 13/00 |
| 2002/0034280 | A1 | 3/2002 | Infosino |
| 2008/0077409 | A1 | 3/2008 | Sannerud |
| 2009/0271609 | A1 * | 10/2009 | Baskey ............. H04M 1/72448 713/100 |
| 2009/0306979 | A1 | 12/2009 | Jaiswal et al. |
| 2010/0106975 | A1 | 4/2010 | Vandervort |
| 2010/0131273 | A1 | 5/2010 | Aley-Raz et al. |
| 2011/0047605 | A1 | 2/2011 | Sontag et al. |
| 2011/0112838 | A1 | 5/2011 | Adibi |
| 2011/0288866 | A1 | 11/2011 | Rasmussen |
| 2011/0302645 | A1 | 12/2011 | Headley |
| 2012/0245941 | A1 | 9/2012 | Cheyer |
| 2012/0265528 | A1 | 10/2012 | Gruber et al. |
| 2012/0284027 | A1 | 11/2012 | Mallett et al. |
| 2012/0296649 | A1 | 11/2012 | Bansal et al. |
| 2012/0303369 | A1 | 11/2012 | Brush et al. |
| 2013/0173268 | A1 | 7/2013 | Weng et al. |
| 2013/0225128 | A1 | 8/2013 | Gomar |
| 2014/0222678 | A1 | 8/2014 | Sheets et al. |
| 2014/0244257 | A1 | 8/2014 | Colibro et al. |
| 2014/0249817 | A1 | 9/2014 | Hart et al. |
| 2014/0278413 | A1 | 9/2014 | Pitschel et al. |
| 2014/0343943 | A1 | 11/2014 | Al-telmissani |
| 2014/0365885 | A1 | 12/2014 | Carson et al. |
| 2015/0067822 | A1 | 3/2015 | Randall |
| 2015/0081295 | A1 | 3/2015 | Yun et al. |
| 2015/0142438 | A1 | 5/2015 | Dai et al. |
| 2015/0161370 | A1 | 6/2015 | North et al. |
| 2015/0301796 | A1 | 10/2015 | Visser et al. |
| 2015/0310888 | A1 | 10/2015 | Chen |
| 2016/0093304 | A1 | 3/2016 | Kim et al. |
| 2016/0119338 | A1 | 4/2016 | Cheyer |
| 2016/0283185 | A1 | 9/2016 | Mclaren et al. |
| 2017/0092278 | A1 | 3/2017 | Evermann et al. |
| 2017/0242657 | A1 | 8/2017 | Jarvis et al. |
| 2017/0351487 | A1 | 12/2017 | Aviles-casco vaquero et al. |
| 2018/0007060 | A1 | 1/2018 | Leblang et al. |
| 2018/0293988 | A1 | 10/2018 | Huang et al. |
| 2018/0330737 | A1 | 11/2018 | Paulik et al. |
| 2019/0012449 | A1 | 1/2019 | Cheyer |
| 2019/0027152 | A1 | 1/2019 | Huang et al. |
| 2019/0035405 | A1 | 1/2019 | Haughay |
| 2019/0051309 | A1 | 2/2019 | Kim et al. |
| 2019/0080698 | A1 | 3/2019 | Miller |
| 2019/0156830 | A1 | 5/2019 | Devaraj et al. |
| 2019/0272831 | A1 | 9/2019 | Kajarekar |
| 2021/0012776 | A1 | 1/2021 | Peterson et al. |

FOREIGN PATENT DOCUMENTS

| | | |
|---|---|---|
| DE | 202016008226 U1 | 5/2017 |
| JP | 2009-177440 A | 8/2009 |
| TW | 201142823 A1 | 12/2011 |
| WO | 2010/075623 A1 | 7/2010 |
| WO | 2012/129231 A1 | 9/2012 |
| WO | 2018/009397 A1 | 1/2018 |
| WO | 2019/067930 A1 | 4/2019 |

OTHER PUBLICATIONS

Derrick Amanda, "How to Set Up Google Home for Multiple Users", Lifewire, Available online at: <https://www.lifewire.com/set-up-google-home-multiple-users-4685691>, Jun. 8, 2020, 9 pages.
PC Mag, "How to Voice Train Your Google Home Smart Speaker", Available online at: <https://in.pcmag.com/google-home/126520/how-to-voice-train-your-google-home-smart-speaker>, Oct. 25, 2018, 12 pages.
International Search Report and Written Opinion received for PCT Patent Application No. PCT/US2020/026444, dated Nov. 11, 2020, 18 pages.
Invitation to Pay Additional Fees received for PCT Patent Application No. PCT/US2020/026444, mailed on Aug. 3, 2020, 10 pages.
Office Action received for Danish Patent Application No. PA201970510, dated May 12, 2021, 4 pages.
Qian et al., "Single-channel Multi-talker Speech Recognition With Permutation Invariant Training", Speech Communication, Issue 104, 2018, pp. 1-11.
Settle et al., "End-to-End Multi-Speaker Speech Recognition", Proc. ICASSP, Apr. 2018, 6 pages.
"Speaker Recognition", Wikipedia, The Free Encyclopedia, Nov. 2, 2010, pp. 1-4.
Yu et al., "Recognizing Multi-talker Speech with Permutation Invariant Training", Interspeech 2017, Aug. 20-24, 2017, pp. 2456-2460.
Office Action received for Danish Patent Application No. PA201970510, dated Aug. 5, 2020, 3 pages.
Office Action received for Danish Patent Application No. PA201970511, dated Oct. 15, 2020, 4 pages.
Office Action received for Danish Patent Application No. PA201970510, dated Feb. 28, 2020, 3 pages.
Search Report and Opinion received for Danish Patent Application No. PA201970510, dated Oct. 29, 2019, 9 pages.
Search Report and Opinion received for Danish Patent Application No. PA201970511, dated Dec. 12, 2019, 10 pages.
International Preliminary Report on Patentability received for PCT Patent Application No. PCT/US2020/026444, dated Dec. 9, 2021, 13 pages.
Office Action received for Danish Patent Application No. PA201970511, dated Nov. 12, 2021, 6 pages.
Tech With Brett, "Google Home Multiple Users Setup", Available online at: https://www.youtube.com/watch?v=BQOAbRUeFRo&t=257s, Jun. 29, 2017, 4 pages.

(56) References Cited

OTHER PUBLICATIONS

Non Final Office Action received for U.S. Appl. No. 17/032,676, dated May 3, 2022, 15 pages.

* cited by examiner

# VOICE IDENTIFICATION IN DIGITAL ASSISTANT SYSTEMS

This Application claims priority to U.S. Provisional Patent Application No. 62/855,778, entitled "VOICE IDENTIFICATION IN DIGITAL ASSISTANT SYSTEMS," filed on May 31, 2019, the content of which is hereby incorporated by reference in its entirety.

FIELD

This relates generally to intelligent automated assistants and, more specifically, to identifying users of intelligent automated assistants in a multi-user or shared environment.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

A digital assistant can operate on a device shared by many users. Accordingly, it can be desirable for the digital assistant to identify a current user of the device in a multi-user or shared environment.

SUMMARY

Example methods are disclosed herein. An example method includes, at an electronic device having one or more processors and memory: receiving, from one or more external electronic devices, a plurality of speaker profiles for a plurality of users; receiving a natural language speech input; determining, based on comparing the natural language speech input to the plurality of speaker profiles: a first likelihood that the natural language speech input corresponds to a first user of the plurality of users; and a second likelihood that the natural language speech input corresponds to a second user of the plurality of users, the second likelihood being less than the first likelihood; determining whether the first likelihood and the second likelihood are within a first threshold; and in accordance with determining that the first likelihood and the second likelihood are not within the first threshold: providing a response to the natural language speech input, the response being personalized for the first user.

Example non-transitory computer-readable media are disclosed herein. An example non-transitory computer-readable storage medium stores one or more programs. The one or more programs comprise instructions, which when executed by one or more processors of an electronic device, cause the electronic device to: receive, from one or more external electronic devices, a plurality of speaker profiles for a plurality of users; receive a natural language speech input; determine, based on comparing the natural language speech input to the plurality of speaker profiles: a first likelihood that the natural language speech input corresponds to a first user of the plurality of users; and a second likelihood that the natural language speech input corresponds to a second user of the plurality of users, the second likelihood being less than the first likelihood; determine whether the first likelihood and the second likelihood are within a first threshold; and in accordance with determining that the first likelihood and the second likelihood are not within the first threshold: provide a response to the natural language speech input, the response being personalized for the first user.

Example electronic devices are disclosed herein. An example electronic device comprises one or more processors; a memory; and one or more programs, where the one or more programs are stored in the memory and configured to be executed by the one or more processors, the one or more programs including instructions for: receiving, from one or more external electronic devices, a plurality of speaker profiles for a plurality of users; receiving a natural language speech input; determining, based on comparing the natural language speech input to the plurality of speaker profiles: a first likelihood that the natural language speech input corresponds to a first user of the plurality of users; and a second likelihood that the natural language speech input corresponds to a second user of the plurality of users, the second likelihood being less than the first likelihood; determining whether the first likelihood and the second likelihood are within a first threshold; and in accordance with determining that the first likelihood and the second likelihood are not within the first threshold: providing a response to the natural language speech input, the response being personalized for the first user.

An example electronic device comprises means for: receiving, from one or more external electronic devices, a plurality of speaker profiles for a plurality of users; receiving a natural language speech input; determining, based on comparing the natural language speech input to the plurality of speaker profiles: a first likelihood that the natural language speech input corresponds to a first user of the plurality of users; and a second likelihood that the natural language speech input corresponds to a second user of the plurality of users, the second likelihood being less than the first likelihood; determining whether the first likelihood and the second likelihood are within a first threshold; and in accordance with determining that the first likelihood and the second likelihood are not within the first threshold: providing a response to the natural language speech input, the response being personalized for the first user.

Example methods are disclosed herein. An example method includes, at an electronic device having one or more processors and memory: receiving a spoken media request; determining whether a user, of a plurality of registered users, corresponds to the spoken media request; in accordance with determining that a first user of the plurality of registered users corresponds to the spoken media request: providing a first response to the spoken media request, the first response being personalized for the first user; and in accordance with determining that no user of the plurality of registered users corresponds to the spoken media request: determining whether the spoken media request includes a personal media request; in accordance with determining that the spoken media request includes a personal media request: obtaining an identification of a user who provided the spoken media request; and in accordance with obtaining the identification: providing a second response to the spoken media request, the second response being personalized for the user who provided the spoken media request.

Example non-transitory computer-readable media are disclosed herein. An example non-transitory computer-readable storage medium stores one or more programs. The one or more programs comprise instructions, which when executed by one or more processors of an electronic device, cause the electronic device to: receive a spoken media request; determine whether a user, of a plurality of registered users, corresponds to the spoken media request; in accordance with determining that a first user of the plurality of registered users corresponds to the spoken media request: provide a first response to the spoken media request, the first response being personalized for the first user; and in accordance with determining that no user of the plurality of registered users corresponds to the spoken media request: determine whether the spoken media request includes a personal media request; in accordance with determining that the spoken media request includes a personal media request: obtain an identification of a user who provided the spoken media request; and in accordance with obtaining the identification: provide a second response to the spoken media request, the second response being personalized for the user who provided the spoken media request.

Example electronic devices are disclosed herein. An example electronic device comprises one or more processors; a memory; and one or more programs, where the one or more programs are stored in the memory and configured to be executed by the one or more processors, the one or more programs including instructions for: receiving a spoken media request; determining whether a user, of a plurality of registered users, corresponds to the spoken media request; in accordance with determining that a first user of the plurality of registered users corresponds to the spoken media request: providing a first response to the spoken media request, the first response being personalized for the first user; and in accordance with determining that no user of the plurality of registered users corresponds to the spoken media request: determining whether the spoken media request includes a personal media request; in accordance with determining that the spoken media request includes a personal media request: obtaining an identification of a user who provided the spoken media request; and in accordance with obtaining the identification: providing a second response to the spoken media request, the second response being personalized for the user who provided the spoken media request.

An example electronic device comprises means for: receiving a spoken media request; determining whether a user, of a plurality of registered users, corresponds to the spoken media request; in accordance with determining that a first user of the plurality of registered users corresponds to the spoken media request: providing a first response to the spoken media request, the first response being personalized for the first user; and in accordance with determining that no user of the plurality of registered users corresponds to the spoken media request: determining whether the spoken media request includes a personal media request; in accordance with determining that the spoken media request includes a personal media request: obtaining an identification of a user who provided the spoken media request; and in accordance with obtaining the identification: providing a second response to the spoken media request, the second response being personalized for the user who provided the spoken media request.

Determining, based on comparing the natural language speech input to the plurality of speaker profiles: a first likelihood that the natural language speech input corresponds to a first user of the plurality of users; and a second likelihood that the natural language speech input corresponds to a second user of the plurality of users, the second likelihood being less than the first likelihood allows a digital assistant to identify a current user. For example, if the digital assistant operates on a device shared by many users, the digital assistant can identify a current user of the device (e.g., based on his or her speech input) and provide a response (and/or perform a task) personalized for the identified user (e.g., reading the user's text messages, adding an event to the user's calendar, calling one of the user's contacts, and the like). Thus, electronic devices shared by many users may accurately identify a current user and provide personal content for the identified user. In this manner, the user device interface may be made more efficient (e.g., by efficiently providing responses relevant to an identified user, by increasing the amount of information shared electronic devices can provide, by preventing disclosure of personal information to unidentified users), which additionally reduces power usage and improves battery life of the device by enabling the user to use the device more quickly and efficiently.

In accordance with determining that the first likelihood and the second likelihood are not within the first threshold: providing a response to the natural language speech input, the response being personalized for the first user allows a digital assistant to determine whether a current user can be distinguished from other users before providing a response personalized for the current user. This may enhance the security of the user's personal information by preventing other users from accessing such information. Additionally, determining whether a current user can be distinguished from other users of an electronic device improves the accuracy of user identification (e.g., especially when the electronic device is shared by many users). As discussed, accurately identifying a current user and providing personal content for the identified user makes the user device interface more efficient (e.g., by efficiently providing responses relevant to an identified user, by increasing the amount of information shared electronic devices can provide, by preventing disclosure of personal information to unidentified users), which additionally reduces power usage and improves battery life of the device by enabling the user to use the device more quickly and efficiently.

In accordance with determining that a first user of the plurality of registered users corresponds to the spoken media request: providing a first response to the spoken media request, the first response being personalized for the first user allows electronic devices shared by many users to provide or modify media content for an identified user. Thus, responses to spoken media requests may be advantageously personalized for the identified user (e.g., playing music from the identified user's account, adding media content to the identified user's account, providing the news from the identified user's preferred content provider, and the like). Further, unauthorized modification or provision of users' media content may be prevented (e.g., by preventing one user of a shared device from modifying the media content of another user of the device). In this manner, the user device interface may be made more efficient (e.g., by providing media content relevant to an identified user, by preventing other users from modifying a user's media content, by allowing a shared device to efficiently and securely manage the media content of multiple users), which additionally reduces power usage and improves battery life of the device by enabling the user to use the device more quickly and efficiently.

In accordance with determining that the spoken media request includes a personal media request: obtaining an identification of a user who provided the spoken media request; and in accordance with obtaining the identification: providing a second response to the spoken media request, the second response being personalized for the user who provided the spoken media request allows electronic devices shared by many users to securely provide or modify media content for an identified user. For example, if the device is insufficiently confident that a spoken request corresponds to a user, the device can use other techniques (e.g., other than using the spoken request) to identify the user before providing a personalized response. This can increase the security of the user's media content by preventing other users from accessing and/or modifying the user's media content. Further, obtaining an identification of a user who provided the spoken media request in accordance with determining that the spoken media request includes a personal media request may allow other techniques to identify a user to be performed only when appropriate (e.g., when the spoken media request includes a personal request). For example, a device may not undesirably perform other techniques to identify a user (e.g., initiate a dialogue with the user) for spoken media requests not requiring user identification e.g., "play music"). As another example, a device may perform other techniques to identify a user when user identification is desirable (e.g., for requests such as "add this to my playlist," "play my personal music"). Thus, devices may efficiently and securely provide or modify media content without prolonging user device interaction. In this manner, the user device interface may be made more efficient (e.g., by providing media content relevant to an identified user, by preventing other users from modifying a user's media content, by allowing a shared device to efficiently and securely manage the media content of multiple users), which additionally reduces power usage and improves battery life of the device by enabling the user to use the device more quickly and efficiently.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

This generally relates to identifying users of digital assistants based on their respective voices. Once a user is identified, a digital assistant can provide a response personalized for the user.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
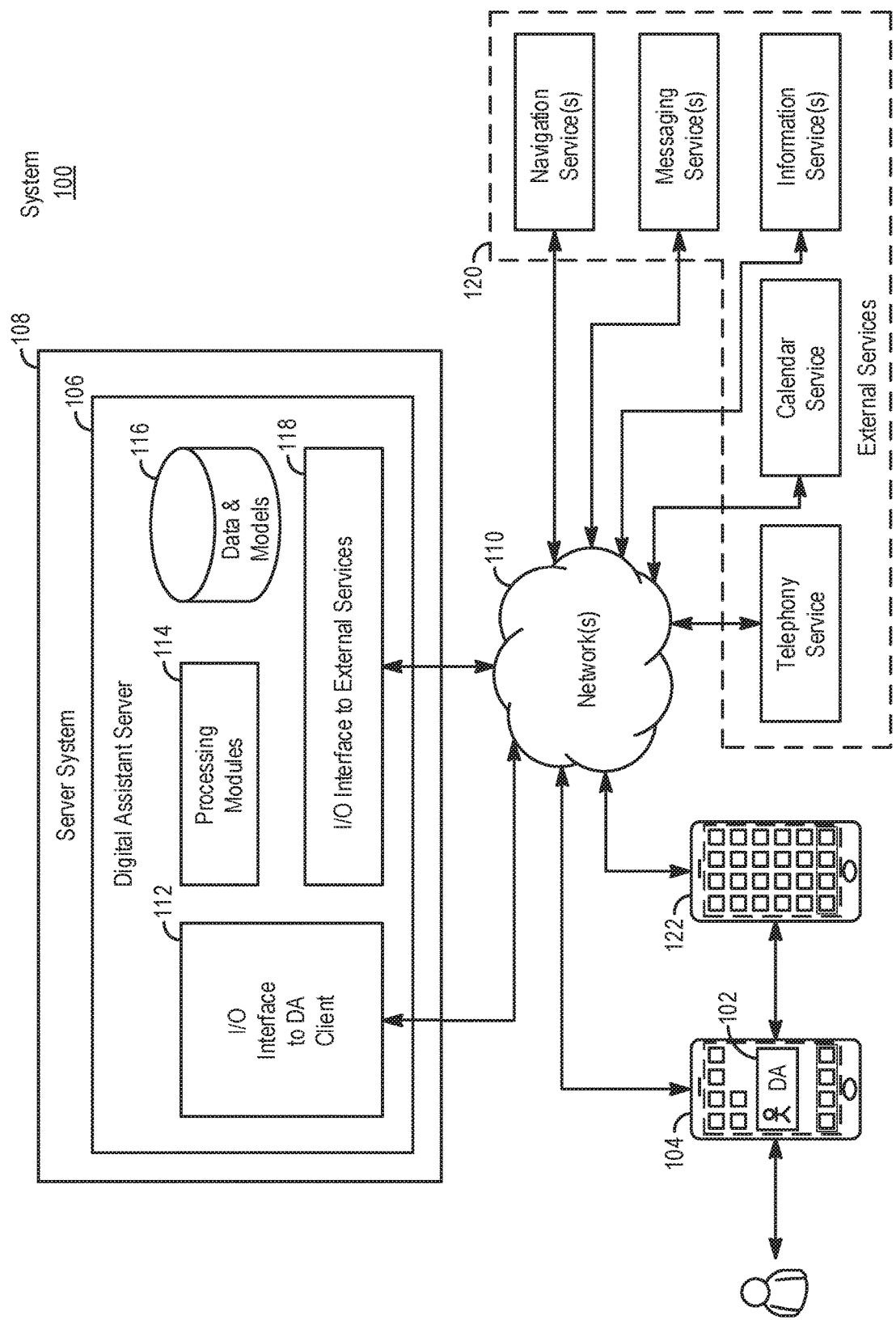
FIG. 1 is a block diagram illustrating a system and environment for implementing a digital assistant, according to various examples.

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, Calif. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VOW), WiMAX, or any other suitable communication protocol.

Server system 108 is implemented on one or more stand-alone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
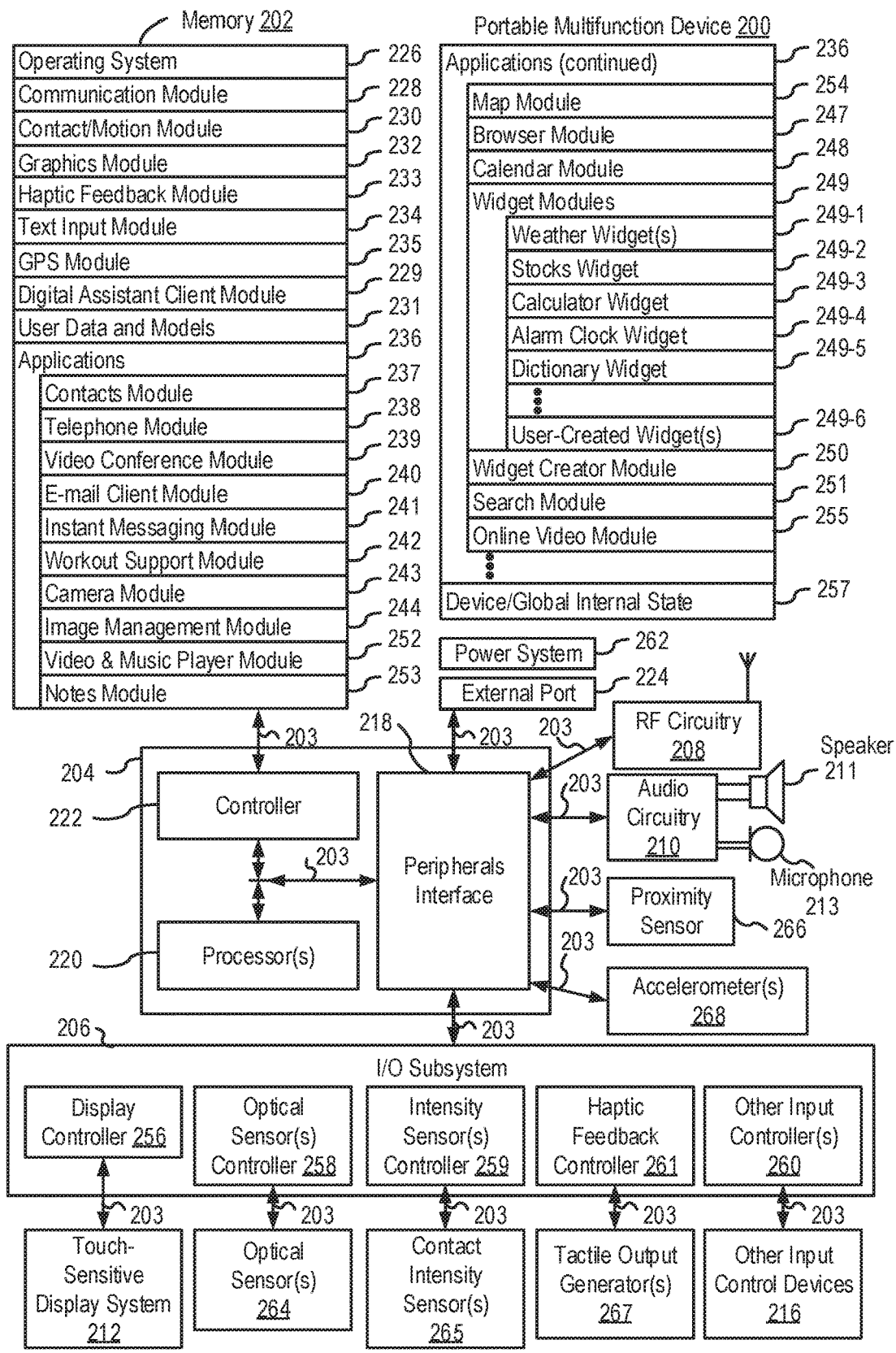
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RE circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RE circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VOIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, Calif.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758 "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector in Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based. On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
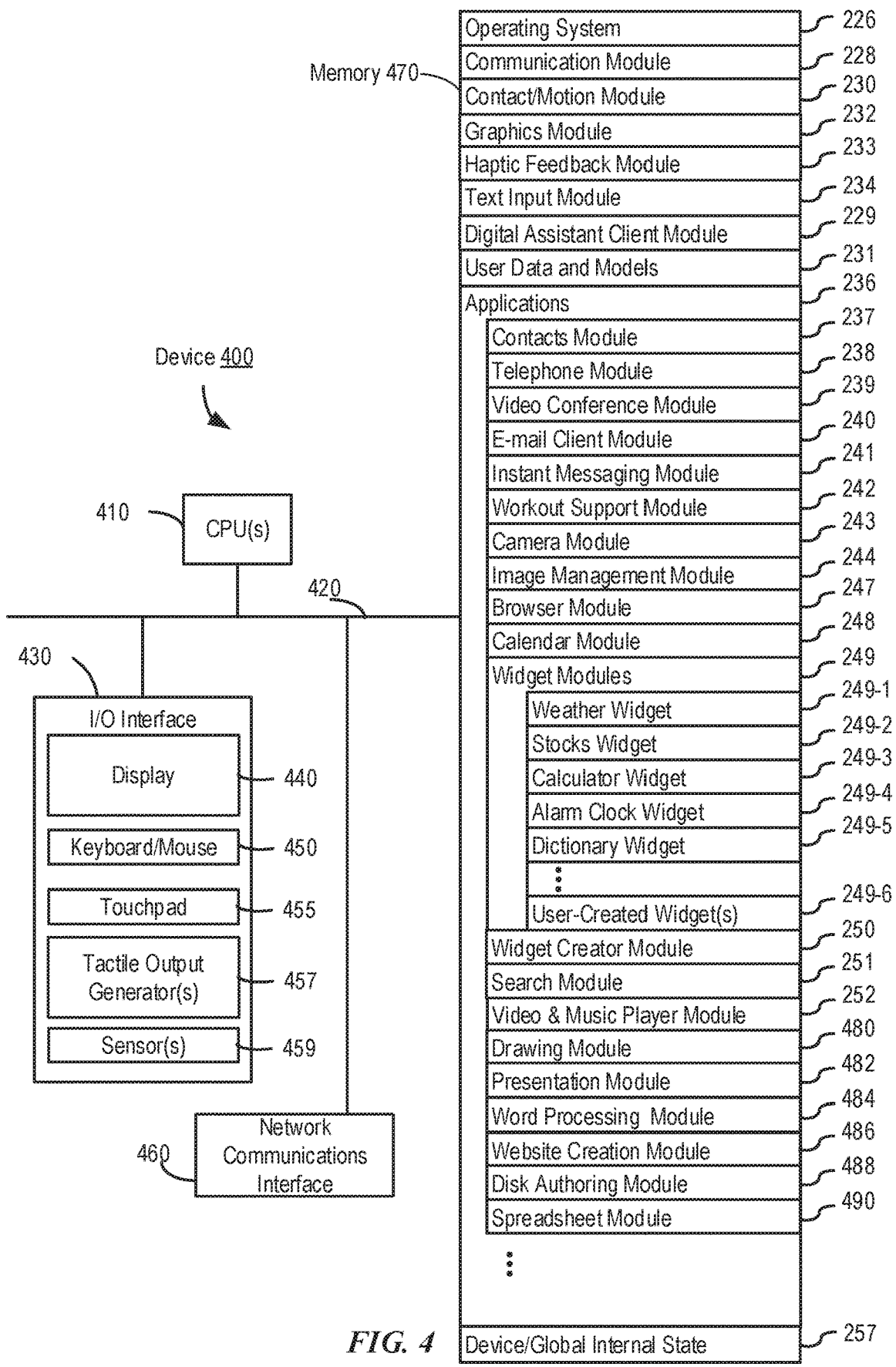
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 include the following modules (or sets of instructions), or a subset or superset thereof:
 Contacts module 237 (sometimes called an address book or contact
 Telephone module 238;
 Video conference module 239;
 E-mail client module 240;
 Instant messaging (IM) module 241;
 Workout support module 242;
 Camera module 243 for still and/or video images;
 Image management module 244;
 Video player module;
 Music player module;

Browser module 247;
Calendar module 248;
Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding names) to the address book; deleting name(s) from the address book; associating telephone number(s), e-mail address(es), physical addresses) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RE circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RE circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RE circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RE circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242, includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionaty widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
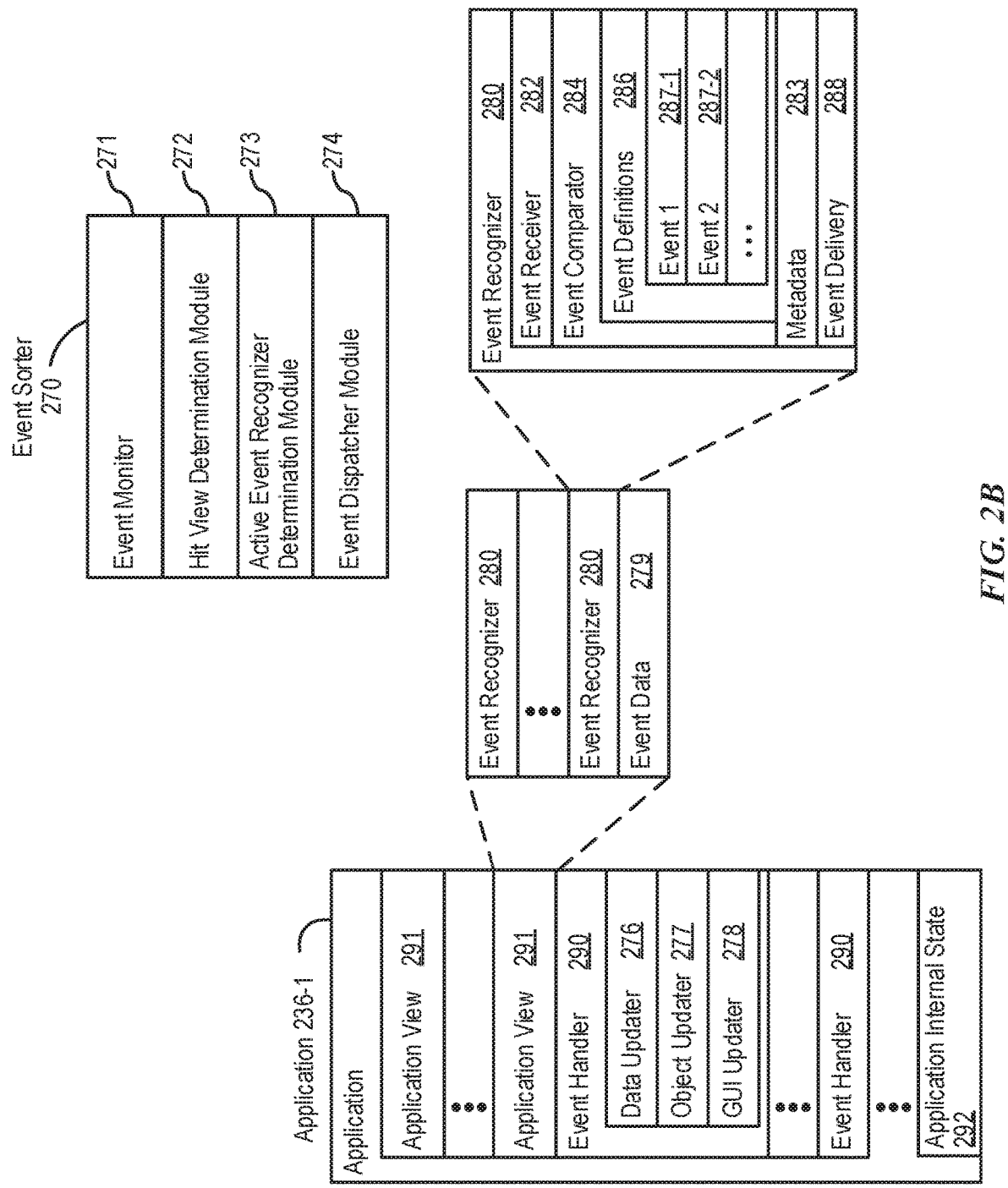
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
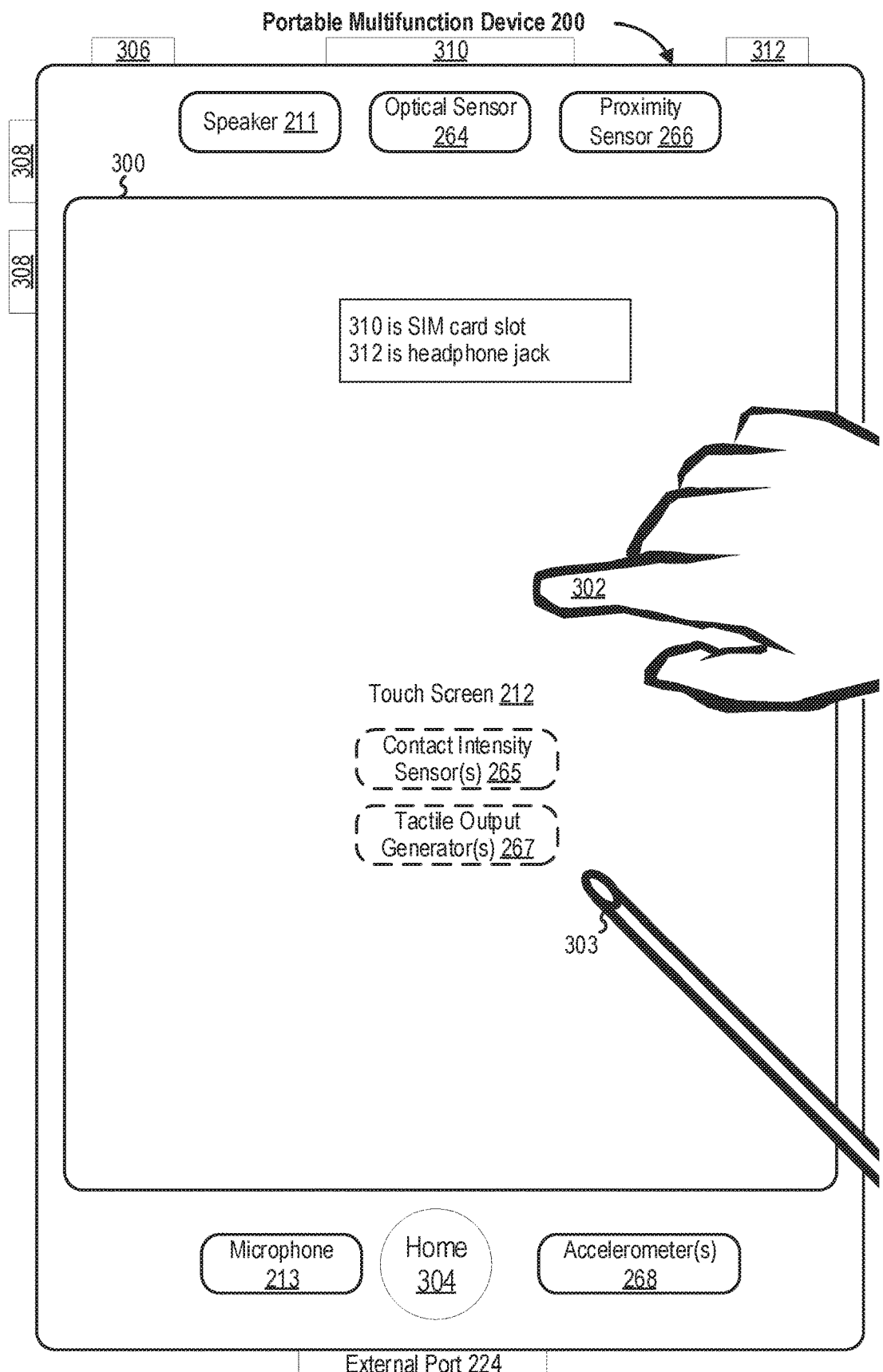
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
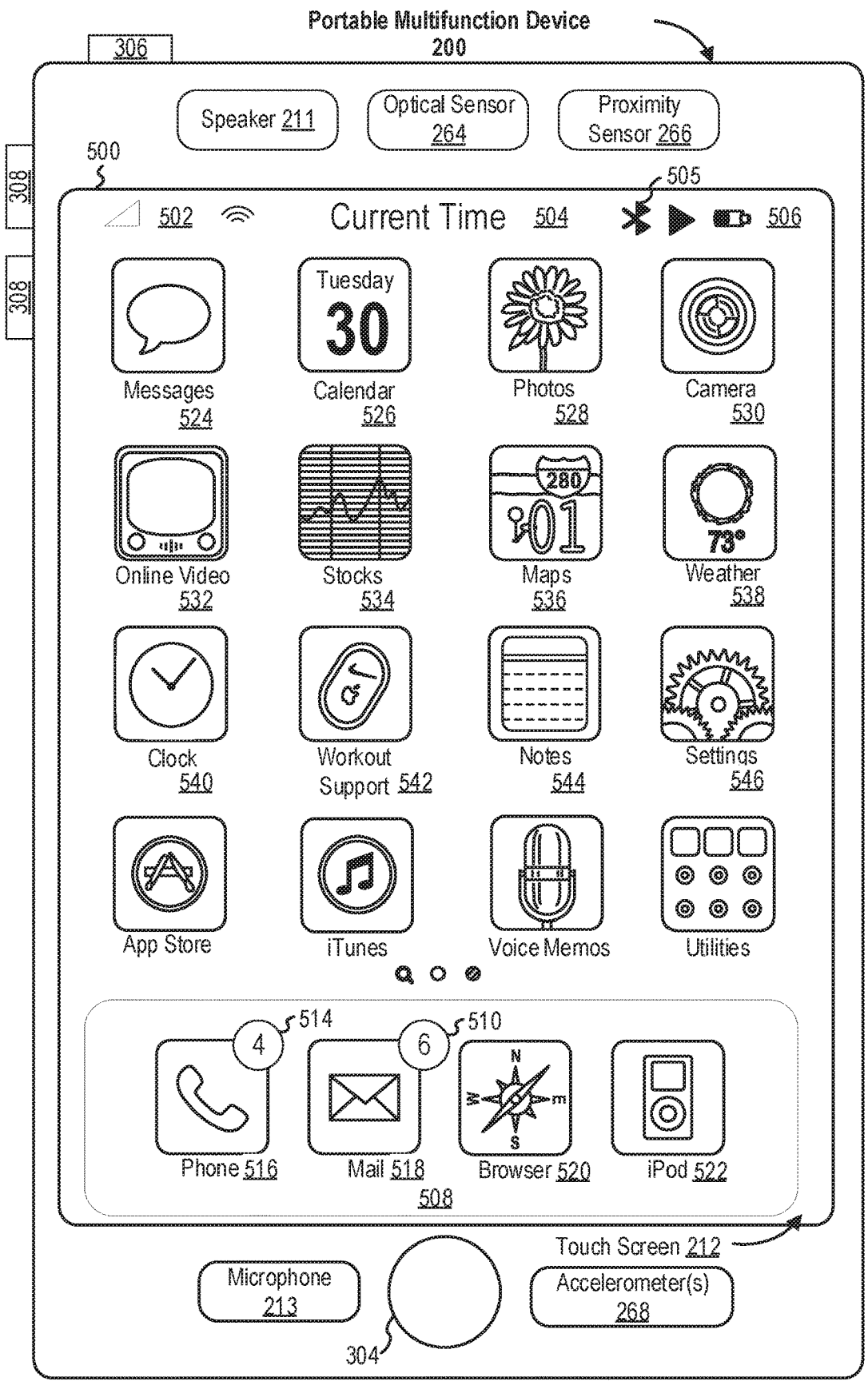
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:
  Icon 516 for telephone module 238, labeled "Phone," which optionally includes an indicator 514 of the number of missed calls or voicemail messages;
  Icon 518 for e-mail client module 240, labeled "Mail," which optionally includes an indicator 510 of the number of unread e-mails;
  Icon 520 for browser module 247, labeled "Browser;" and
  Icon 522 for video and music player module 252, also referred to as iPod (trademark of Apple Inc module 252, labeled "iPod;" and
Icons for other applications, such as:
  Icon 524 for IM module 241, labeled "Messages;"
  Icon 526 for calendar module 248, labeled "Calendar;"
  Icon 528 for image management module 244, labeled "Photos;"
  Icon 530 for camera module 243, labeled "Camera;"
  Icon 532 for online video module 255, labeled "Online Video;"
  Icon 534 for stocks widget 249-2, labeled "Stocks;"
  Icon 536 for map module 254, labeled "Maps;"
  Icon 538 for weather widget 249-1, labeled "Weather;"
  Icon 540 for alarm clock widget 249-4, labeled "Clock;"
  Icon 542 for workout support module 242, labeled "Workout Support;"
  Icon 544 for notes module 253, labeled "Notes;" and
  Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
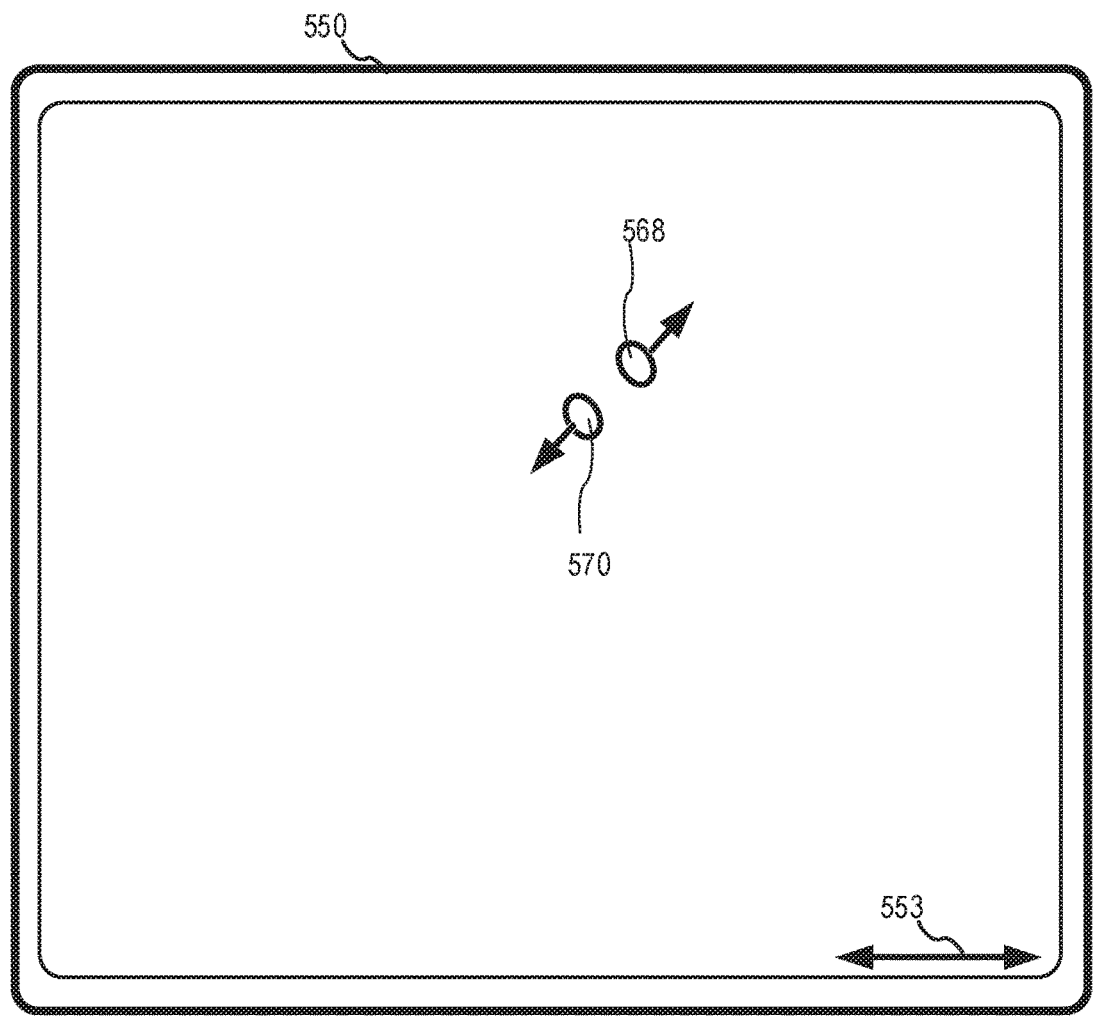
FIG. 5B illustrates an exemplary user interface for a multifunction device with a touch-sensitive surface that is separate from the display, according to various examples.
Figure 5B:
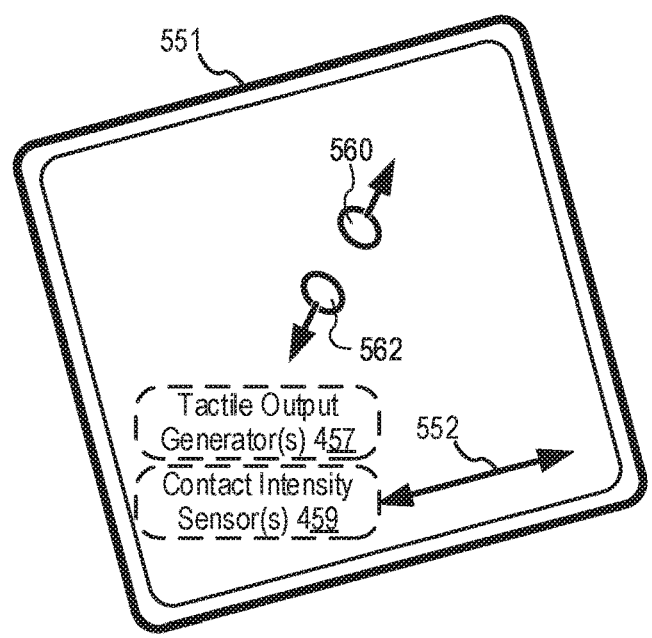

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
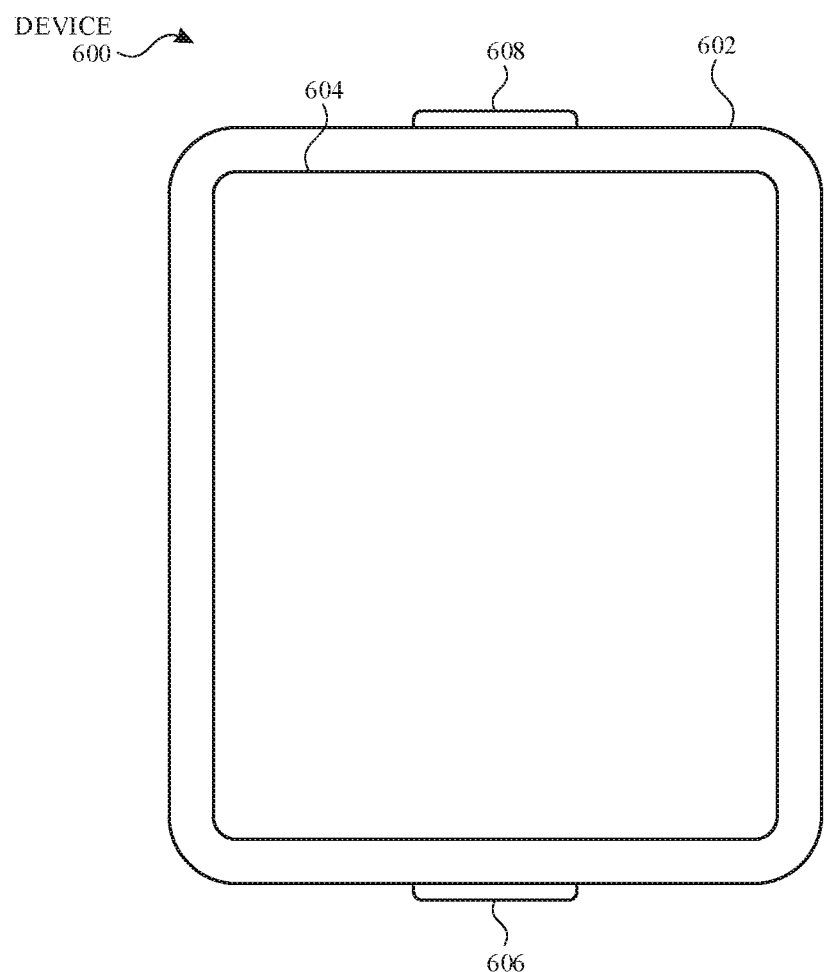
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4), in some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and international Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
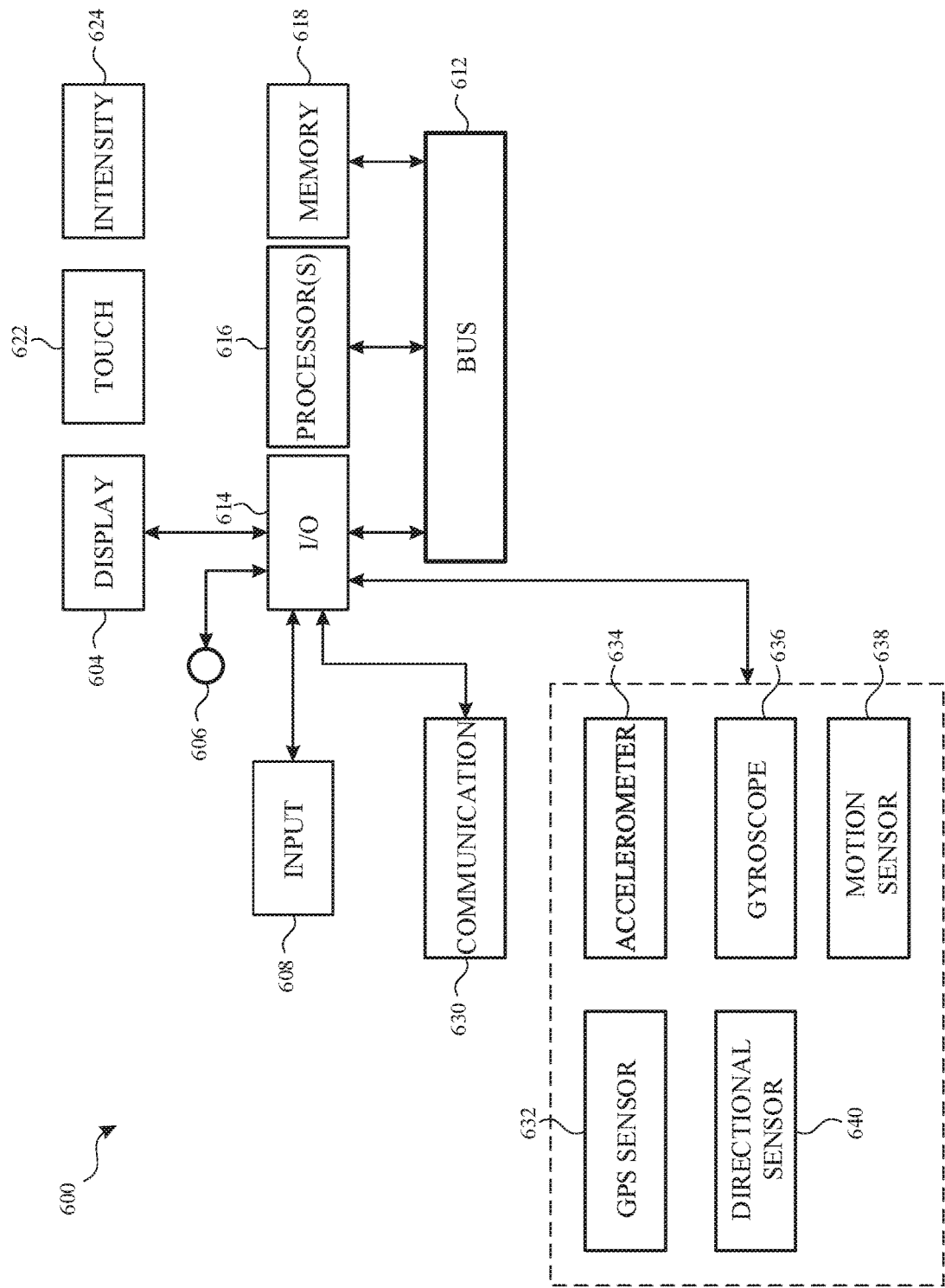
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, 600, 800, or 900 (FIGS. 2A, 4, 6A-B, 8, 9A-F, and 12). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
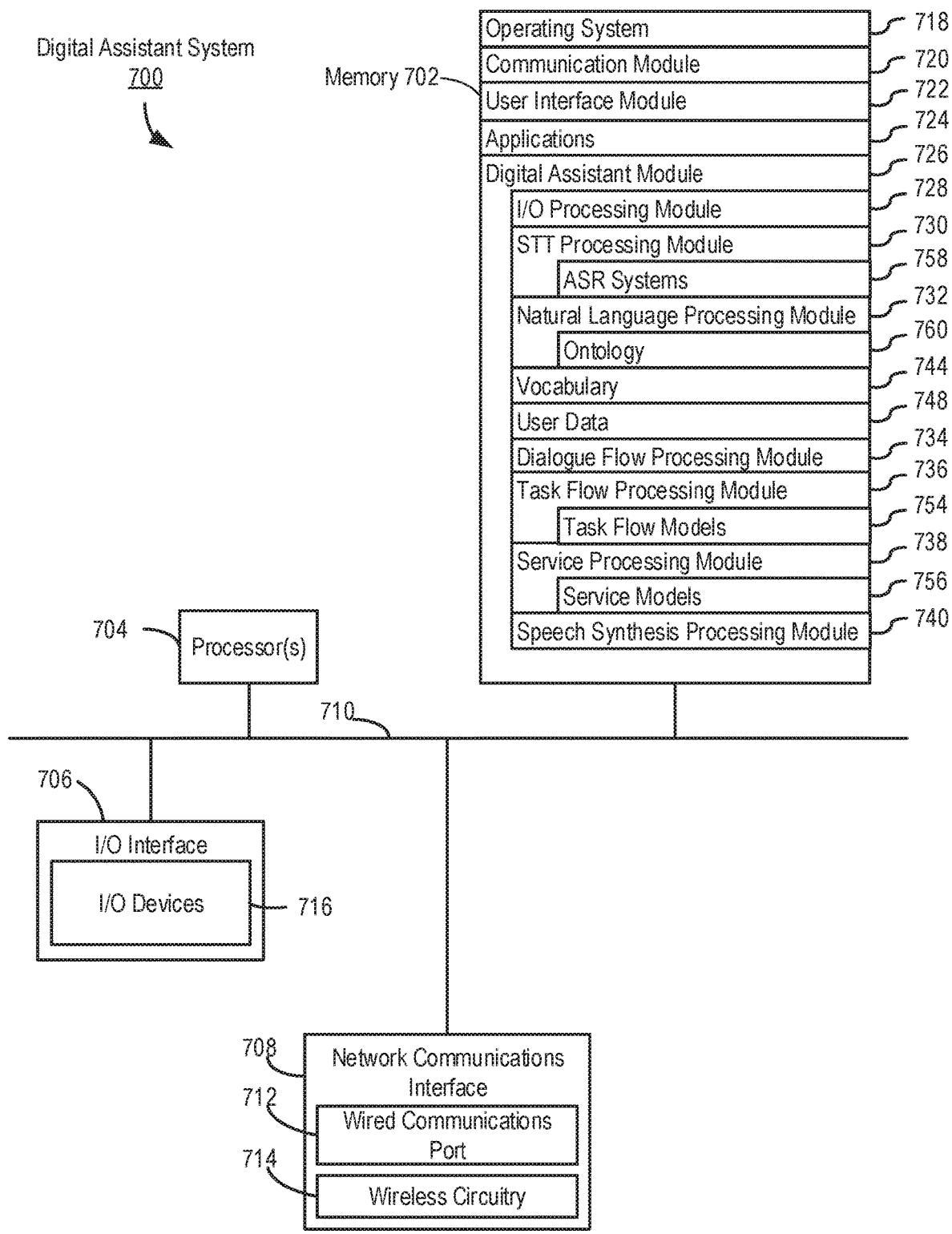
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, 600, 800, or 900) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (110) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, 600, 800, or 900 in FIGS. 2A, 4, 6A-B, 8, 9A-F, and 12. In some examples, digital assistant system 700 represents the server portion of a digital assistant implementation, and can interact with the user through a client-side portion residing on a user device (e.g., devices 104, 200, 400, 600, 800, or 900).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
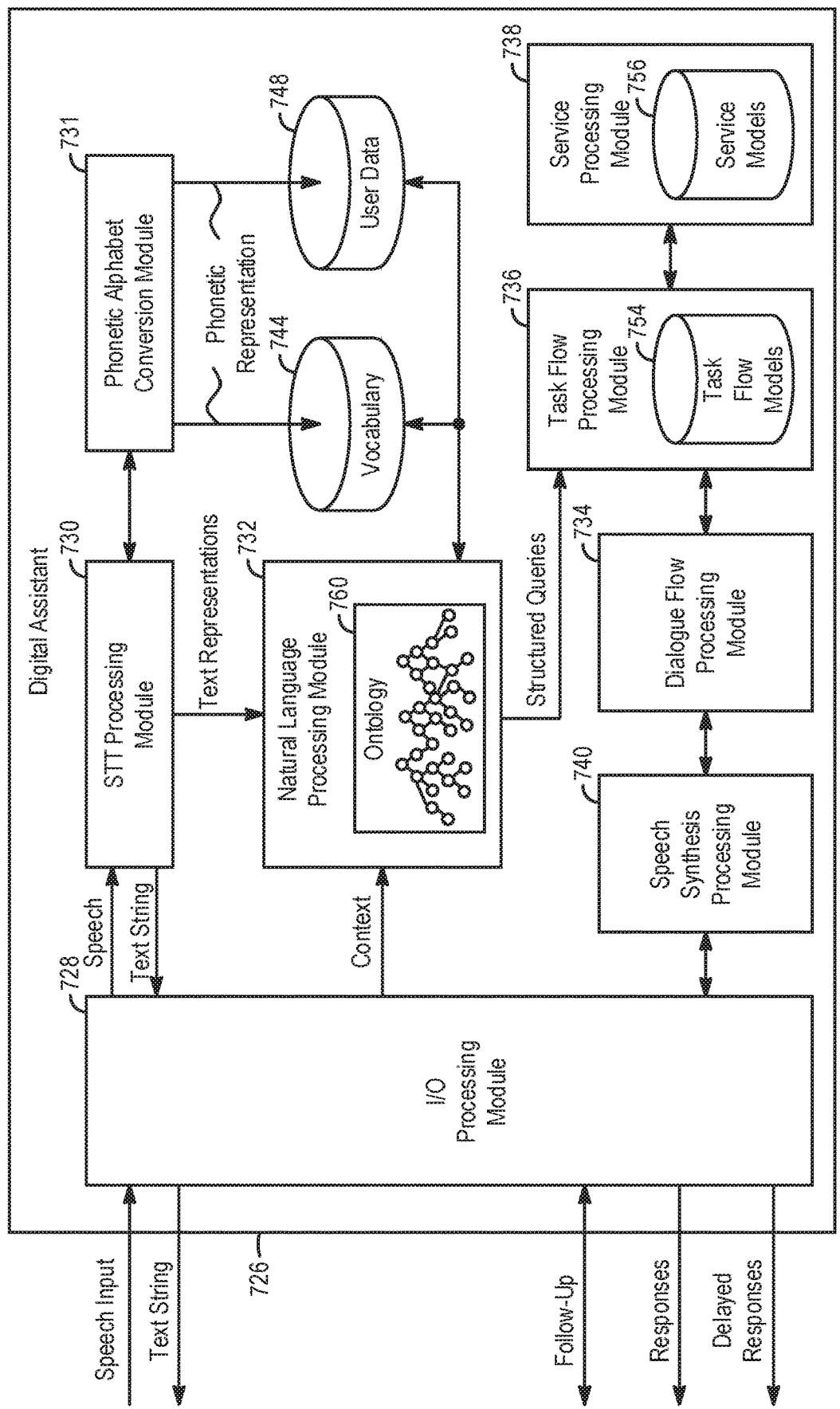
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /tə'meɪroʊ/ and /tə'mɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /tə'meɪroʊ/ is ranked higher than /tə'mɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /tə'meɪroʊ/ is associated with the United States, whereas the candidate pronunciation tə'mɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) is ranked higher than the candidate pronunciation /tə'mɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identities the sequence of phonemes /tə'meɪroʊ/ corresponding to a portion of the speech input, it can then determine, based on vocabulary index 744, that this sequence corresponds to the word "tomato."

In some examples, SIT processing module 730 uses approximate matching techniques to determine words in an utterance. Thus, for example, the STT processing module 730 determines that the sequence of phonemes /tə'meɪroʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by SIT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
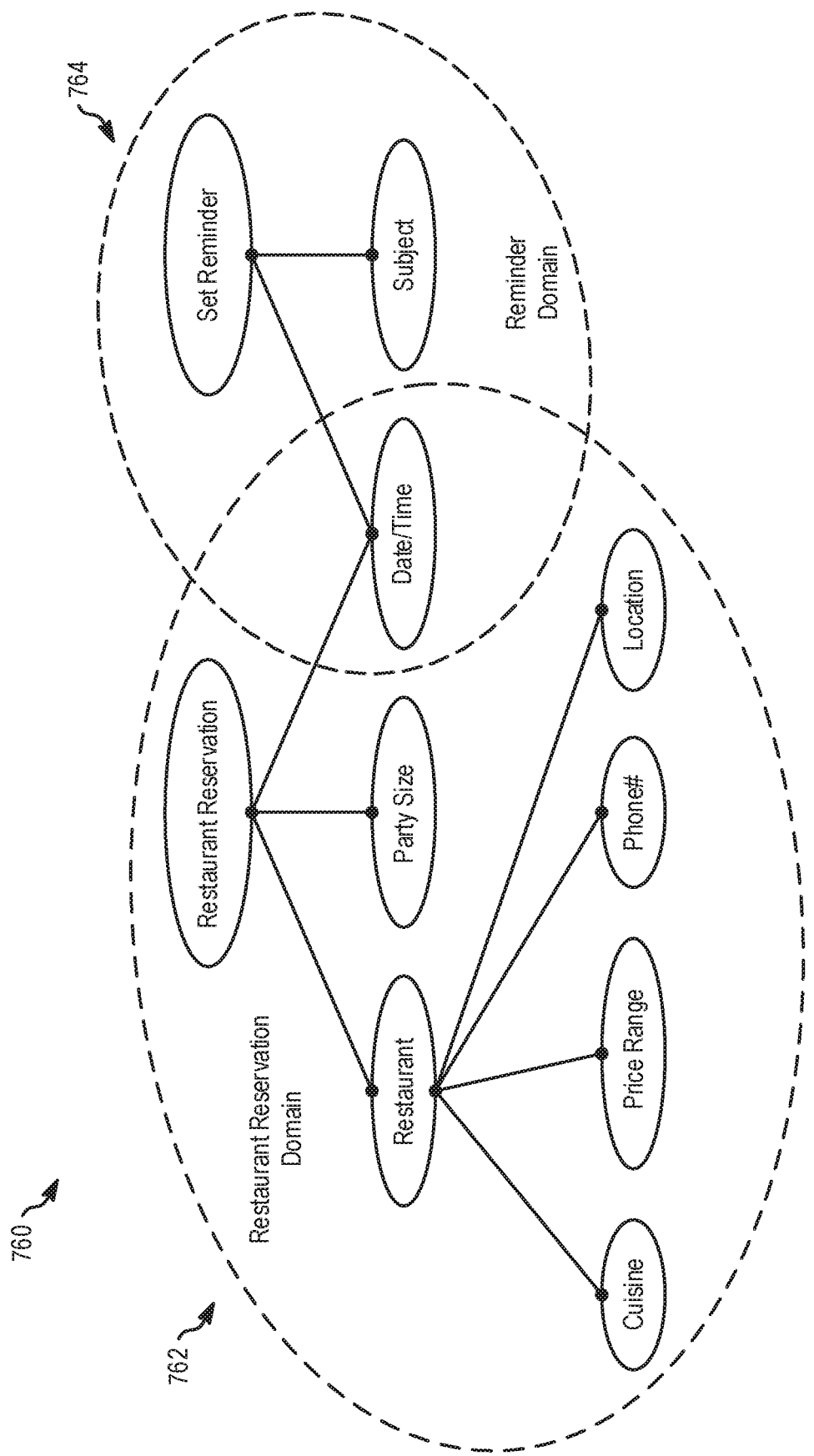
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party"

would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant ABC Café, date=Mar. 12, 2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formnant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated. Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Voice Identification in Digital Assistant Systems

FIGS. 8, 9A-F, 10A-H, and 11A-B illustrate exemplary processes and user interactions with an electronic device. These figures illustrate some example processes described below, including the processes 1300 and 1400 of FIGS. 13A-G and 14A-E, respectively.

Although some processes below are described as being performed by particular devices (e.g., device 800, 900), in some examples, the processes are performed using a client-server system (e.g., system 100), where devices 800 and/or 900 are implemented as client device(s) in communication with a server, e.g., as shown in FIG. 1. In some examples, the processes are divided up in any manner between the client device and the server. In some examples, the processes are performed only by the client device, or only by multiple client devices (e.g., 800, 900).

The processes described below are performed using software, hardware, or a combination of software and hardware to carry out the principles describes herein. The hardware and software components may be distributed in any manner between the device(s) and/or system(s) performing the processes (e.g., 800, 900, 100). For example, the processes are optionally implemented as computer-executable instructions stored in memory 702 and/or using digital assistant system 700, or any component thereof, operating on the device(s) and/or system(s) performing the processes. One of skill in the art will understand how other processes are performed using the components of FIGS. 1-4, 6A-B, 7A-C.

Figure 8:
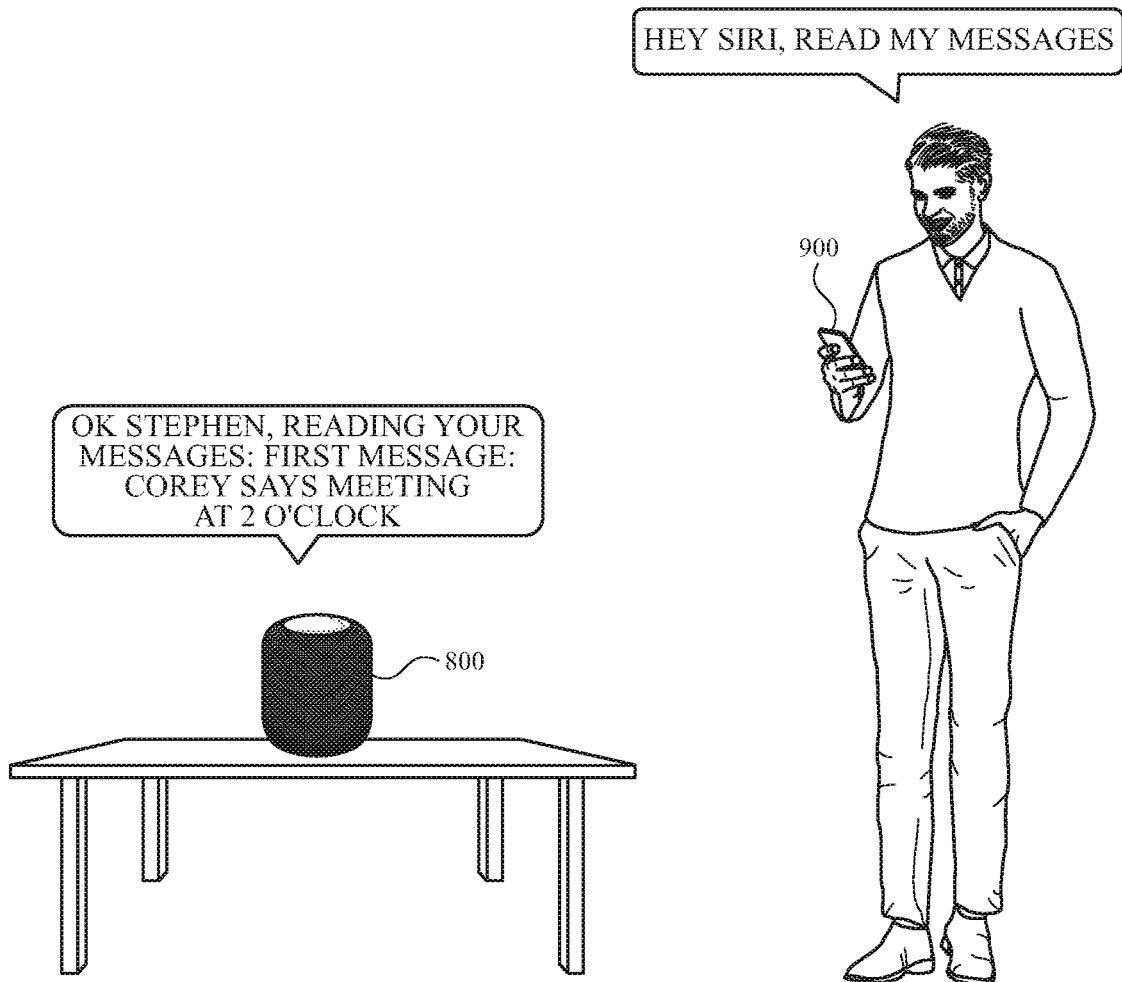
FIG. 8 illustrates a user interaction with an electronic device, according to some examples.

FIG. 8 illustrates a user interaction with electronic device 800, according to some examples. Device 800 includes the modules and functions of a digital assistant described above in FIGS. 7A-C. Device 800 is, for example, the same as or similar to device 400 or 600 discussed above. In the example of FIG. 8, device 800 is a smart speaker. However, device 800 may be any type of device, such as a phone, laptop computer, desktop computer, tablet, wearable device (e.g., smart watch), television, speaker, or any combination thereof.

Device 800 receives a natural language speech input (e.g., from a user) and provides a response to the speech input. According to the techniques discussed below, the response is personalized for a user identified based on the received speech input. For example, FIG. 8 shows a user (e.g., Stephen) providing the speech input "Hey Siri, read my messages" to the device (e.g., to a digital assistant operating on the device). The digital assistant identifies the user based on the received speech input and provides the personalized response "ok Stephen, reading your messages: first message: Corey says meeting at 2 o'clock."

In some examples, device 800 receives, from external electronic device(s), a plurality of speaker profiles for a plurality of users (e.g., registered users). In some examples, the plurality of speaker profiles are received before receiving speech input based on which a user is identified. In some examples, the registered users form a group of mutually associated users such as users in the same family, users registered in a particular software application, a user-defined group of users, or a combination or sub-combination thereof. Thus, in some examples, the external electronic device(s) are the respective electronic devices of each user of the registered users. For example, when a family includes four users, the external electronic devices are the four respective electronic devices (e.g., phones, laptops, watches, tablets) of each user in the family. Thus, in some examples, the four electronic devices each send a speaker profile for their respective user to device 800.

In the example of FIG. 8, device 800 has received a speaker profile for the user (e.g., Stephen) from external electronic device 900 (e.g. Stephen's phone). In some examples, device 900 is the same as or similar to device 400 or 600 and is a phone, laptop computer, desktop computer, tablet, wearable device (e.g., smart watch), television, speaker, or any combination thereof. In some examples, device 900 includes the modules and functions of a digital assistant, discussed above with respect to FIGS. 7A-C. Device 800 has also received a speaker profile for another user (e.g., Stephen's friend Corey) from an external electronic device of the another user (e.g., Corey's device, not shown). Device 800 identifies users using the received speaker profiles according to the techniques discussed below.

In some examples, each speaker profile of the plurality of received speaker profiles includes a plurality of representations of the voice of a respective user. In some examples, at least one of the plurality of representations is determined based on an utterance of the respective user. In some examples, the utterance is received at an external electronic device (e.g., external to device 800) associated with the respective user. In some examples, the utterance includes a trigger phrase for triggering a digital assistant such as "Hey Siri" or "wake up." In some examples, the utterance is spoken by the respective user as part of an enrollment session for a digital assistant, e.g., an enrollment session where the user utters a trigger phrase a few times to enroll in a voice trigger system for a digital assistant.

In some examples, a digital assistant operating on the external device (e.g., device 900) determines a representation of a received utterance according to the techniques discussed herein. In some examples, the determined representation is included in a speaker profile for a respective user. In some examples, the digital assistant operating on the external device causes the determined representation (and/or speaker profile) to be sent to another device (e.g., device 800).

For example, Stephen's speaker profile received by device 800 includes multiple representations of Stephen's voice. The multiple representations are determined based on Stephen's utterances of "Hey Siri" at device 900. A digital assistant operating on device 900 causes the multiple representations forming Stephen's speaker profile to be sent to device 800.

In some examples, a representation of an utterance includes a determined embedding of the utterance. In some examples, the embedding includes a vector (e.g., a set of numerical values) representing the voice of a user. In some examples, the embedding is determined using a speaker model, e.g., implemented as executable instructions stored in the memor(ies) of devices 800 and/or 900. In some examples, the speaker model includes neural network(s), Hidden Markov Model(s), and/or other models known in the art for speaker identification and is trained to determine embeddings based on received utterances (e.g., speech input). In some examples, the speaker model is trained to determine embeddings that emphasize speaker specific characteristics while deemphasizing environmental and semantic factors (e.g., environmental noise, the particular words spoken) and variations in a particular speaker's voice (e.g., the speaker's tired voice, the speaker's angry voice, and the like). In some examples, the speaker model is trained to determine embeddings that minimize variability for the same speaker (e.g., embeddings of utterances from the same speaker are the same or similar) while maximizing variability between speakers (e.g., embeddings of utterances from different speakers are different). In this manner, a determined embedding may accurately represent a particular speaker's voice. The determined embedding can thus be compared to other embeddings (e.g., for the particular speaker and for other speakers) to identify a speaker. For example, if a first embedding is close (e.g., within a predefined threshold as measured by a cosine distance between vectors) to a second embedding representing a particular speaker's voice, then the utterance corresponding to the first embedding is likely received from the particular speaker.

In some examples, a speaker model is trained using utterances of various users (e.g., younger users, older users, male users, female users). In some examples, the utterances of the various users are received at various electronic devices such as phones, computers, speakers, and tablet devices. Training the speaker model based on such utterances can allow the speaker model to determine an accurate and robust embedding to represent a voice of a speaker. In particular, because the same utterance can have different characteristics when recorded by different types of electronic devices (e.g., due to different device microphone configurations/types), it can be advantageous to train the speaker model to determine an accurate embedding of an utterance, regardless of the device at which the utterance is received.

In some examples, a speaker model is trained using utterances of various phrases (e.g., "Hey Siri," "set a timer," "what's the weather today?"). This may allow determination of accurate embeddings for a variety of utterances. For example, the speaker model may be initially trained based on utterances of "Hey Siri," but further training using other utterances may allow the speaker model to accurately determine embeddings for a variety of utterances (e.g., "call my mom"). In this manner, a user can be identified based on spoken utterances (e.g., "call my mom") different from the utterances used to train the speaker model (e.g., "Hey Siri"). Exemplary speaker models and techniques for training speaker models are discussed in:

"Personalized Hey Siri." *Apple Machine Learning Journal*, vol. 1, no. 9, April 2018; and E. Marchi, S. Shum, K. Hwang, S. Kajarekar, S. Sigtia, H. Richards, R. Haynes, Y. Kim, and J. Bridle. "Generalised Discriminative Transform via Curriculum Learning for Speaker Recognition." *Proceedings of the IEEE International Conference on Acoustics, Speech, and Signal Processing (ICASSP)*, April 2018.

The contents of these publications are hereby incorporated by reference in their entireties.

In some examples, device 800 determines, based on comparing received natural language speech input to a plurality of speaker profiles, a plurality of likelihoods that the speech input respectively corresponds to a plurality of users (e.g., registered users). In some examples, each likelihood of the plurality of likelihoods includes a score (e.g., a numerical value) indicating a degree of match between the received speech input and a respective speaker profile. For example, in FIG. 8, device 800 determines a first likelihood that the speech input corresponds to Stephen based on comparing the speech input to Stephen's speaker profile and determines a second likelihood that the speech input corresponds to Corey based on comparing the speech input to Corey's speaker profile. The second likelihood is less than the first likelihood, indicating that device 800 is more confident that the speech input corresponds to Stephen.

In some examples, determining a likelihood that speech input corresponds to a user includes comparing a representation of the speech input to each of a plurality of representations of the voice of the user. For example, device 800 determines a representation (e.g., embedding) of the speech input and compares the determined embedding to each of a plurality of (e.g., 40) embeddings included in the user's speaker profile. For example, for each of the plurality of embeddings, device 800 computes a distance metric (e.g., normalized cosine distance) between the respective embedding and the determined embedding. Device 800 then averages the determined distance metrics to calculate an average score indicating the degree of match between the speech input and a user's speaker profile. In some examples, device 800 then determines a likelihood that the speech input corresponds to the user based on the average score.

In some examples, device 800 determines whether a likelihood that speech input corresponds to a user exceeds (or does not exceed) one or more thresholds. For example, device 800 determines whether the likelihood exceeds a first threshold (e.g., an upper threshold). In some examples, a likelihood exceeding the upper threshold indicates high confidence that the speech input corresponds to the user represented by the likelihood. In some examples, device 800 determines whether the likelihood is below a second threshold (e.g., a lower threshold). In some examples, a likelihood below the lower threshold indicates low confidence that the speech input corresponds to the user. In some examples, device 800 determines whether the likelihood is between two thresholds, such as a lower and an upper threshold. In some examples, a likelihood between two thresholds indicates medium confidence that the speech input corresponds to the user. In the example of FIG. 8, device 800 determines that the likelihood that the speech input corresponds to Stephen exceeds the upper threshold. Device 800 determines that the likelihood that the speech input corresponds to Corey is below the lower threshold.

In some examples, device 800 determines whether a likelihood that speech input corresponds to a first user and a likelihood that speech input corresponds to a second user are within a threshold (e.g., a difference threshold) (e.g., determining whether the difference between the first likelihood and the second likelihood is less than a threshold). In some examples, having the first and the second likelihoods within the difference threshold means that device 800 cannot distinguish the first user from the second user with sufficient confidence (e.g., because the likelihoods are close together). In some examples, having the first and the second likelihoods not within the difference threshold means that device 800 can distinguish the users (e.g., because the likelihoods are far apart). In the example of FIG. 8, device 800 determines that the likelihood that the speech input corresponds to Stephen and the likelihood that the speech input corresponds to Corey are not within the score difference threshold, e.g., meaning that device 800 has distinguished Stephen's voice from Corey's voice.

In some examples, device 800 determines that a natural language speech input corresponds to a user (e.g., identifies a user). In some examples, identifying a user includes determining representations of speech inputs, determining likelihoods, determining whether a likelihood that the speech input corresponds to the user exceeds or does not exceed one or more thresholds (e.g., an upper threshold, a lower threshold), determining that the likelihood is higher or lower than other likelihoods, and determining that the likelihood is not within a difference threshold of any other determined likelihoods, or a combination or sub-combination thereof. For example, device 800 identifies Stephen because the likelihood that the speech input "Hey Siri, read my messages" corresponds to Stephen exceeds an upper threshold, because the likelihood that the speech input corresponds to Stephen is the highest determined likelihood, and/or because the likelihood that the speech input corresponds to Stephen and the likelihood that the speech input corresponds to Corey are not within a difference threshold.

In some examples, identifying a user includes determining possible users, e.g., a number of possible users, corresponding to a speech input. In some examples, possible users are determined from the registered users of device 800. In some examples, possible users include users who device 800 has at least low, medium, or high confidence in. In some examples, possible users include users who device 800 cannot distinguish with sufficient confidence. For example, if device 800 is highly confident that speech input corresponds to both Corey and Stephen, and cannot distinguish Corey from Stephen, Corey and Stephen are determined as two possible users.

In some examples, one or more possible users are non-registered users, e.g., users for which device 800 has not received respective speaker profiles. In some examples, a non-registered user is determined as a possible user when device 800 determines a high, medium or low confidence that the speech input corresponds to a non-registered user. For example, device 800 stores a speaker profile for a non-registered user, e.g., a generic human speaker profile, and determines a high, medium, or low confidence that speech input corresponds to the non-registered user.

In some examples, in accordance with identifying a user, device 800 provides a response to the speech input, e.g., using I/O processing module 728. In some examples, the response to the speech input is personalized for the identified user. For example, the response is determined based on the identified user's personal information, further discussed below with respect to FIG. 12. In some examples, providing a response to a speech input includes determining a user intent based on the speech input (e.g. using natural language processing module 732), determining a task based on the user intent (e.g., using task flow processing module 736), and providing a result based on the task (e.g., using input/output processing module 728). Further details regarding providing personalized responses are discussed below with respect to FIG. 12.

In some examples, a response to a speech input includes one or more words indicative of personalization for an identified user. For example, the response includes a name of the identified user and/or words/phrases such as "your," "personal," "personalized," or "just for you." This may advantageously indicate that a device has correctly (or incorrectly) identified a user. For example, in FIG. 8, device 800 identifies Stephen and provides a response personalized for Stephen, "ok Stephen reading your messages: first message: Corey says meeting at 2'o clock."

Sometimes, repeatedly providing the name of a user, e.g., responsive to every user speech input, may be undesirable, as this may annoy a user and extend the length of device outputs. Accordingly, in some examples, device 800 provides the name of an identified user in a response to the speech input from which the user is initially identified, but does not provide the name in subsequent responses to subsequent speech inputs from the same user. For example, after device 800 provides the personalized response "okay Stephen reading your messages," Stephen provides another speech input (e.g., "Hey Siri, call mom") to device 800. Device 800 still identifies Stephen according to the techniques discussed herein, but does not provide a response including the name of Stephen. Rather, device 800 responds "Ok, calling Mom," for example. However, had the speech input (e.g., "Hey Siri, call mom") been provided by another user (e.g., Corey), the response to the speech input may include the name of the another user (e.g., "Ok Corey, calling mom").

In some examples, in accordance with identifying a user, device 800 updates a speaker profile for the identified user based on the speech input. For example, device 800 determines an embedding for the utterance (e.g., using a speaker model) and adds the determined embedding to the particular user's speaker profile. For example, device 800 determines an embedding of "Hey Siri, read my messages" and adds the embedding to Stephen's speaker profile.

Updating the speaker profile in this manner may improve user identification based on future speech inputs. For example, because more representations of a user's voice (e.g., embeddings) may be included in the updated speaker profile, the updated speaker profile may be used to more accurately identify the user. Further, the added representation may more accurately represent the user's voice when received by device 800 than other representations in the user's speaker profile (e.g., because the other representations may be determined based on utterances received at a device different from device 800, as discussed above).

In some examples, after (or while) providing a personalized response to speech input, device 800 receives an input (e.g., user speech input) indicative of a recognition error. Exemplary inputs indicative of a recognition error include "that's not me," "no, stop," "I'm someone else," and the like. In some examples, in accordance with receiving the input indicative of a recognition error, device 800 terminates the provision of the personalized response and/or forgoes updating a speaker profile of an identified user. In some examples, in accordance with receiving the input indicative of a recognition error, device 800 determines information indicating that the determined representation of the initial speech input is incorrect for an (incorrectly) identified user. In some examples, such information is used to train a speaker model to determine more accurate representations of speech input.

For example, if device 800 responds "ok Corey reading your messages . . . " responsive to Stephen's speech input "Hey Siri, read my messages," Stephen then provides the input "that's not me." In accordance with receiving such input, device 800 terminates the provision of "ok Corey reading your messages . . . " and does not update Corey's speaker profile based on a representation of the utterance "Hey Siri, read my messages" (because it was actually spoken by Stephen).

In some examples, device 800 determines a user intent associated with received natural language speech input (e.g., using natural language processing module 732). In some examples, device 800 determines whether a user intent includes (e.g., is) a type of user intent of a plurality of types of user intent (e.g., using natural language processing module 732). In some examples, the plurality of types of user intent include a personal intent, a semi-personal intent, and a non-personal intent. As discussed below, the manner in which device 800 interacts with a user (and whether user identification is performed) can depend on the determined type of intent.

In some examples, a personal intent includes an intent for which user identification is required to provide a personalized response. Exemplary personal intents include intents of:
retrieving communications (e.g., emails, text messages, instant messages, voicemail) (e.g., associated with the inputs "read my messages," "read my emails from Corey");
sending communications (e.g., emails, phone calls, text messages, instant messages) to a personal contact (e.g., associated with the input "call mom");
user identification (e.g., associated with the input "who am I?");
retrieving and/or modifying contact information, recent caller information, health information, financial information, or a combination thereof (e.g., associated with the inputs "get me Corey's contact information," "how many calories did I burn today?", "pay Corey twenty dollars");
retrieving and/or modifying calendar and/or reminder information (e.g., associated with the inputs "add an appointment to my calendar," "remind me to call mom");
retrieving and/or modifying a user's notes and/or lists (e.g., user-created text memos, voice memos) (e.g., associated with the input of "create a new note," "add this to my shopping list");

activating and/or deactivating security features of a user's residence (e.g., associated with the inputs "unlock my door," "arm my alarm");

modifying a user's personal media account (e.g., associated with the inputs "add this to my playlist," "buy 'thank u next' by Ariana Grande," "subscribe to CNN news");

locating a user's electronic devices (e.g., associated with the inputs of "find my phone," "where is my watch?"); and initiating a personalized voice shortcut command (e.g., associated with user-defined inputs causing a digital assistant to perform user-defined task(s)).

Exemplary techniques for personalized voice shortcut commands are discussed in U.S. patent application Ser. No. 16/146,963, entitled "ACCELERATED TASK PERFORMANCE," filed Sep. 28, 2018.

In some examples, a semi-personal intent includes an intent for which user identification may be desirable, but may not be required to provide a response. Exemplary semi-personal intents include an intent of playing media (e.g., associated with the input of "play 'thank u next' by Ariana Grande"), an intent of providing the news (e.g., associated with the input of "what's the news?"), and the like. For example, user identification may be desirable for semi-personal intents to play an identified user's favorite version of requested media (or provide news from an identified user's preferred news source), but may not be necessary because a device can provide the requested media (or provide the news) without identifying a user.

In some examples, a non-personal intent includes an intent for which user identification is not required (or not even desirable) to provide a response. Exemplary non-personal intents include intents of:

retrieving weather information associated with the input "what's the weather today?");

retrieving sports information (e.g., associated with the input "did the Patriots win?");

setting a timer, alarm, and/or stopwatch (e.g., associated with the input "set a timer for 15 minutes");

adjusting media playback (e.g., associated with the inputs "turn down the volume," "pause," "stop," "rewind");

performing information searches (e.g., associated with the inputs "search for bars in Hong Kong," "search Wikipedia for Abraham Lincoln");

navigation (e.g., associated with the inputs "take me to Cupertino," "where is the Golden Gate Bridge?"); and adjusting certain device settings (e.g., associated with the input "turn up the display brightness").

Although some intents are described above as being a particular type of intent (e.g., personal, semi-personal, non-personal), in other examples, the intents can be a different type of intent. For example, an intent of retrieving sports information can be a semi-personal intent (e.g., to provide sports information from an identified user's favorite sports content provider) instead of a non-personal intent. As another example, an intent of playing media can be a personal intent (e.g., if the speech input is "play me my music") instead of a semi-personal intent. Thus, in some examples, the intents discussed above may not be limited to the types to which they are initially assigned, as they may vary depending on the content of the associated speech input and/or if personalized responses can be provided for the intents.

In some examples, device 800 determines, for each user, a frequency of identification. In some examples, device 800 provides a response personalized for a most frequently identified user when a user cannot be affirmatively identified. For example, a user cannot be affirmatively identified when there is low or medium confidence that speech input corresponds to the user and/or the user cannot be distinguished from other users. For example, if device 800 determines that multiple possible users correspond to a speech input, device 800 provides a response to the speech input personalized for the most frequently identified user of the possible users. In some examples, device 800 operates in such manner in accordance with determining that a current speech input is associated with a semi-personal intent. For example, if a user says to device 800 "play the latest news in sports" and device 800 has a low confidence that the speech input corresponds to the user (and even lower confidence that the speech input corresponds to other users), device 800 provides a response personalized for the most frequently identified user. For example, device 800 provides the latest sports news from the most frequently identified user's favorite sports news provider.

In some examples, device 800 determines a most recently identified user. In some examples, device 800 provides a response personalized for a most recently identified user when a user cannot be affirmatively identified. For example, if device 800 determines that multiple possible users correspond to a speech input, device 800 provides a response to the speech input personalized for the most recently identified user (if he or she is a possible user). In some examples, device 800 operates in such manner in accordance with determining that a current speech input is associated with a semi-personal intent. For example, if a user says to device 800 "play music" and device 800 has a low confidence that the speech input corresponds to the user (and even lower confidence that the speech input corresponds to other users), device 800 provides a response personalized for the most recently identified user. For example, device 800 plays music from a media collection associated with the most recently identified user.

Sometimes, users engage in multi-turn interactions with a digital assistant operating on device 800. In some examples, a multi-turn interaction includes an interaction where multiple exchanges with the digital assistant may be required to perform a requested task. For example, a user saying "send a message" to device 800, device 800 responding "to whom shall I send your message?", the user then saying "to John, telling him that I'll be late," and device 800 responding "ok, I sent the message," is a multi-turn interaction. In some examples, a multi-turn interaction includes an interaction where a user provides multiple related requests to a digital assistant, within a short duration such as 5, 10, 15, or 30 seconds. For example, a user saying "what's the weather in New York?" to device 800, the device responding it's "70 degrees and sunny," the user then saying "how about in Paris?", and the device responding "56 degrees and raining", is a multi-turn interaction.

In some examples, device 800 only determines whether the first speech input of a multi-turn interaction corresponds to a user. In other examples, device 800 determines whether each speech input (or a subset of the speech inputs) of a multi-turn interaction corresponds to a same user. In some examples, device 800 operates in such manner in accordance with determining that a user intent associated with a speech input (e.g., first speech input) includes a personal intent. For example, suppose Stephen says to device 800 "send a message to Corey" (associated with a personal intent), device 800 responds "what should I say to Corey?", and Stephen responds "I'll be late." Device 800 determines whether each speech input of the multi-turn interaction corresponds to the same user.

In some examples, if a subsequent speech input in a multi-turn interaction is determined to not correspond to a same user, device 800 identifies a user according to the below discussed methods before providing further response. For example, a subsequent speech input does not correspond to the same user if there is low confidence that the subsequent speech input corresponds to the same user. For example, if in the above interaction, a non-registered user (instead of Stephen) said "I'll be late," device 800 may output "you'll have to send that message using your phone." In this manner, device 800 can monitor for consistent user identity through multi-turn interactions, e.g., for interactions associated with personal intents, where user identification may be desirable.

In some examples, device 800 identifies a user using techniques other than identifying the user based on the initial speech input, e.g., "Hey Siri, read my messages." For example, device 800 may identify a user using other techniques in accordance with determining that it has medium or low confidence in a particular user and/or that the user cannot be distinguished from other users. As discussed below with respect to FIGS. 9A-F, the other technique(s) used to identify a user can depend on a type of user intent, a content of the speech input, and/or a confidence that a user has been identified. Exemplary other techniques for identifying a user are now discussed.

In some examples, other techniques for identifying a user include providing an output indicative of a request for user identity (e.g., spoken output, displayed output) and identifying a user based on his/her response to the output. In some examples, an output indicative of a request for user identity includes a request for a user to identify him/herself, e.g., "who are you?", "please tell me who you are." In some examples, an output indicative of a request for user identity includes a request for the user to confirm his/her identity, e.g., "are you Stephen?," "you are Stephen, right?". In some examples, an output indicative of a request for user identity requests user disambiguation between two or more registered users, e.g., "are you Stephen or Corey?"

In some examples, in response to providing an output indicative of a request for user identity, device 800 receives a speech input (e.g., natural language speech input). In some examples, device 800 determines whether the speech input corresponds to a user. In some examples, if device 800 determines that the speech input corresponds to a user, device 800 identifies that user.

In some examples, if device 800 requests a user to identify his/herself (e.g., asks "please tell me who you are?") a user provides a speech input including his/her name (e.g., says "I am Stephen"). In some examples, device 800 then determines whether the speech input corresponds to a user. For example, device 800 processes the speech input according to the above discussed techniques (e.g., determining a likelihood score, etc.) to determine whether the speech input corresponds to a user. As another example, device 800 determines whether the speech input includes a name of a user (e.g., using module 730 and/or 732). For example, in FIGS. 10A and 10B, a user says "read my messages" to device 800. Device 800 is unable to distinguish the user from other registered users, and thus outputs "please tell me who you are." The user then responds "I am Stephen," and device 800 identifies Stephen based on the speech input.

In some examples, if device 800 requests a user to confirm his/her identity (e.g., asks "you are Stephen, right?"), a user provides a speech input including an affirmative or negative response. In some examples, device 800 then determines that the speech input corresponds to a user by determining that the speech input includes an affirmative response (e.g., "yes," "I am," "mhmm," and the like). In some examples, device 800 determines that the speech input does not correspond to a user by determining that the speech input includes a negative response, or otherwise non-affirmative response (e.g., "no," "I am not," and the like).

In some examples, if device 800 requests user disambiguation between two or more registered users (e.g., "are you Stephen or Corey?"), a user provides a speech input including a disambiguation (e.g., "I am Stephen"). In some examples, device 800 determines that the speech input corresponds to a user by determining that the speech input includes a name of the user.

Figure 10A:
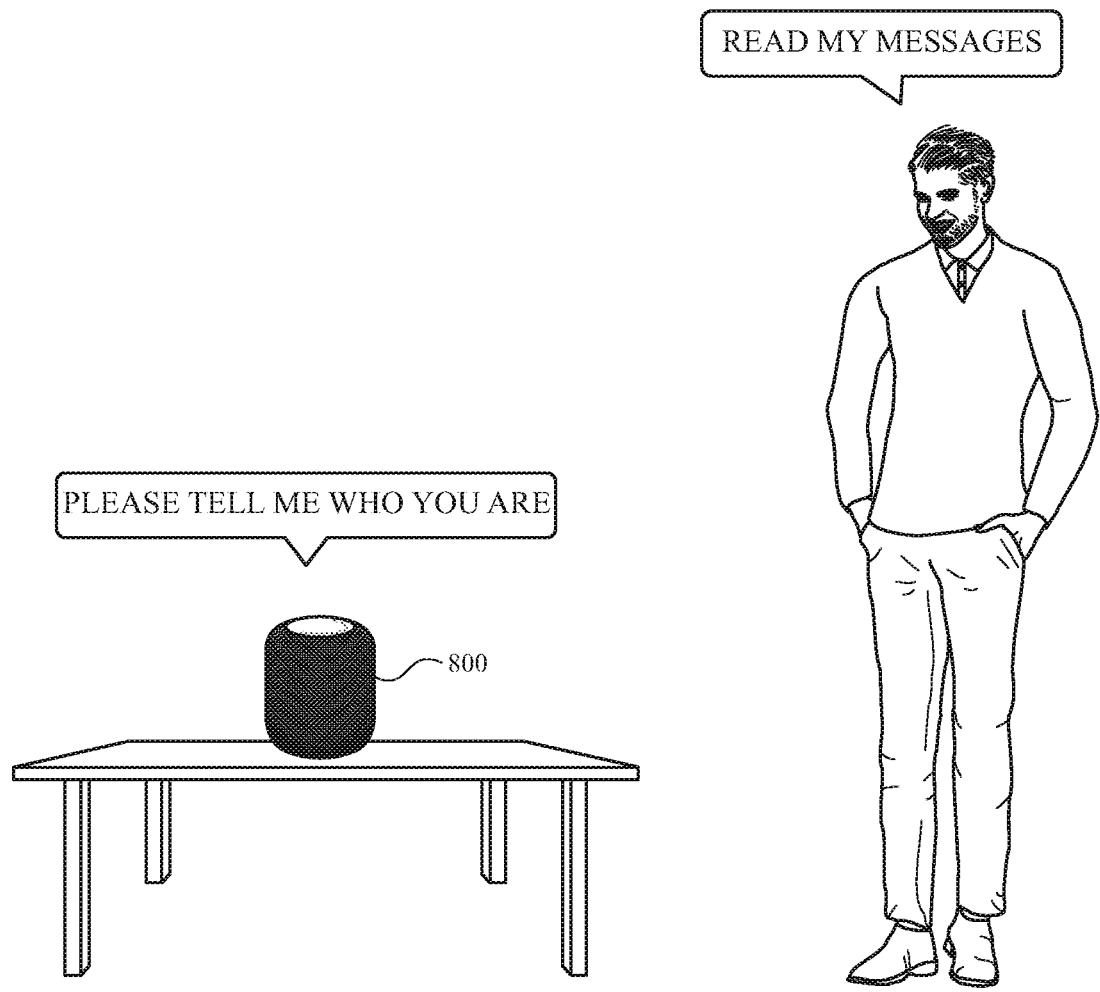
FIGS. 10A-H illustrate exemplary user interactions with an electronic device.
Figure 10B:
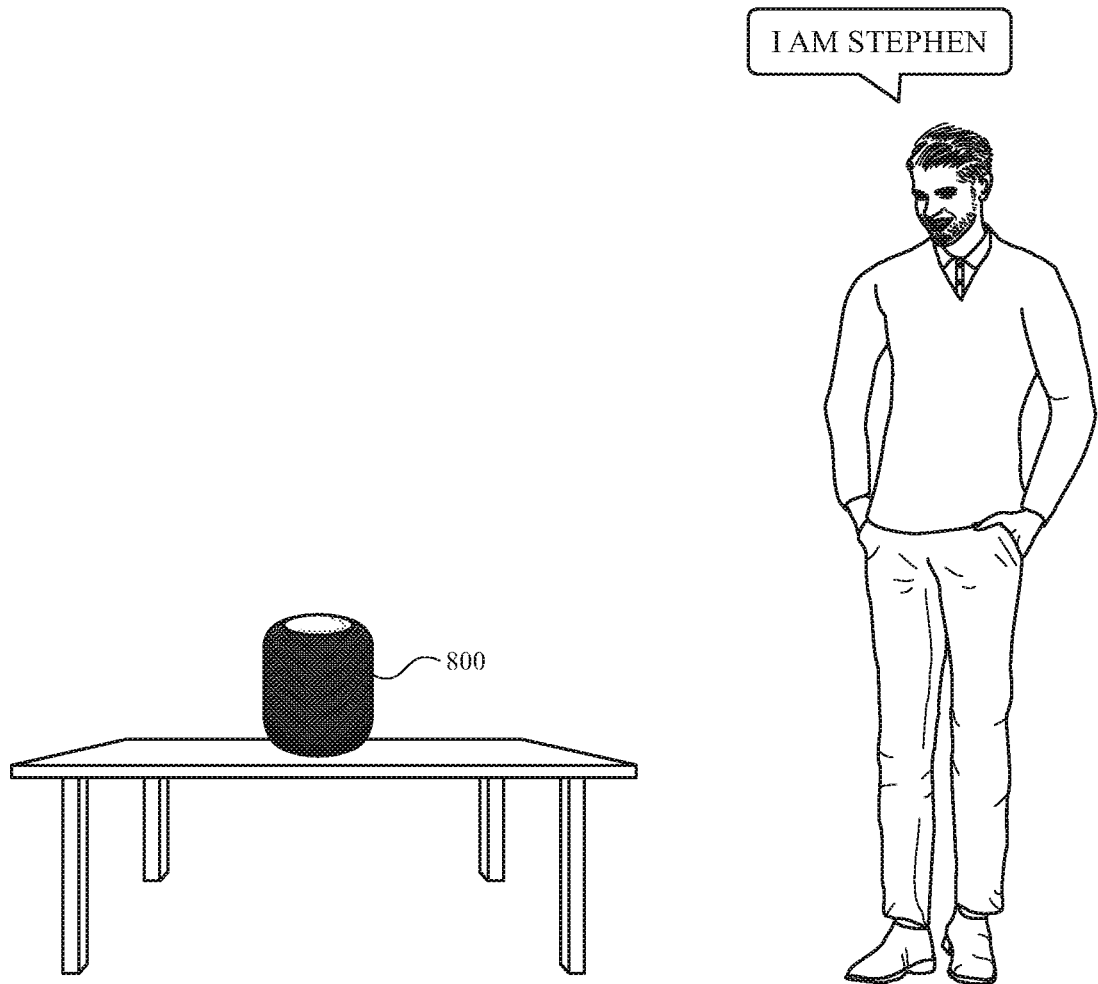
Figure 10C:
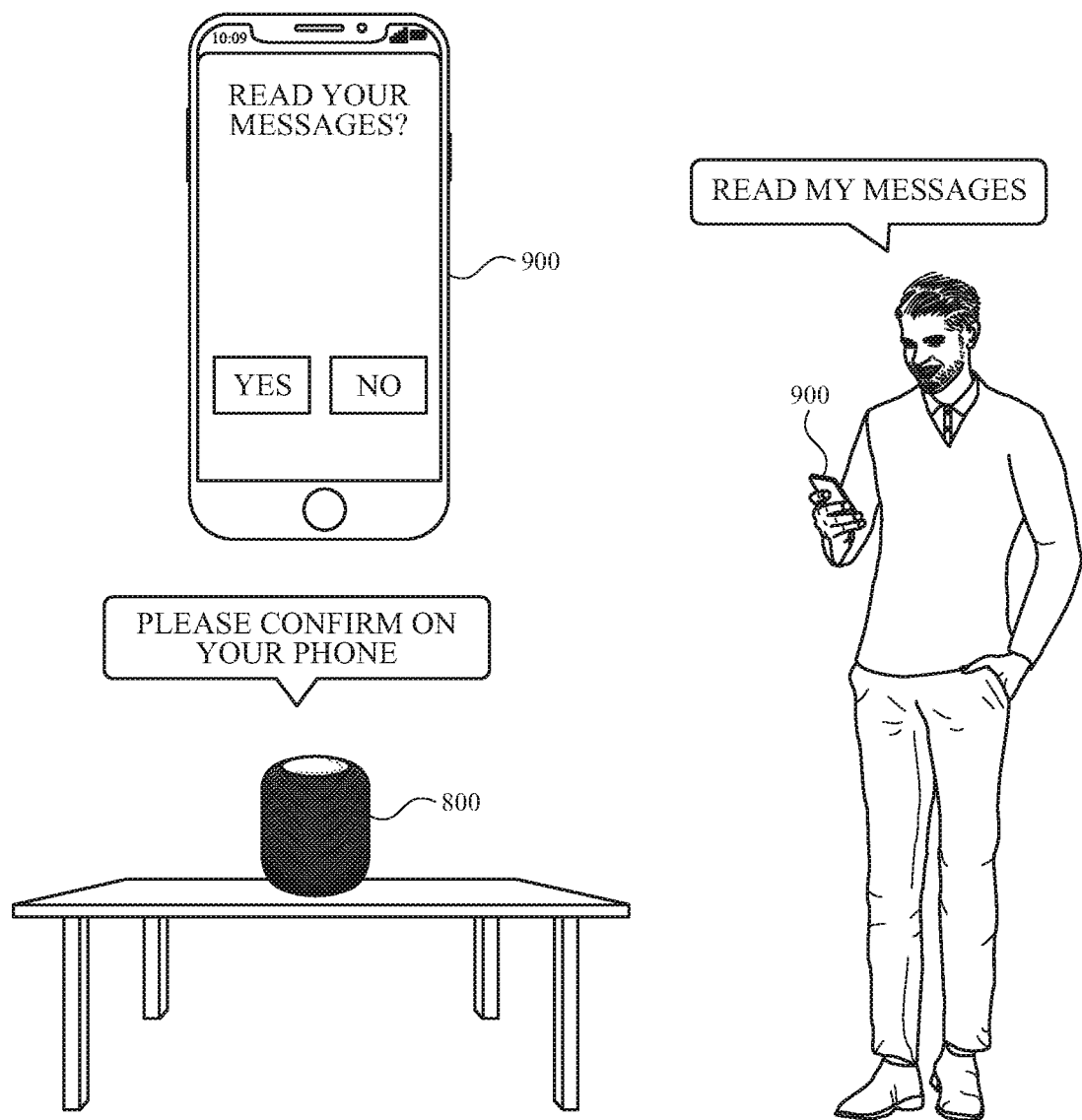
Figure 10D:
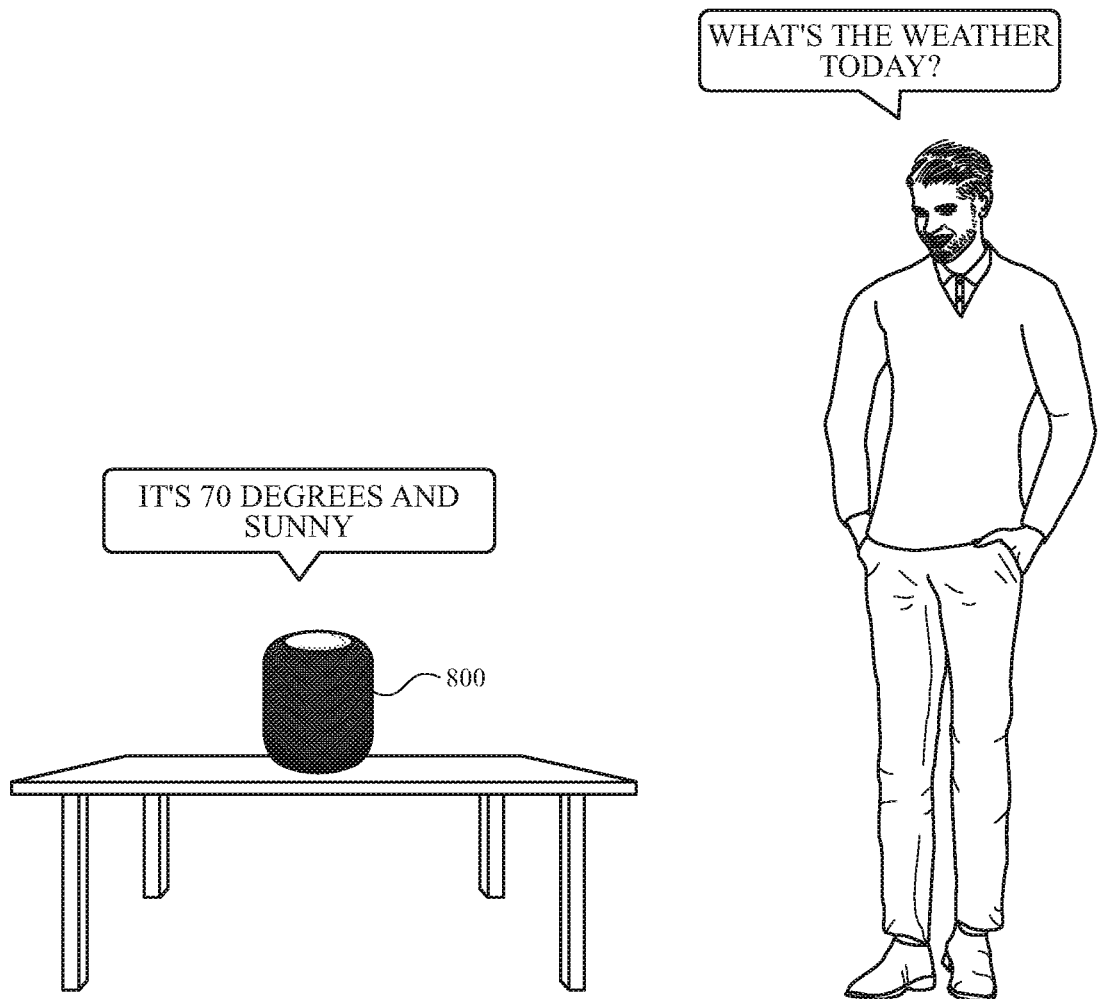
Figure 10E:
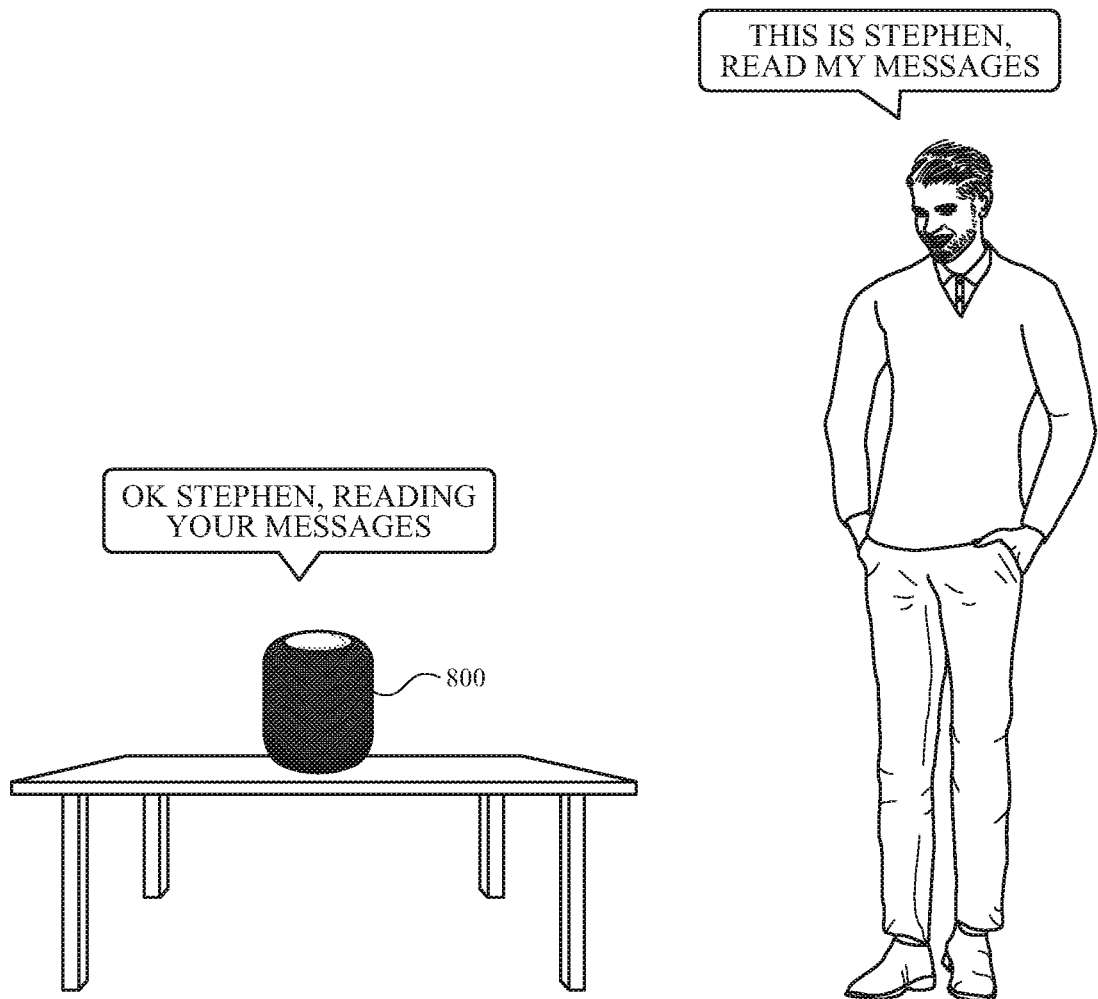
Figure 10F:

In some examples, providing an output indicative of a request for user identity includes causing an external electronic device to provide the output. In some examples, the output includes a confirmation request to confirm an action included in the initial speech input (e.g., reading messages). In some examples, device 800 further outputs a request for a user to confirm the confirmation request (e.g., via audio output or displayed output). For example, as shown in FIG. 10C, a user says "read my messages" to device 800. Device 800 then causes device 900 (e.g., the external electronic device associated with the user) to provide the displayed output "read your messages?" along with the selectable options "yes" and "no." Device 800 further outputs "please confirm on your phone."

In some examples, an external electronic device receives user confirmation of the confirmation request. In some examples, user confirmation of the confirmation request is received via a display of the external device (e.g., a user taps the selectable "Yes" option in FIG. 10C), via audio input at the external device a user responds "yes" to the request "read your messages?"), and/or via a button input at the external device. In some examples, the external device sends an indication of user confirmation of the confirmation request to another device. For example, device 900 sends an indication of user confirmation of the confirmation request to device 800, and device 800 receives the indication of user confirmation of the confirmation request.

In some examples, in accordance with receiving an indication of user confirmation of a confirmation request, device 800 determines that speech input corresponds to the user confirming the confirmation request. For example, after the user selects "yes" in FIG. 10C device 800 identifies the user who said "read my messages" (e.g., the user of device 900). In this manner, a user can confirm his or her identity using his or her external electronic device and device 800 can identify the user.

FIGS. 9A-F illustrate a flowchart of process 902 for responding to speech input, according to various examples. Process 902 is performed, for example, using devices 800 and/or 900, or using any component thereof. In some examples, process 902 is performed using a client-server system (e.g., 100) and the blocks of the process are divided up in any manner between the server (e.g., DA server 106) and one or more client devices (e.g., 800 and 900). Thus, while portions of process 902 are described herein as being performed by particular devices of a client-server system, it will be appreciated that the process is not so limited. In process 902, some blocks are, optionally, combined, the order of some blocks is, optionally, changed, and some blocks are, optionally, omitted. In some examples, additional steps may be performed in combination with process 902. For example, process 902 can include the additional step of device 800 receiving, from one or more external electronic devices, one or more speaker profiles for one or more users, as discussed above. In some examples, the additional step is performed before block 903, discussed below.

At block 903, device 800 receives a speech input.

At block 904, device 800 determines whether it has any registered users. As discussed, registered users are, for example, users having respective speaker profiles received by device 800. If device 800 does not have any registered users, device 800 provides a response to the speech input as described above in FIGS. 7A-C. If device 800 has one or more registered users, process 902 proceeds to block 905.

At block 905, device 800 determines, based on the speech input, whether to identify a user. In some examples, determining to identify a user includes determining that a user intent associated with the speech input includes a personal intent or a semi-personal intent. In some examples, determining to identify a user includes determining that the speech input includes one or more words indicative of personalization (e.g., using module 730 and/or 732). Exemplary words indicative of personalization include "my," "mine," "personal," "my own," "I," and the like. In some examples, determining not to identify a user includes determining that a user intent associated with the speech input includes a non-personal intent.

If device 800 determines not to identify a user, device 800 provides a non-personalized response to the speech input, as shown in block 953. A non-personalized response may be a response not determined based on the personal information of any user. For example, in FIG. 10D, a user asks device 800 "what's the weather today?". Device 800 determines based on the speech input not to identify a user and provides a non-personalized response to the speech input, "it's 70 degrees and sunny."

If device 800 determines to identify a user, process 902 proceeds to block 906. At block 906, device 800 determines whether the speech input includes a reference, such as a third-person reference, to an entity (e.g., using module 730 and/or 732). In some examples, a reference to an entity includes a name, such as a name of a registered user. For example, Stephen may say "read Stephen's messages." In some examples, a reference to an entity includes word(s) other than the entity's name such as "my mom," "my dad," "my boss," "his," "her," "their," and the like. In some examples, if the speech input includes a reference to an entity, process 902 proceeds to block 907. In some examples, if the speech input does not include a reference to an entity, process 902 proceeds to block 932.

At block 907, device 800 determines whether the speech input is associated with a predetermined category of intent (e.g., using natural language processing module 732). Exemplary predetermined categories of intents include intents of locating electronic devices (e.g., "where is Stephen's phone?"), getting directions to/from locations or finding locations (e.g., "take me to my sister's house," "where is Stephen's car?"), and providing weather information (e.g., "what's the weather at my mom's house?"). In some examples, if the speech input is associated with a predetermined category of intent, process 902 proceeds to block 932.

In some examples, if the speech input is associated with the predetermined category of intent, a digital assistant initiates a corresponding task based on the reference to an entity, e.g., if device 800 determines that the speech input corresponds to a user. For example, a parameter of a task initiated by task flow processing module 736 is based on the reference to the entity. For example, for the speech input "what's the weather at my mom's house?," a digital assistant performs the task of getting weather information, where the task has a parameter of {location=the identified user's mom's house}.

In some examples, if the speech input is not associated with a predetermined category, of intent, process 902 proceeds to block 908. At block 908, process 909 (a sub process of process 902) is performed.

Figure 9A:
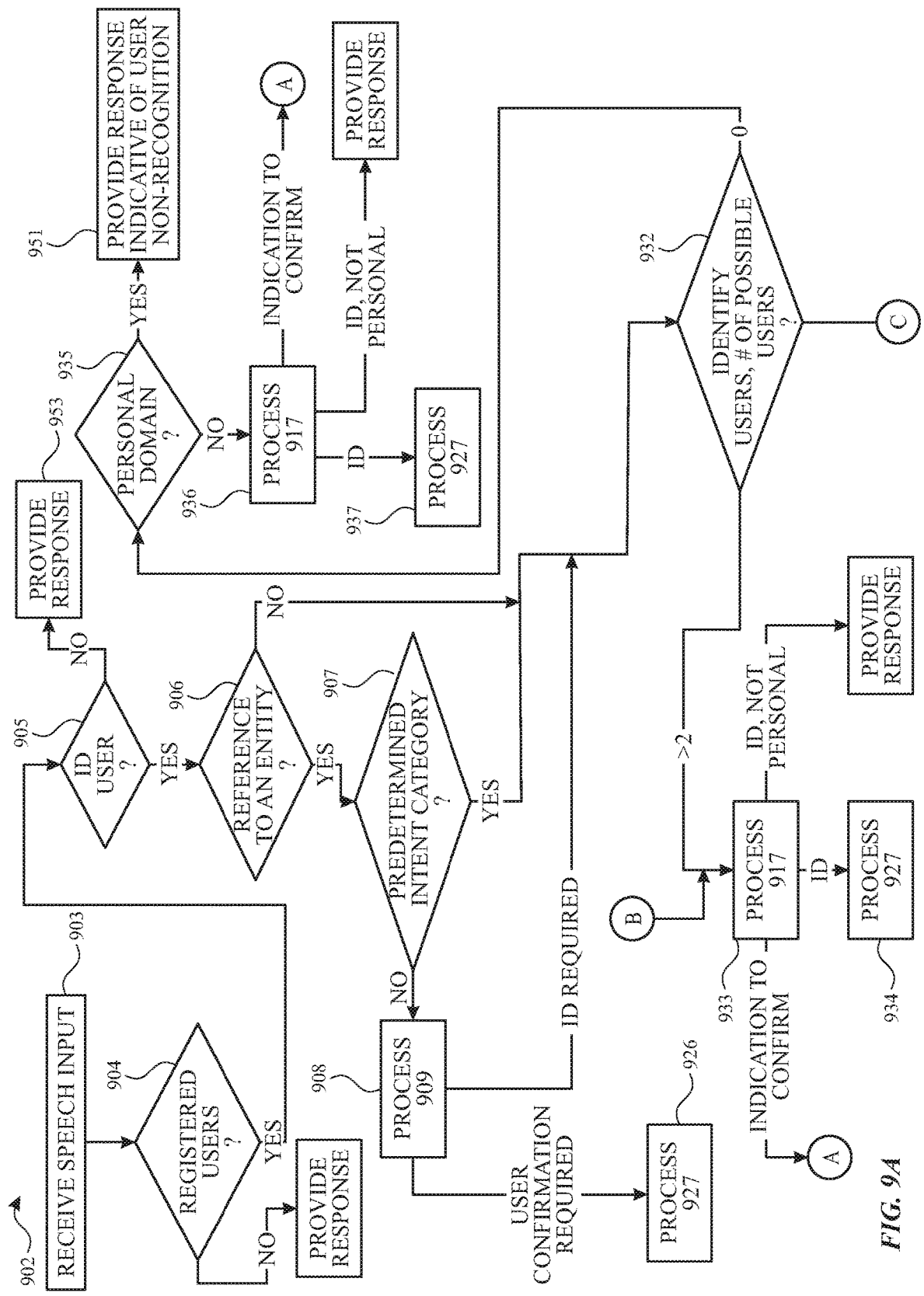
FIGS. 9A-F illustrate a flowchart of a process for responding to speech input, according to some examples.
Figure 9B:
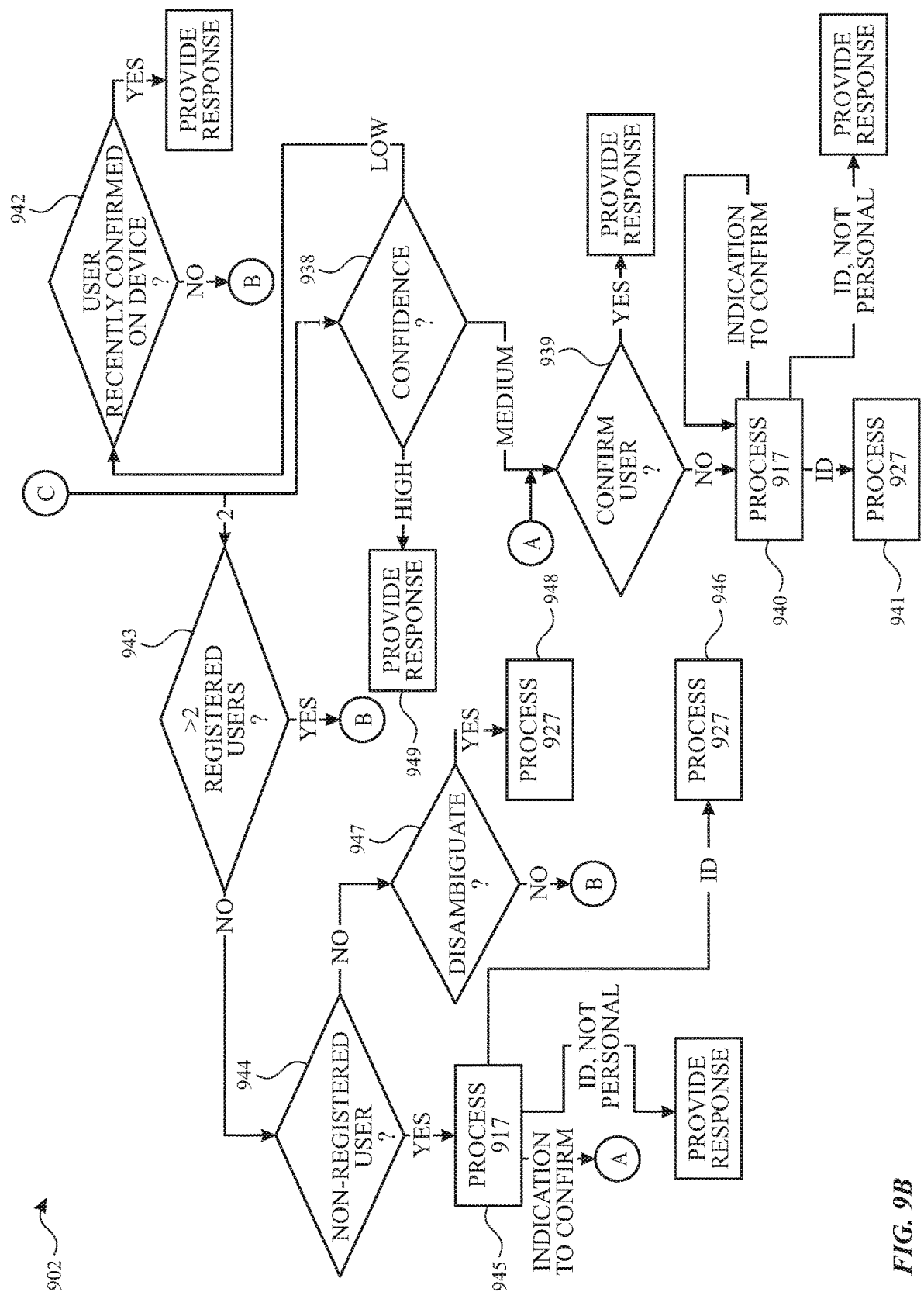
Figure 9C:
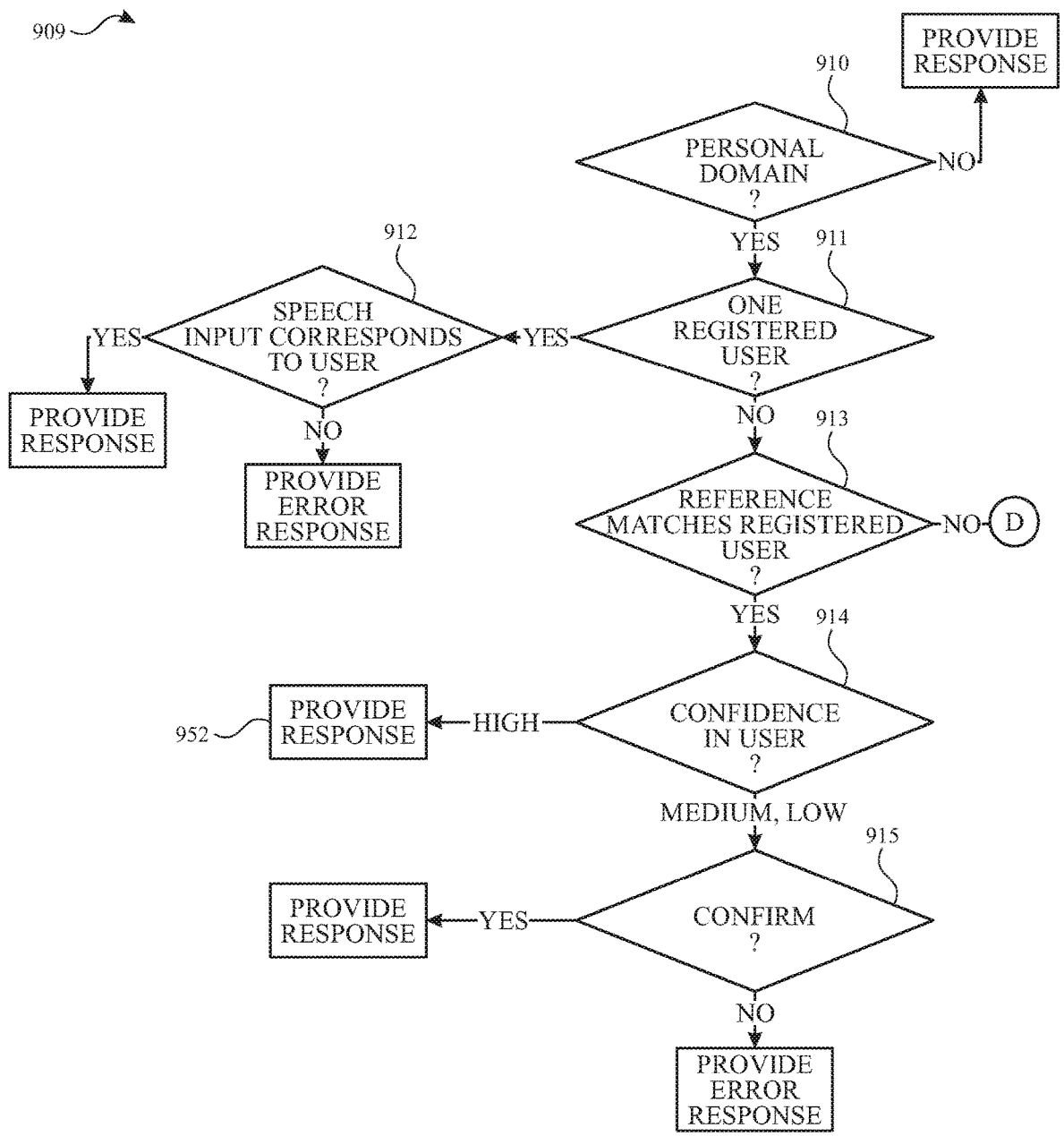
Figure 9D:
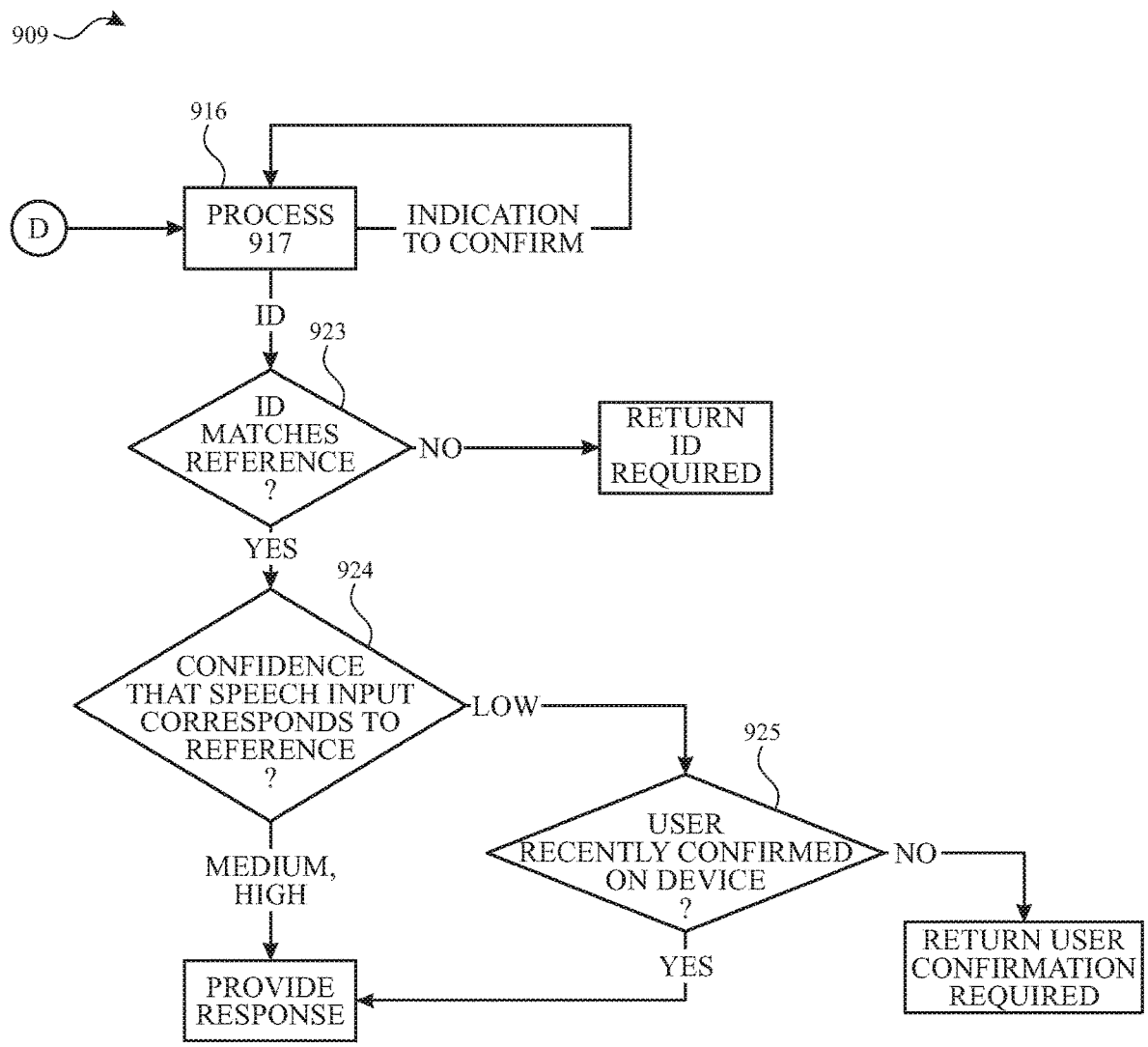

Turning to FIGS. 9C-D (process 909), at block 910, device 800 determines whether the speech input is associated with a personal domain. For example, using natural language processing module 732, device 800 determines a domain associated with the speech input and determines whether the domain is a personal domain or a non-personal domain. In some examples, a personal domain is associated with personal intents (e.g., actionable intents), as discussed above. Example personal domains include a messages domain (e.g., associated with intents of retrieving a user's message information), a phone domain (e.g., associated with intents of calling/messaging a user's contacts), a notes domain (e.g., associated with intents of retrieving/modifying a user's notes), a reminder domain, a calendar domain, a health domain (e.g., associated with intents of retrieving/modifying a user's health data), and a device location domain (e.g., associated with intents of locating a user's electronic devices). In some examples, a non-personal domain is associated with non-personal intents (e.g., actionable intents). Example non-personal domains include a media domain (e.g., associated with intents of providing/modifying media content) and a sports domain (e.g., associated with intents of providing sports information). In some examples, if the domain is a non-personal domain, device 800 provides a response to the speech input based on the determined domain, e.g., as discussed with respect to FIGS. 7A-C. In some examples, if the domain is a personal domain, process 909 proceeds to block 911.

At block 911, device 800 determines whether there is only one registered user (e.g., only has received a speaker profile for one user). In some examples, if there is only one registered user, process 909 proceeds to block 912. In some examples, if there is not only one registered user, process 909 proceeds to block 913.

At block 912, device 800 determines whether the speech input corresponds to the only one user. For example, according to the above discussed techniques, device 800 determines a degree of confidence (e.g., high, medium, low) that the speech input corresponds to the only one user. In some examples, if the degree of confidence is high or medium, device 800 determines that the speech input corresponds to the only one user. In some examples, if the degree of confidence is low, device 800 determines that the speech input does not correspond to the only one user. In some examples, if device 800 determines that the speech input corresponds to the only one user, device 800 provides a response to the speech input. For example, suppose Stephen is the only registered user of device 800 and says "read Stephen's messages" to device 800. Device 800 determines high confidence that the speech corresponds to Stephen and thus provides Stephen's messages.

If device 800 determines that the speech input does not correspond to the only one user, device 800 provides a response indicative of an error (e.g., audio output, displayed output). For example, device 800 provides a response indicative of user non-recognition (e.g., "I'm not sure who you are," "Sorry I can't do that"). In this manner, if Stephen is the only registered user, and a non-registered user says "read Stephen's messages" to device 800, device 800 does not undesirably provide Stephen's messages.

Turning to block 913, device 800 determines whether the reference to the entity included in the speech input matches a name of any registered user (e.g., using module 730 and/or 732). If the reference matches a name of a registered user, process 909 proceeds to block 914. If the reference does not match a name of a registered user, process 909 proceeds to block 916.

At block 914, device 800 determines a confidence that the speech input corresponds to the registered user that matches the reference to the entity. For example, according to the above discussed techniques, device 800 determines a degree of confidence that the speech input corresponds to the registered user. If the confidence is high, device 800 provides a response to the speech input, as shown by block 952. For example, in FIG. 10E, Stephen says "this is Stephen, read my messages" to device 800. Device 800 determines a high confidence that the speech input corresponds to Stephen, and thus provides Stephen's messages.

If the confidence is medium or low, process 909 proceeds to block 915. At block 915, device 800 requests a user to confirm his or her identity, and determines whether a response to the request corresponds to the user. In some examples, if device 800 determines that the response corresponds to the user (e.g., confirms the user), device 800 provides a response to the speech input. For example, if Stephen responds "Yes" to device 800's request "are you Stephen?", device 800 provides a response personalized for Stephen, such as providing Stephen's messages. In some examples, if device 800 determines that the response does not correspond to the user (e.g., does not confirm the user), device 800 provides a response indicative of an error (e.g., "Sorry I can't do that").

Figure 9E:
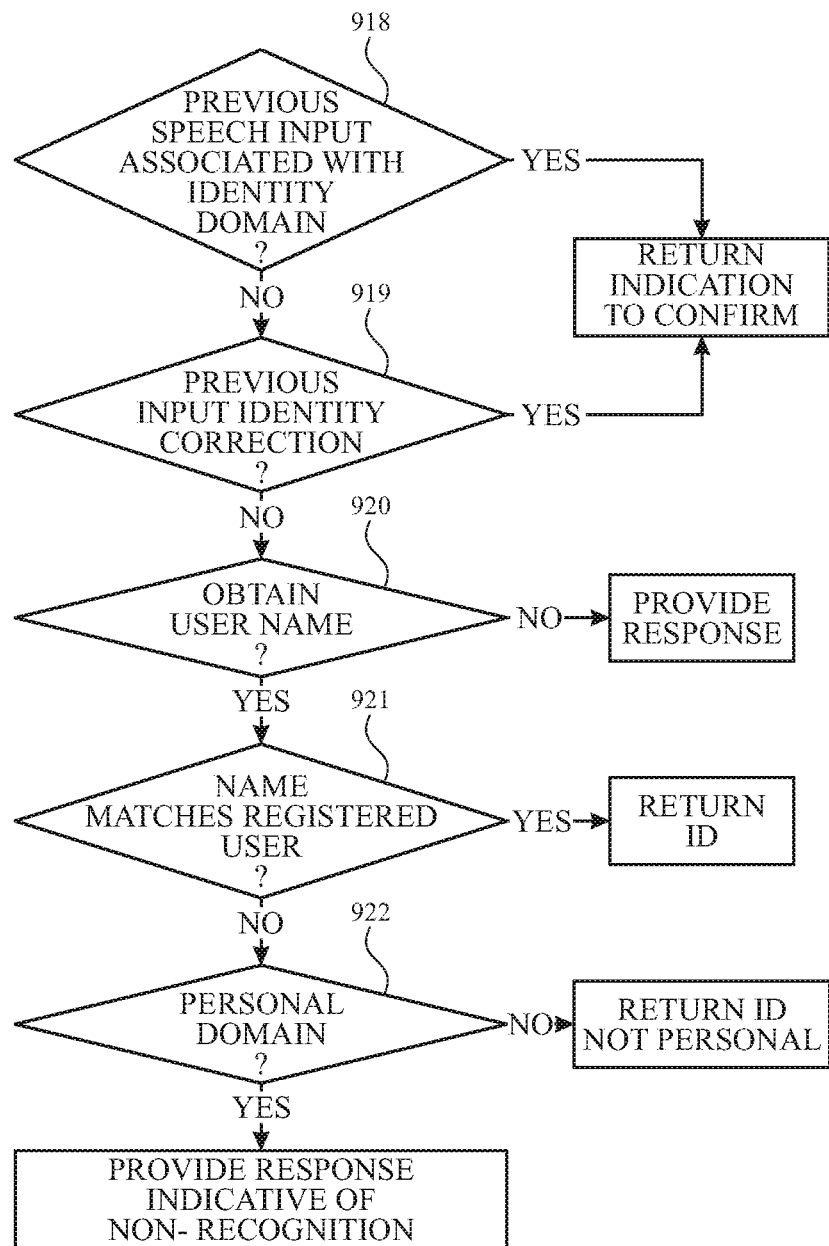

At block 916, process 917 (a sub process of process 902) is performed. Turning to FIG. 9E (process 917), at block 918, device 800 determines whether a previous input (e.g., previous to the speech input at block 903) is associated with an identity domain. In some examples, the previous input is the second most recent user input, with the speech input in block 903 being the most recent. An identity domain is associated with actionable intents of identifying a user and/or asking for a user's identity, for instance. For example, an input of "who am I?" and an input of "I am [name]" (e.g., provided responsive to device 800 outputting "please tell me who you are") are each associated with an identity domain.

In some examples, if the previous input is associated with an identity domain, process 917 returns an indication to confirm a user. In some examples, if process 917 returns an indication to confirm a user, device 800 then requests a user to confirm his or her identity (e.g., asks "are you [name]?"), as discussed above. In some examples, the name is determined based on the previous input, as device 800 knows the user's name because the device recently identified the user based on the previous input. In some examples, if a user confirms his or her identity, device 800 determines the user's identity (e.g., name). For example, if Jessica previously said "I am Jessica" to device 800, the device can ask "this is Jessica right?" (instead of "who is this?") responsive to a current speech input. If Jessica replies "yes," device 800 determines Jessica's identity. In this manner, device 800 may not undesirably ask for the user's identity again, as the user may have just identified him/herself.

If the previous input is not associated with an identity domain, process 917 proceeds to block 919. At block 919, device 800 determines whether the previous input includes an identity correction. For example, device 800 determines whether the previous input is associated with a user intent of correcting a user's identity. For example, suppose in a previous user-device interaction, device 800 incorrectly identified Jessica, e.g., responded "ok Stephen reading your messages" to Jessica's speech input "read my messages." Jessica may thus provide the input "no I'm Jessica."

If the previous input includes an identity correction, process 917 returns an indication to confirm a user, as discussed above.

If the previous input does not include an identity correction, process 917 proceeds to block 920. At block 920, device 800 provides an output requesting a user to identify him/herself, e.g., "could you please tell me who you are?". At block 920, device 800 further receives a speech input responsive to the output (e.g., "I am Jessica") and determines whether the speech input includes a name, as discussed above. If the speech input does not include a name (or otherwise does not indicate a user's identity), device 800 provides a response to the speech input. For example, if device 800 asks "please tell me who you are" and a user says "never mind," device 800 can output "okay" and cease responding to the user.

If the speech input includes a name, process 917 proceeds to block 921. At block 921, device 800 determines whether the name matches a name of a registered user. If the name matches the name of a registered user, process 917 returns an identification of the registered user. For example, if Jessica says "I am Jessica," and Jessica is a registered user, process 917 returns an identification of Jessica.

If the name does not match the name of a registered user, process 917 proceeds to block 922. At block 922, device 800 determines whether the speech input (received at block 903) is associated with a personal domain, as discussed above. In some examples, if the request is not associated with a personal domain, process 917 returns an identification of the name (e.g., the name not matching the name of the registered user) and an indication that the speech input is not associated with a personal domain.

If the speech input is associated with a personal domain, device 800 provides a response indicative of user non-recognition (e.g., "Sorry, not sure who you are").

Returning to FIGS. 9C-D (process 909), if block 916 returns an indication to confirm a user, process 917 repeats without performing blocks 918, 919, and/or 920. For example, process 917 proceeds directly to block 921, where device 800 determines whether a confirmed name Jessica confirmed her name by replying "yes" to device 800 asking "this is Jessica right?") matches a name of a registered user.

If block 916 returns an identification of a registered user, process 909 proceeds to block 923. At block 923, device 800 determines whether the identification of the registered user matches the reference to the entity included in the speech input (e.g., received at block 903). If the obtained identification of the registered user does not match the reference, process 909 returns an indication that user identification based on the speech input is required and that a digital assistant should initiate a task based on the reference.

As an example of process 902 thus far, suppose Jessica asks "read Nancy's messages," where Nancy is not a registered user of device 800. Device 800 thus asks "could you please tell me who you are?", to which Jessica responds "I am Jessica" (e.g., process 917). Device 800 determines that "Jessica" does not match "Nancy." For example, Jessica is requesting her messages from Nancy. Device 800 thus determines whether the speech input "read Nancy's messages" corresponds to Jessica, and if so, initiates a task of providing Jessica's messages from Nancy.

If the obtained identification of the registered user matches the reference to the entity, process 909 proceeds to block 924. At block 924, device 800 determines a degree of confidence that the speech input received at block 920 (e.g., "I am [name]") corresponds to the reference to the entity included in the speech input received at block 903.

If the degree of confidence is medium or high, device 800 provides a response to the speech input received at block 903.

If the degree of confidence is low, process 909 proceeds to block 925. At block 925, device 800 determines whether the user whose name included in the speech input received at block 920 has recently confirmed his/her identity using his/her external electronic device, as discussed above. For example, device 800 determines whether the user has confirmed his/her identity within a predetermined duration (e.g., 5, 10, 15, 30, 60 seconds, 2 minutes, 5 minutes) before the speech input received at block 920 or block 903.

If the user has not recently confirmed his/her identity using his/her external electronic device, process 909 returns an indication that user confirmation is required. As discussed below with respect to FIG. 9F, if user confirmation is required, device 800 may attempt to confirm the user's identity using the user's external electronic device. For example, suppose that Jessica says "read Harry's messages" to device 800, where Harry is not a registered user of device 800. Device 800 thus asks "could you please tell me who you are?", to which Jessica responds "I am Harry." For example, Jessica is impermissibly trying to access Harry's messages, not trying to access her own messages from Harry. Device 800 determines a low confidence that the speech input "I am Harry" corresponds to Harry and further determines that Harry has not recently confirmed his identity using his external device. Device 800 may thus cause Harry's external device to ask "read your messages?", to which Harry can respond "no." In this manner, a user (e.g., Jessica) may not undesirably access another user's personal information (e.g., Harry's messages).

If the user has recently confirmed his/her identity using his/her external electronic device, device 800 provides a response to the speech input received at block 903.

Returning to FIGS. 9A-B (process 902), if process 909 returns an indication that user identification based on the speech input is required, process 902 proceeds to block 932, discussed below.

If process 909 returns an indication that user confirmation is required, process 902 proceeds to block 926. At block 926, process 927 (a sub process of process 902) is performed.

Figure 9F:
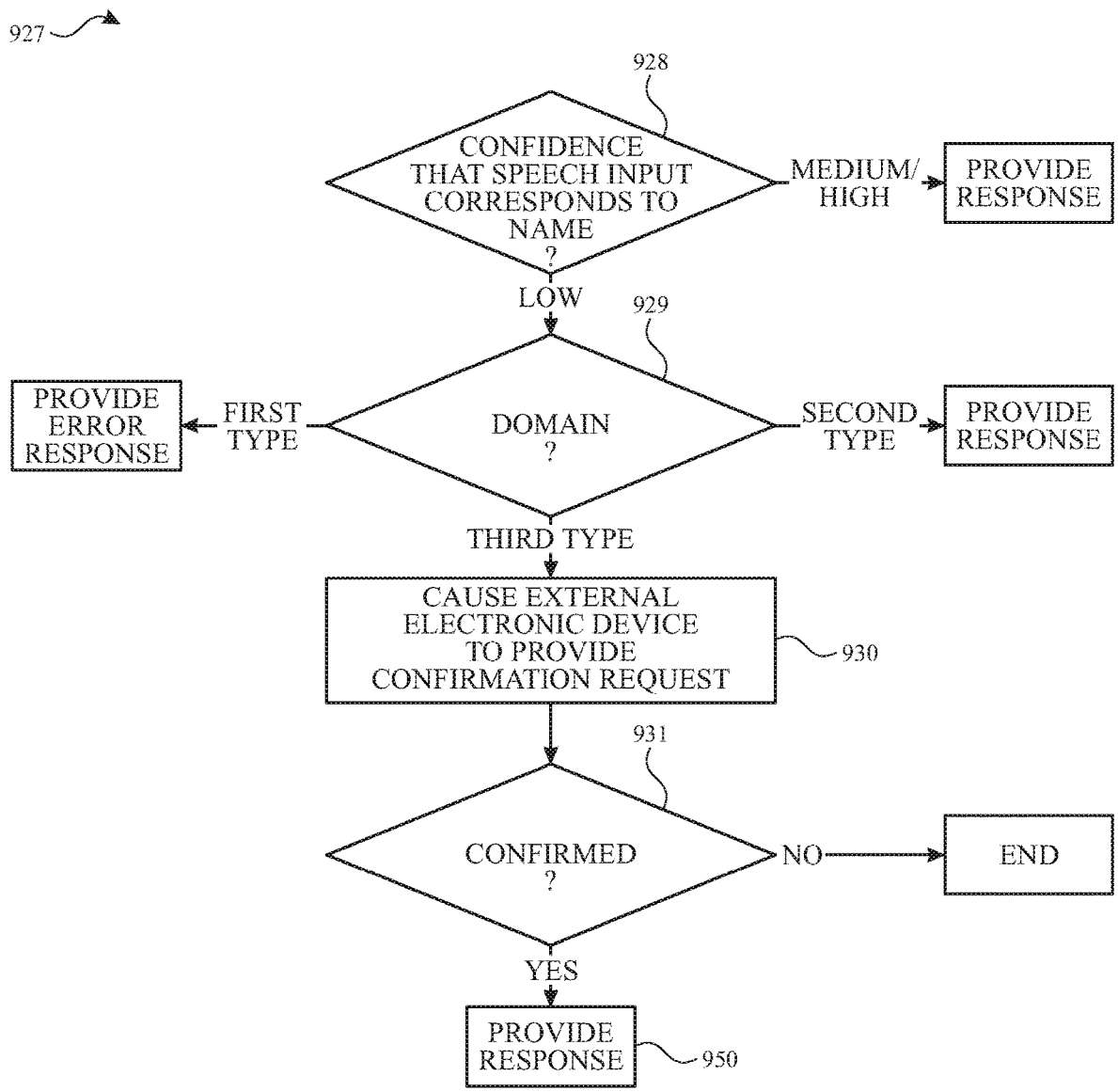

Turning now to FIG. 9F (process 927), at block 928, device 800 determines a degree of confidence that a speech input corresponds to a name (e.g., a user having the name). In some examples, the speech input is the speech input received at block 903. In some examples, the speech input is a speech input provided responsive to a request for user identity (e.g., at block 920). In some examples, device 800 determines the name based on the speech input responsive to the output indicative of a request for user identity received at block 920, e.g., "I am [name]."

If the degree of confidence that the speech input corresponds to the name is medium or high, device 800 provides a response to the speech input received at block 903.

If the degree of confidence that the speech input corresponds to the name is low, process 927 proceeds to block 929. At block 929, device 800 determines a domain associated with the speech input received at block 903. In some examples, if the domain is a domain of a first type, such as a device location domain, device 800 provides a response indicative of an error. For example, device 800 provides a response indicative of user non-recognition such as, "I'm sorry that doesn't sound like you." In some examples, if the domain is a domain of a second type, such as a domain associated with actionable intents of providing media content, device 800 provides a response to the speech input received at block 903 (e.g., provides media content). In some examples, if the domain is a domain of a third type, such as a personal domain, process 927 proceeds to block 930.

At block 930, device 800 causes an external electronic device to provide a confirmation request, as discussed above. In some examples, the external electronic device is the device associated with the name in block 928, e.g., associated with the user having the name.

At block 931, device 800 determines whether a user has confirmed the confirmation request. For example, device 800 determines whether it has received an indication of user confirmation of the confirmation request. If the user has confirmed the confirmation request, a response to the speech input received at block 903 is provided, as shown in block 950. In some examples, device 800 provides the response. In some examples, the external electronic device provides the response. For example, suppose Jessica says "read my messages" to device 800 and then confirms the confirmation request "read your messages?" on her phone. Device 800 and/or Jessica's phone may then provide Jessica's messages.

If the user has not confirmed the confirmation request (e.g., responds "no" to the confirmation request or otherwise dismisses the request), process 927 (and 902) ends. For example, device 800 does not provide any further response to the speech input received at block 903.

Returning to FIGS. 9A-B, at block 932, device 800 identifies one or more users corresponding to the speech input received at block 903. For example, device 800 determines respective likelihoods that the speech input corresponds to each registered user and/or a likelihood that the speech input corresponds to a non-registered user. In some examples, at block 932, device 800 further determines based on the determined likelihoods, a degree of confidence that the speech input corresponds to each user of the registered users and/or a degree of confidence that the speech input corresponds to a non-registered user. In some examples, at block 932, device 800 determines a number of possible users corresponding to the speech input. In some examples, at block 932, it is determined whether the difference between the first likelihood and the second likelihood is less than a first threshold.

In some examples, device 800 determines that there are more than two possible users. For example, device 800 determines that it has at least high or medium confidence that the speech input corresponds to each of the more than two users and/or that the more than two users cannot be distinguished from each other.

In some examples, device 800 determines that there are two (e.g., exactly two) possible users. For example, device 800 determines that it has at least high or medium confidence that the speech input corresponds to each of the two users and/or that the two users cannot be distinguished from each other.

In some examples, device 800 determines that there is one (e.g., exactly one) possible user. For example, device 800 determines that (1) it has the highest confidence that the speech input corresponds to the one user, (2) it has at least medium or high confidence that the speech input corresponds to the one user, and/or (3) the one user can be distinguished from other users. As another example, device 800 determines that the one user is the only user for which a likelihood is determined.

In some examples, device 800 determines that there are no possible users (e.g., that the speech input does not correspond to any user). For example, device 800 determines that it has low confidence that the speech input corresponds to any user of the registered users.

If device 800 determines that there are more than two possible users, process 902 proceeds to block 933. At block 933, process 917 is performed, as discussed above. If process 917 returns an indication to confirm a user, process 902 proceeds to block 939, discussed below. If process 917 returns an identification of a name and an indication that the speech input is not associated with a personal domain, device 800 provides a response to the speech input.

If process 917 returns an obtained identification of a registered user, process 902 proceeds to block 934 (process 927, discussed above). For example, suppose Stephen says "Hey Siri, read my messages" to device 800. Device 800 determines that more than two possible users correspond to the speech input. Device 800 then asks "could you please tell me who you are?", to which Stephen responds "I am Stephen." Device 800 determines a high confidence that "I am Stephen" corresponds to Stephen (block 928) and thus provides Stephen's messages.

If device 800 determines that there are no possible users, process 902 proceeds to block 935. At block 935, device 800 determines whether the speech input received at block 903 is associated with a personal domain. If the speech input is associated with a personal domain, device 800 provides an output indicative of user non-recognition, as shown in block 951. For example, in FIG. 10F, a non-registered user says "read my messages" to device 800. Device 800 responds "I'm not sure who you are, you'll have to do that on your phone."

If the speech input is not associated with a personal domain, process 902 proceeds to block 936 (process 917, discussed above). If block 936 returns an indication to confirm a user, process 902 proceeds to block 939, discussed below. If block 936 returns an identification of a name and an indication that the speech input is not associated with a personal domain, device 800 provides a response to the speech input.

If block 936 returns an obtained identification of a registered user, process 902 proceeds to block 937 (process 927, discussed above).

If device 800 determines that there is one possible user, process 902 proceeds to block 938. At block 938, device 800 determines whether a degree of confidence that the speech input received at block 903 corresponds to the one user is high, medium, or low.

If the confidence that the speech input corresponds to the one user is high, device 800 provides a response to the speech input, as shown in block 949. For example, suppose Jessica says "remind me to pick up groceries tomorrow" and device 800 determines that Jessica is the only possible user and has high confidence that the speech input corresponds to Jessica. Device 800 thus creates a reminder entry of "pick up groceries tomorrow" in Jessica's reminders and outputs "ok Jessica, I'll remind you."

If the confidence that the speech input corresponds to the one user is medium, process 902 proceeds to block 939. At block 939, device 800 requests a user to confirm his or her identity. For example, device 800 asks "are you [name]?", where [name] is the name of the one user. At block 939, device 800 further determines whether a response to the request corresponds to the user (e.g., confirms the user). For examples, device 800 determines whether the response includes an affirmative or negative response.

If the device confirms the user, device 800 provides a response to the speech input received at block 903. For example, suppose Jessica says "remind me to pick up groceries tomorrow" and device 800 determines that Jessica is the only possible user and has medium confidence that the speech input corresponds to Jessica. Device 800 then asks "you are Jessica right?", to which Jessica replies "yes." Device 800 thus creates a reminder entry of "pick up groceries tomorrow" in Jessica's reminders and outputs "ok Jessica, remind you."

If the user does not confirm his or her name, process 902 proceeds to block 940 (process 917, discussed above). In some examples, if the user does not confirm his or her name, device 800 provides an output indicative of an apology (e.g., "Sorry I must have misidentified you").

If block 940 returns an indication to confirm a user, block 940 repeats without performing blocks 918, 919, and/or 920. For example, as discussed above, device 800 determines whether the name corresponding to a request for a user to confirm his/her name in process 917 matches the name of a registered user (block 921). For example, suppose Jessica says "read my voice mails" to device 800. Device 800 (incorrectly) determines that Stephen is the only possible user corresponding to the speech input and has medium confidence that the speech input corresponds to Stephen. Device 800 then asks "you are Stephen right?", to which Jessica replies "no." Device 800 then determines that Jessica previously told device 800 that she was Jessica and thus asks "you are Jessica right?" (e.g., process 917 returns an indication to confirm a user). Jessica replies "yes" and device 800 then determines whether Jessica is the name of a registered user (block 921).

If block 940 returns an identification of a name and an indication that the speech input is not associated with a personal domain, device 800 provides a response to the speech input received at block 903. For example, suppose a non-registered user Joe says "play my music" to device 800. Device 800 (incorrectly) determines that Stephen is the only possible user corresponding to the speech input and has medium confidence that the speech input corresponds to Stephen. Device 800 then asks "you are Stephen right?", to which Joe replies "no." Device 800 then asks "please tell me who you are," to which Joe replies "I am Joe." Device 800 determines that Joe is not a registered user and that the speech input "play my music" is not associated with a personal domain. Device 800 thus plays music (e.g., music from a default account associated with the device, discussed below).

If block 940 returns an obtained identification of a registered user, process 902 proceeds to block 941 (process 927), discussed above. For example, suppose Jessica says "read my voice mails" to device 800. Device 800 (incorrectly) determines that Stephen is the only possible user corresponding to the speech input and has medium confidence that the speech input corresponds to Stephen. Device 800 then asks "you are Stephen right?", to which Jessica replies "no." Device 800 then asks "could you please tell me who you are?", to which Jessica replies "I am Jessica." Device 800 determines high confidence that the speech input "I am Jessica" corresponds to Jessica. Device 800 thus provides Jessica's voicemails.

If the confidence that the speech input corresponds to the one user is low, process 902 proceeds to block 942. At block 942, device 800 determines whether the one user has recently confirmed his/her identity using his/her external electronic device. For example, device 800 determines whether the one user has recently confirmed his/her identity using his/her external electronic device within a predetermined duration (e.g., 5, 10, 15, 30, 60 seconds, 2 minutes, 5 minutes) before the speech input received at block 903. If the one user has recently confirmed his/her identity, device 800 provides a response to the speech input. For example, suppose Jessica asks device 800 "what is my credit card balance?". Device 800 determines that Jessica is the only possible user, but has low confidence that the speech input corresponds to Jessica. However, device 800 determines that Jessica has recently confirmed her identity using her external electronic device. Device 800 thus provides the response "your credit card balance is $200," for example.

If the one user has not recently confirmed his or her identity, process 902 proceeds to block 933 discussed above.

If device 800 determines that there are two possible users, process 902 proceeds to block 943. At block 943, device 800 determines whether there are more than two registered users. If there are more than two registered users, process 902 proceeds to block 933.

If there are not more than two registered users, process 902 proceeds to block 944. At block 944, device 800 determines whether a non-registered user is a user of the two possible users.

If device 800 determines that a non-registered user is a user of the two possible users, process 902 proceeds to block 945 (process 917). If block 945 returns an indication to confirm a user, process 902 proceeds to block 939. If block 945 returns an identification of a name and an indication that the speech input is not associated with a personal domain, device 800 provides a response to the speech input. If block 945 returns an obtained identification of a registered user, process 902 proceeds to block 946 (process 927).

If device 800 determines that a non-registered user is not a user of the two possible users, in some examples, process 902 proceeds to block 947. In other examples, process 902 proceeds to block 945.

At block 947, device 800 provides an output requesting user disambiguation between the two possible users and receives a response to the output. In some examples, the output includes the name of the two possible users. At block 947, device 800 further determines whether the response disambiguates between the two possible users. For example a response including "[name]," where [name] is the name of one of the two possible users, disambiguates between the two possible users.

If the response does not disambiguate between the two possible users, process 902 proceeds to block 933. For example, process 902 proceeds to block 933 when "[name]" is not the name of one of the two possible users, or the response does not otherwise disambiguate between the users. For example, suppose Corey asks device 800 "find my phone." Device 800 incorrectly determines that Jessica and Stephen are two possible users corresponding to the speech input. Device 800 thus asks "whose phone, Jessica's or Stephen's," to which Corey replies "neither." Device 800 may thus ask "could you please tell me who you are?" (block 920 in process 917).

If the response does disambiguate between the two possible users, process 902 proceeds to block 948 (process 927, discussed above). For example, suppose Stephen asks device 800 "find my phone." Device 800 determines that Stephen and Jessica are two possible users corresponding to the speech input. Device 800 thus asks "whose phone, Stephen's or Jessica's?", to which Stephen responds "Stephen." Device 800 may thus provide the location of Stephen's phone, e.g., output "Stephen, your phone is at your office."

5. Providing Personalized Media Content

Figure 11A:
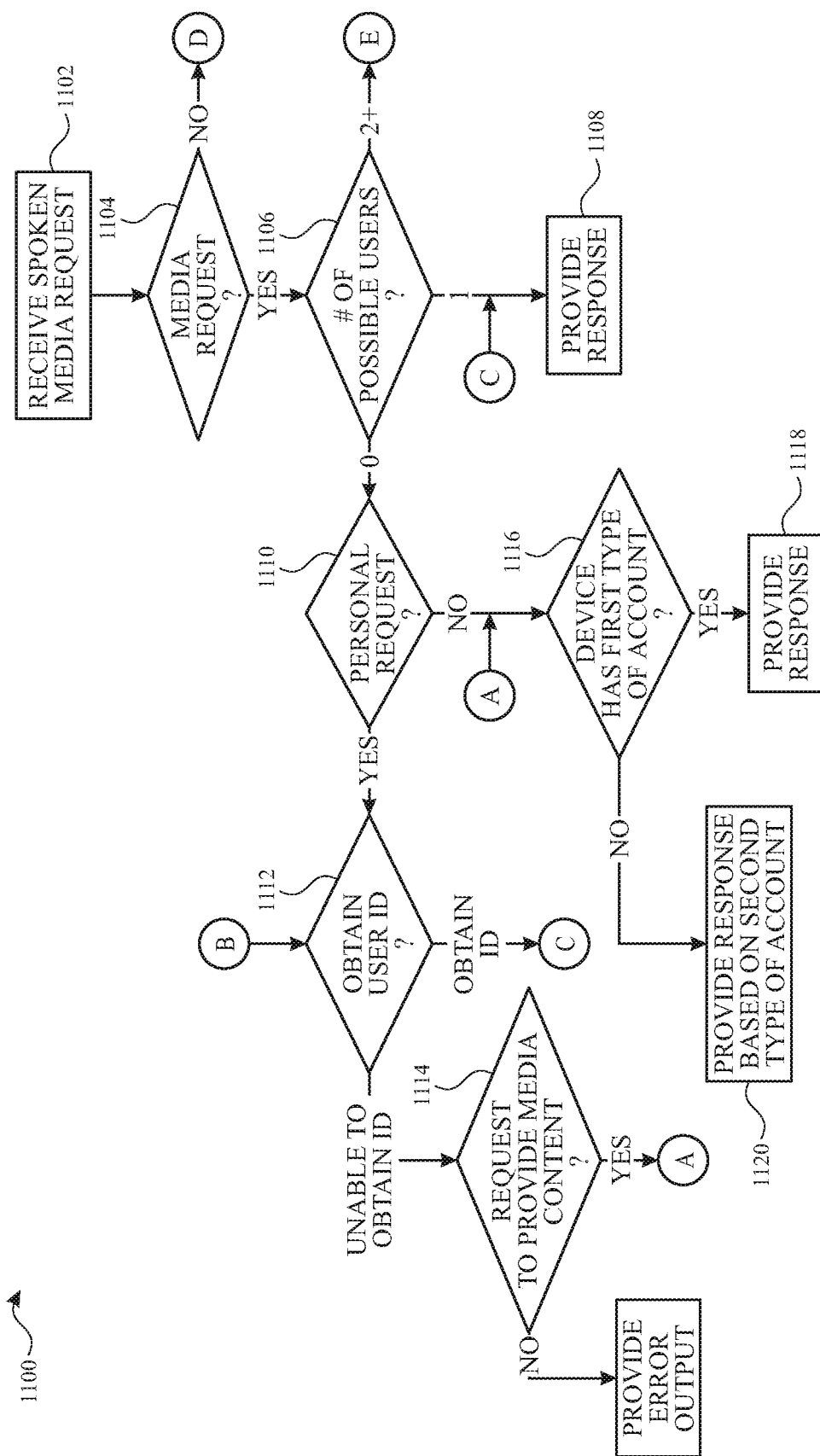
FIGS. 11A-B illustrate a flowchart of a process for providing media content, according to some examples.
Figure 11B:
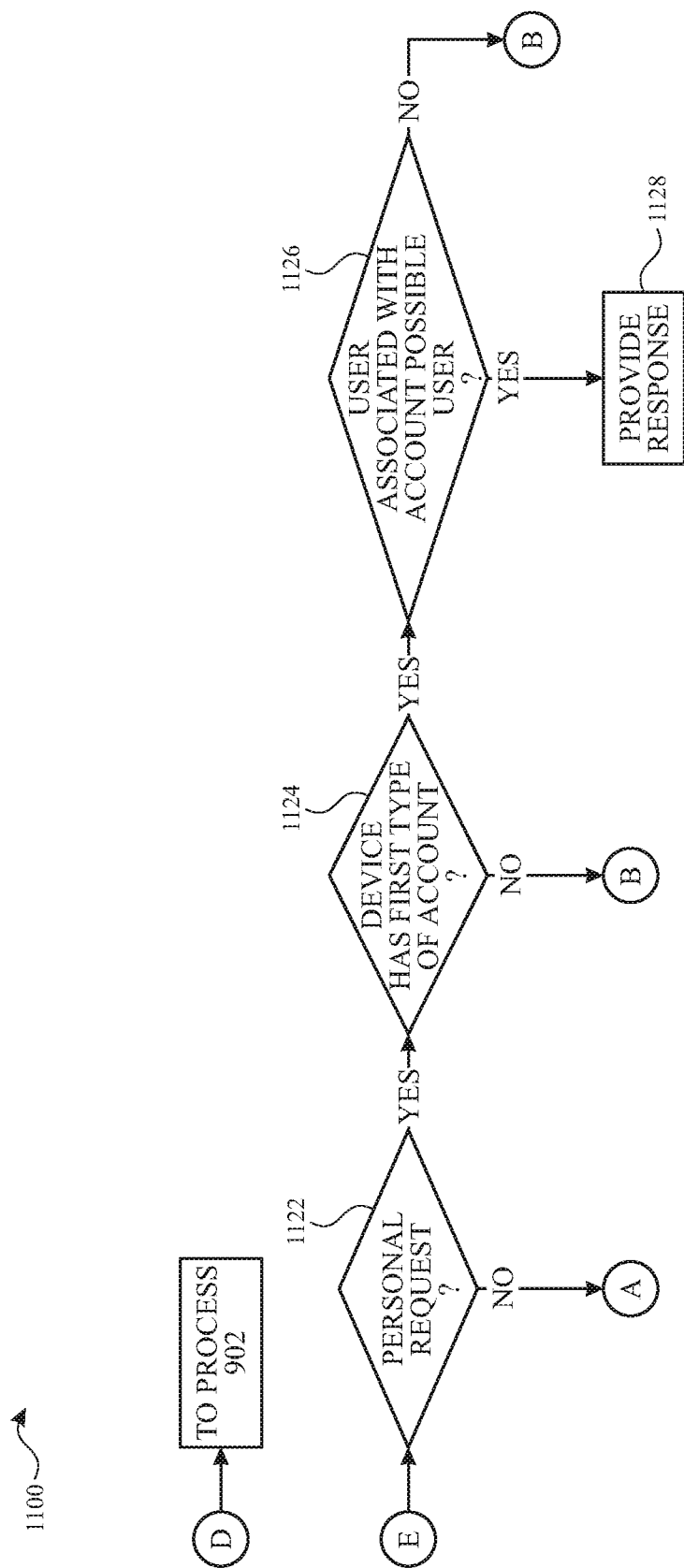

FIGS. 11A-B illustrate a flowchart of process 1100 for providing media content, according to some examples. Process 1100 is performed, for example, using devices 800 and/or 900, or using any component thereof. In some examples, process 1100 is performed using a client-server system (e.g., 100) and the blocks of the process are divided up in any manner between the server (e.g., DA server 106) and one or more client devices (e.g., 800 and 900). Thus, while portions of process 1100 are described herein as being performed by particular devices of a client-server system, it will be appreciated that the process is not so limited. In process 1100, some blocks are, optionally, combined, the order of some blocks is, optionally, changed, and some blocks are, optionally, omitted. In some examples, additional steps may be performed in combination with process 1100.

At block 1102, device 800 receives a spoken request. In some examples, a spoken request includes a spoken media request for media content, such as songs, albums, artists, videos, books, news, podcasts, playlists, radio stations, and the like. Exemplary requests for media content include "play my music," "play Shake it off by Taylor Swift," "play the workout playlist," "what's the news?" "play sad music," "play Jessica's music," "play This American Life," "switch to NBC news," "play my favorite radio station," and the like. In some examples, a spoken media request includes a request to modify a user's media content, such as to purchase media content, add/remove media content to/from a media collection (e.g., playlist), switch a content provider (e.g., news provider), subscribe to a content provider, like or dislike media content, or otherwise modify media content associated with a user.

In some examples, a spoken media request includes a name of a user (e.g., registered user). In some examples, the name is different from the name of the user who provided the spoken media request. For example, Stephen in FIG. 8 may say "play Jessica's music." In this manner, a user of device 800 may request media content associated with other registered users of the device.

In some examples, a spoken media request includes a name of a media collection. In some examples, the media collection is associated with a user different from the user who provided the spoken media request. For example, if Jessica (a registered user) has a playlist titled "workout" and Stephen does not, Stephen may say "play the workout playlist." In this manner, a user of device 800 may request media collections associated with other users.

At block 1104, device 800 determines whether the spoken request includes a media request. For example, device 800 determines using module 732 whether the spoken request corresponds to a media domain, e.g., a domain associated with the actionable intents of providing and/or modifying media content. If device 800 determines that the spoken request includes a media request (e.g., corresponds to a media domain), process 1100 proceeds to block 1106. If device 800 determines that the spoken request does not include a media request (e.g., does not correspond to a media domain), the spoken request is processed as discussed above with respect to FIGS. 9A-F.

At block 1106, device 800 determines a number of possible users corresponding to the spoken request according to the techniques discussed above. For example, device 800 determines whether a user, of a plurality of registered users, corresponds to the spoken request. In some examples, device 800 determines that a first user (e.g., exactly one user) of the plurality of registered users corresponds to the spoken request. For example, device 800 determines that it is highly confident the spoken request corresponds to the first user, has distinguished the first user from other registered users, and is most confident that the spoken request corresponds to the first user. In accordance with determining that the first user corresponds to the spoken request, process 1100 proceeds to block 1108.

At block 1108, device 800 provides a response to the spoken request. In some examples, the response is personalized for the identified user (first user). In some examples, the response to the spoken request includes one or more words indicative of personalization for the identified user. For example, the response includes a name of the identified user and/or words such as "just for you," "your," "your personal," and the like.

Figure 10G:
Figure 10H:
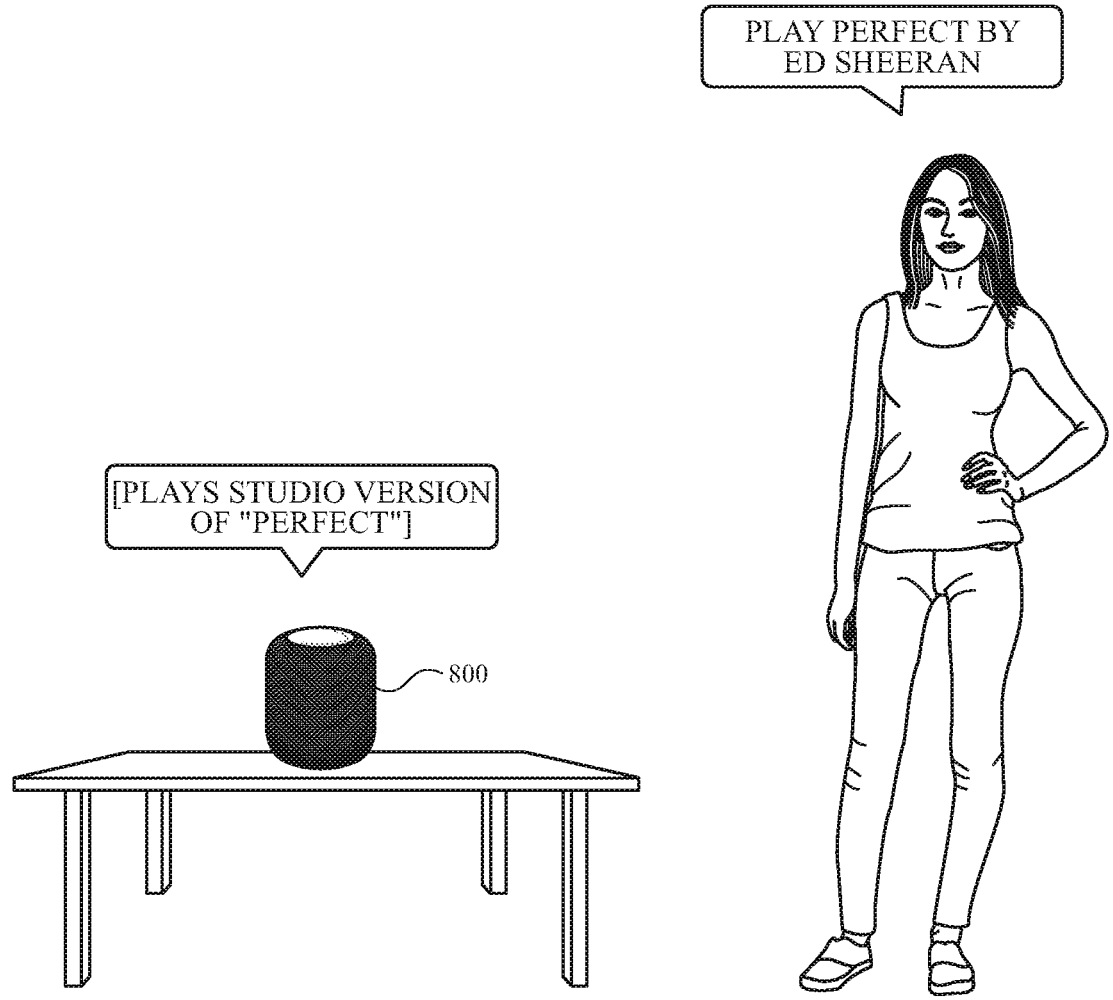

In some examples, a response to a spoken request includes playback of a media item from a media account associated with a user (e.g., personal media account). A media account associated with a user includes media content belonging to that user. In some examples, the media account is associated with the identified user. For example, as shown in FIG. 10G, Jessica says "play Perfect by Ed Sheeran" and device 800 identifies Jessica. Device 800 thus plays a version of the song "Perfect" included in Jessica's personal media account, the live version.

In some examples, providing a response to a spoken request includes updating a media account. In some examples, the media account is associated with the identified user. In some examples, updating a media account includes modifying a user's media content, as discussed above. For example, if Jessica says "add Shake it off to my workout playlist," device 800 adds the song to Jessica's workout playlist. As another example, if Jessica says "subscribe to This American Life," device 800 updates Jessica's personal media account to subscribe to the podcast "This American Life."

In some examples, updating a media account includes updating a media preference (e.g., of the identified user) based on the spoken request. A media preference indicates various user-specific media preferences such as liked/disliked media content, liked/disliked media genres, play counts for media content, skipped media content, and the like, for instance. A user's media preference can be used to provide media preferred by the user (e.g., when the user is identified). For example, if Jessica says "play Shake it off by Taylor Swift," device 800 can increment Jessica's play count for the song "Shake it off," update Jessica's media preference to indicate a preference for pop music, and/or update the media preference to indicate a preference for Taylor Swift. Thus, the next time Jessica requests media content, device 800 can provide media content based on Jessica's updated preferences (e.g., bias media content towards pop music).

In some examples, updating a media preference includes updating a content provider preference based on the spoken request. A content provider preference indicates a content provider (e.g., news source, website) preferred by a user. For example, while device 800 provides media content from a first content provider (e.g., Fox News), Jessica requests to switch to a second content provider (e.g., says "switch to CNN"). Device 800 then indicates that the content provider has been switched (e.g., outputs "ok here's some news from CNN" and/or provides news from CNN). In some examples, device 800 further updates Jessica's content provider preference to be the second content provider. In this manner, when Jessica subsequently requests the news, device 800 provides the news from the updated content provider (e.g., CNN).

In some examples, a response to a spoken request includes playback of a media item associated with a user different from the user who provided the spoken request. In some examples, device 800 obtains the media item from a media account associated with the different user. For example, if Stephen says "play Jessica's music," and device 800 identifies Stephen, device 800 obtains and provides media content from Jessica's media account.

In some examples, a response to a spoken request includes playback of a media item from a media collection associated with a user different from the user who provided the spoken request. In some examples, device 800 obtains the media item from the media collection associated with the different user. For example, if Stephen says "play the workout playlist," and Jessica is the only registered user with a playlist titled "workout," device 800 plays media content from Jessica's "workout" playlist.

As discussed, the present disclosure contemplates allowing a user to access media content associated with other users. Thus, it may be desirable for device 800 to select a correct media account (associated with a correct user) from which to provide media content. Example techniques for selecting a media account are now discussed.

In some examples, selecting a media account includes determining whether requested media content matches media content in a media account or media database. For example, using the STT processing techniques discussed with respect to FIGS. 7A-C, device 800 determines a score indicating a degree to which a spoken request (or portion thereof) matches media content in a media account. If the score is high (e.g., greater than a threshold), device 800 determines that the requested media is in the media account and/or provides the best matching media content from the media account. If the score is low (e.g., less than a threshold), device 800 determines that the requested media is not in the media account and/or does not provide media content from the media account. In some examples, words representing the media content (e.g., song names, artist names, playlist names, subscribed podcast names, news provider names, and the like) of media accounts associated with registered users are included in vocabulary index 744. In some examples, STT processing module 730 uses the vocabulary to determine the score, as discussed with respect to FIGS. 7A-C.

In some examples, device 800 first determines whether requested media content matches media content in the identified user's media account (personal media account). For example, device 800 determines a score as discussed above. In some examples, if the score is high, device 800 determines that the requested media content is in the identified user's media account and provides the requested media content from the account. In some examples, if the score is low, device 800 determines that the requested media content is not in the identified user's media account and does not provide the requested media content from the account. For example, the score determined for Jessica's spoken request "play Shake it off by Taylor Swift" may be high because Jessica's personal media account includes the song "Shake it off" by Taylor Swift.

In some examples, device 800 determines whether requested media content matches media content in a media database not associated with any particular user. In some examples, a media database includes a large amount of media content available through a media provider such as Apple Music by Apple Inc., Spotify®, SoundCloud, and the like. In contrast, a media account associated with a particular user includes a limited amount of media content, such as media content selected by the user, for instance. In some examples, device 800 determines whether requested media content matches content in a media database (e.g., by determining a score as discussed) in accordance with determining that the requested media content is not in the identified user's account. In this manner, device 800 may first determine whether an identified user's personal media account includes requested content, and if not, then determine whether a larger media database includes such content. For example, if Jessica says "play Hello by Adele," and Jessica's personal account does not include the song "Hello," device 800 can provide (e.g., stream) the song from a media database.

In some examples, device 800 determines whether requested media content matches media content in a default media account associated with device 800. In some examples, a default media account is a media account associated with a registered user of device 800 and is user designated during a set-up process for device 800. In some examples, a default account is subscribed to a media provider so that media content provided by the media provider is available to (e.g., included in) the default account. In some examples, device 800 determines whether requested media content matches media content in the default media account in accordance with determining that the requested media content is not in the identified user's media account and/or not in a media database. For example, device 800 determines media content in the default account that best matches the requested media content and provides the best matching media content.

In some examples, device 800 determines whether requested media content matches media content in a media account other than the identified user's media account (other media account). In some examples, the other media account is a personal media account associated with another registered user of device 800. In some examples, device 800 determines whether requested media content is in another media account in accordance with determining that the requested media content is not in the identified user's media account and/or not in a media database. For example, if Jessica requests an album not in her media account and not in a media database, but another registered user's account includes the album, device 800 can provide the album.

In some examples, a spoken request includes a name of a user (e.g., "play Stephen's workout playlist"). In some examples, in accordance with determining that a spoken request includes a name of a user, device 800 determines whether requested media content matches media content in a media account associated with that user. In this manner, users may request media content from both their own media accounts and from media accounts of other registered users. For example, if Jessica says "play Stephen's workout playlist," device 800 can provide media content from Stephen's workout playlist.

Returning to block 1106, in some examples, device 800 determines that no user of the plurality of registered users corresponds to the spoken request. For example, according to the above discussed techniques, device 800 determines a low confidence that any user of the registered users corresponds to the spoken request. In some examples, in accordance with determining that no user of the plurality of registered users corresponds to the spoken request, device 800 forgoes updating any media preference of any user based on the spoken request.

At block 1110, in accordance with determining that no user of the plurality of registered users corresponds to the spoken request, device 800 determines whether the spoken request includes a personal request (e.g., personal media request). In some examples, a personal request includes a request for which device 800 should be highly confident that the request corresponds to a particular user to perform an associated task. Exemplary personal requests include "add this to my playlist," "purchase this song," "subscribe to this podcast," "play my music," "play my favorite playlist," and the like. In some examples, determining that a spoken requests includes a personal request includes determining that the spoken request includes a request to modify a user's media content. In some examples, determining that a spoken request includes a personal request includes determining that the spoken request includes one or more words indicative of personalization. Exemplary words indicative of personalization include a registered user's name, pronouns such as "me," "my," "mine," "his," "her," and words such as "personal," "personalized," "just for me," and "favorite." In some examples, determining that a spoken request includes a personal request includes determining that the spoken request is associated with a predetermined type of user intent (e.g., personal intent, semi-personal intent), as discussed above.

At block 1112, in accordance with determining that the spoken request includes a personal request, device 800 obtains an identification of a user who provided the spoken request. For example, device 800 uses any of the above discussed techniques (other than identifying the user based on the spoken request) to obtain an identification of the user. For example, device 800 provides an output indicative of a request for user identity, such as "who are you?". In some examples, in response to providing the output indicative of the request for user identity, device 800 receives a speech input, such as "I am Jessica." In some examples, device 800 obtains the identification of the user (e.g., Jessica) based on the speech input according to the above discussed techniques.

In some examples, in accordance with obtaining the identification, device 800 provides a response to the spoken request, as shown in block 1108. In some examples, the response is personalized for the identified user.

In some examples, device 800 is unable to obtain an identification of a user who provided the spoken user request. For example, a user may not respond to device 800's output indicative of a request for user identity within a predetermined duration. In some examples, device 800 determines that the user who provided the spoken user request is not a registered user. For example, a non-registered user Bob says "I am Bob" responsive to device 800 outputting "who are you?". In some examples, in accordance with being unable to obtain an identification of a user and/or determining that the user is not a registered user, process 1100 proceeds to block 1114.

At block 1114, device 800 determines whether the spoken request includes a request to provide media content (e.g., using module 732), such as to provide a song, video, podcast, playlist, and the like. In some examples, in accordance with determining that the spoken request includes a request to provide media content, process 1100 proceeds to block 1116, discussed below. In some examples, in accordance with determining that the spoken request does not include a request to provide media content, device 800 provides an output indicative of an error, e.g., "sorry I can only do that for registered users." example, if device 800 determines that the spoken request includes a request to modify a user's media content (not to provide media content), device 800 provides an output indicative of an error.

At block 1116, in accordance with determining that the spoken request does not include a personal request, device 800 determines whether a media account of a first type (e.g., default account) is associated with the device. In some examples, in accordance with determining that a media account of a first type is associated with the device, device 800 provides a response to the spoken request, as shown in block 1118. In some examples, the response is based on the media account of the first type. For example, device 800 provides the media content from a default account that best matches media content requested by the spoken request. For example, in FIG. 10H, a non-registered user says "Play Perfect by Ed Sheeran" (a non-personal request) to device 800. Device 800 thus provides a version (e.g., studio version) of the song "Perfect" from a default account associated with the device.

At block 1120, in accordance with determining that a media account of the first ype is not associated with the electronic device, device 800 provides a response to the spoken request. In some examples, the response is based on a media account of a second type different from the first type. In some examples, the second type of media account is a fallback account different from a default account. In some examples, a fallback account is selected by device 800 (or by a media provider) from the media accounts of the registered users and is the same account for every spoken request. In some examples, a fallback account is subscribed to a media provider (e.g., Apple Music by Apple Inc.) so that media content provided by the media provider is available to the fallback account. For example, if device 800 is not associated with a default account, device 800 provides media content from a fallback account that best matches the spoken request.

In some examples, the spoken request requests media content not in a default account. In such examples, device 800 provides media content from a fallback account if media content in the fallback account matches the requested media content, e.g., even if the device has a default account. For example, if a user says "play Poker Face by Lady Gaga" and a default account associated with device 800 does not include the song, device 800 still provides the song from the fallback account.

In some examples, device 800 is not associated with a default account. In such examples, device 800 can provide media content from a fallback account that best matches the spoken request (e.g., process 1100 proceeds from block 1110 to block 1120 without performing blocks 1116 or 1118). In some examples, device 800 provides media content from a media account associated with a most recently identified user, e.g., when device 800 determines that no registered user corresponds to the spoken request and that the spoken request does not include a personal request. In some examples, device 800 provides media content from a media account associated with a most frequently identified user, e.g., when device 800 determines that no registered user corresponds to the spoken request and that the spoken request does not include a personal request.

Returning to block 1106, in some examples, device 800 determines that a plurality of users (possible users) of the plurality of registered users correspond to the spoken request. For example, according to the above discussed techniques, device 800 determines high confidence that the spoken request corresponds to each of the possible users and/or that the possible users cannot be distinguished from each other.

In some examples, at block 1122, in accordance with determining that a plurality of users correspond to the spoken request, device 800 determines whether the spoken request includes a personal request according to the above discussed techniques. In some examples, in accordance with determining that the spoken media request does not include a personal request, process 1100 proceeds to block 1116, discussed above.

At block 1124, in accordance with determining that the spoken media request includes a personal request, device 800 determines whether it is associated with a media account of a first type (e.g., default account). In some examples, in accordance with determining that device 800 is not associated with a media account of the first type, process 1100 proceeds to block 1112, discussed above.

At block 1126, in accordance with determining that device 800 is associated with a media account of the first type, device 800 determines whether a user associated with the media account of the first type is a possible user. In some examples, in accordance with determining that the user associated with the media account of the first type is a possible user, device 800 provides a response to the spoken request, as shown in block 1128. In some examples, the response to the spoken request is based on the media account of the first type. For example, device 800 provides, from the media account of the first type, media content best matching the spoken request. For example, suppose Jessica says "play my music" and device 800 cannot distinguish Jessica from other registered users. However, device 800 determines that Jessica is a possible user corresponding to the spoken request. Thus, device 800 provides media content from Jessica's personal media account.

In some examples, in accordance with determining that the user associated with the media account is not a possible user, process 1100 proceeds to block 1112, discussed above.

In some examples, device 800 is not associated with a media account of the first type. In such examples, device 800 may determine whether a user associated with a media account of a second type (e.g., fallback account) is a possible user and/or provide a response to the spoken request based on the media account of the second type, analogous to the above discussed techniques.

In some examples where device 800 is not associated with a media account of the first type, in accordance with determining that the spoken request includes a personal request (block 1122), device 800 determines whether a most recently identified user or a most frequently identified user is a possible user. In some examples, in accordance with determining that a most recently identified user is a possible user, device 800 provides a response to the spoken request based on a media account associated with the most recently identified user. In some examples, in accordance with determining that a most frequently identified user is a possible user, device 800 provides a response based on a media account associated with the most frequently identified user. For example, suppose Jessica says "add this song to my workout playlist" and device 800 cannot distinguish Jessica from other registered users. However, device 800 determines that Jessica is a possible user and that Jessica is the most frequently identified user. Thus, device 800 adds a currently playing song to Jessica's workout playlist.

6. Obtaining Information to Provide a Personalized Response

As discussed, one aspect of the present technology includes providing responses personalized for an identified user. Exemplary techniques to obtain information to provide personalized responses (e.g., personal information) are now discussed.

Figure 12:
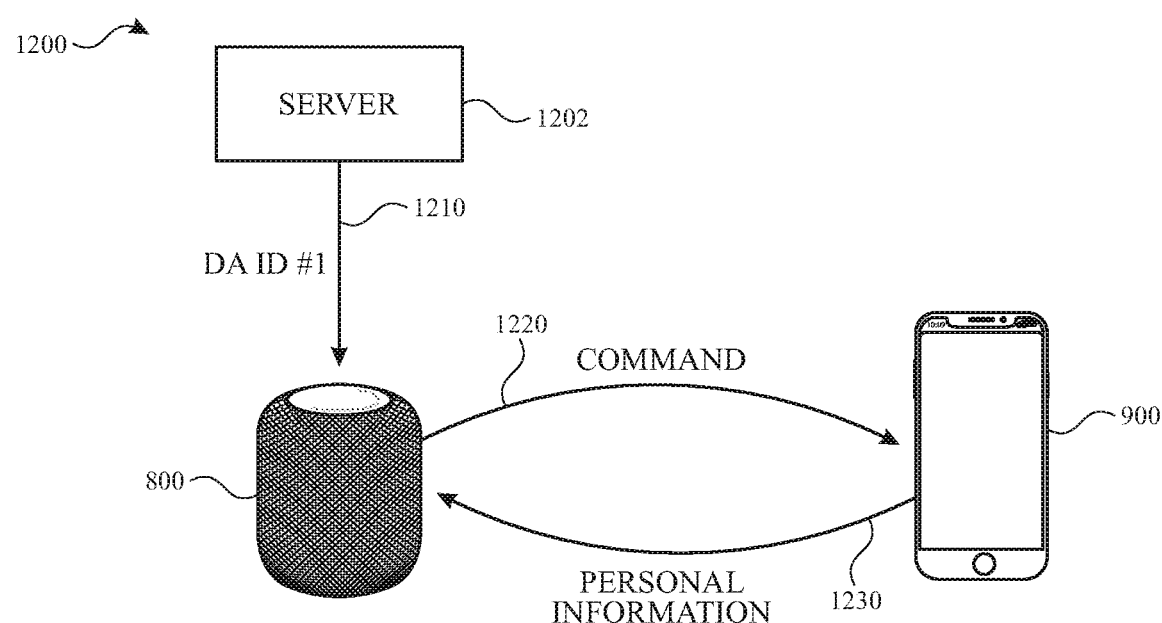
FIG. 12 illustrates an exemplary system for obtaining personal information.
Figure 13A:
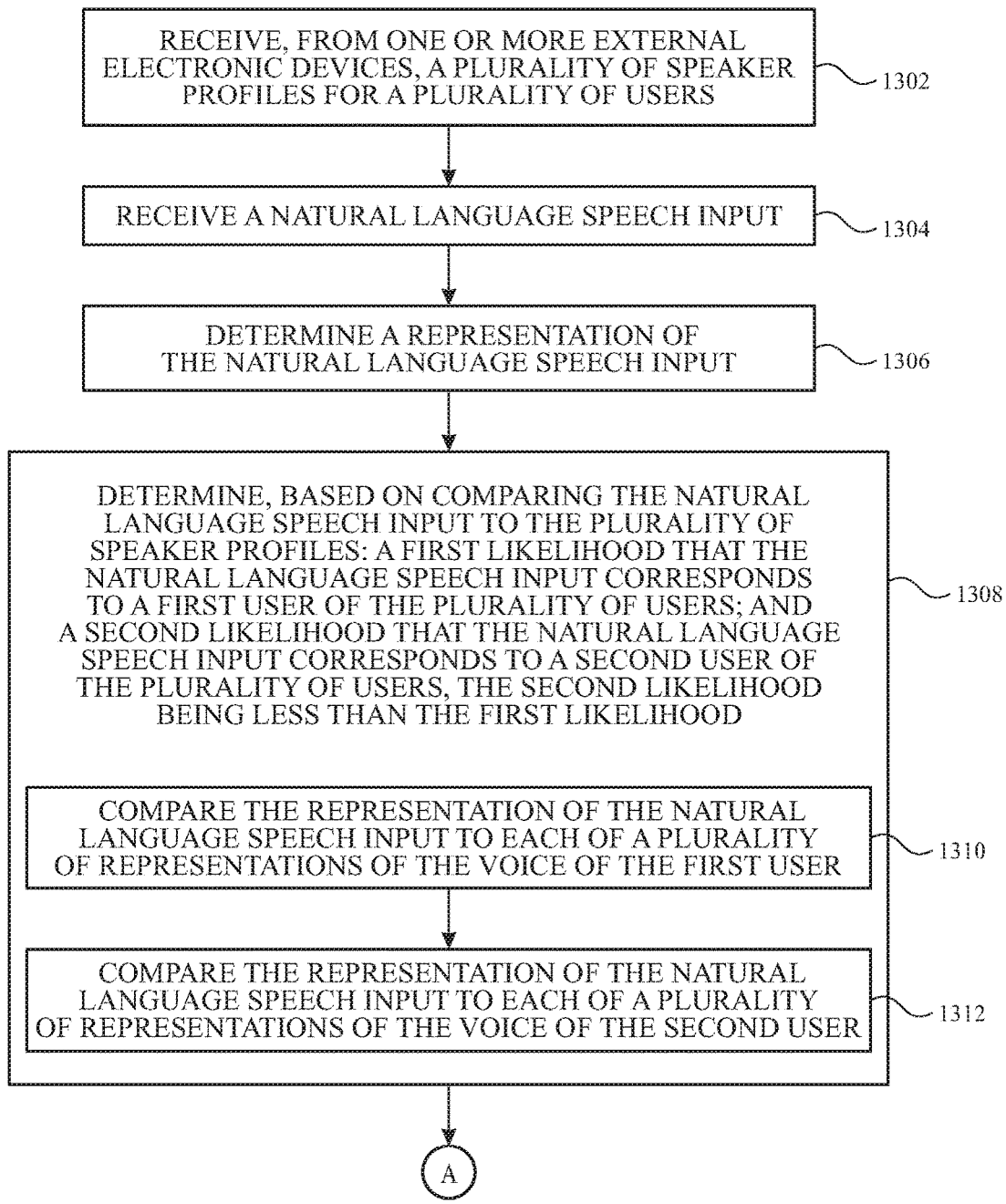
FIGS. 13A-G illustrate a process for responding to speech input, according to some examples.
Figure 13B:
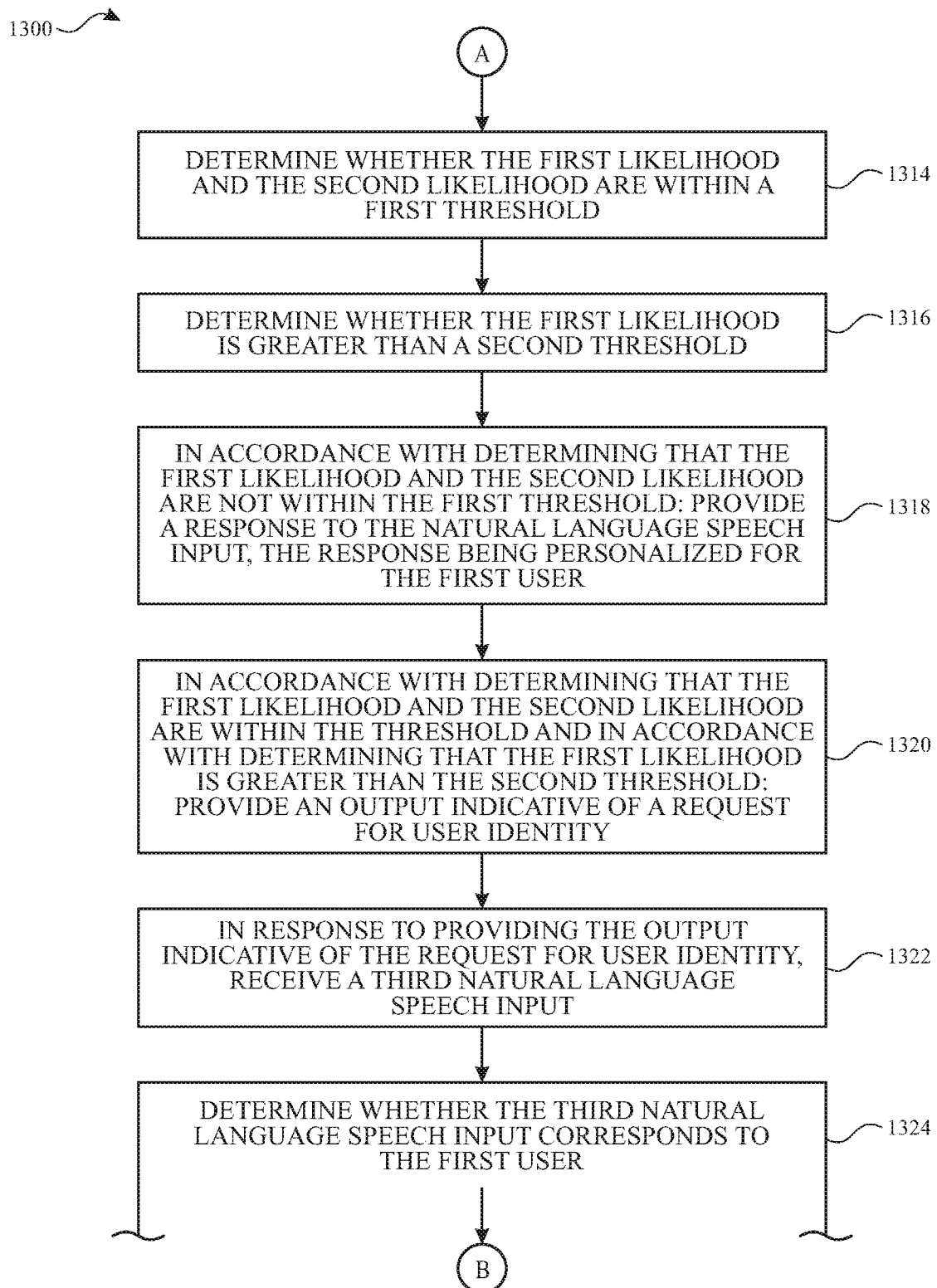
Figure 13C:
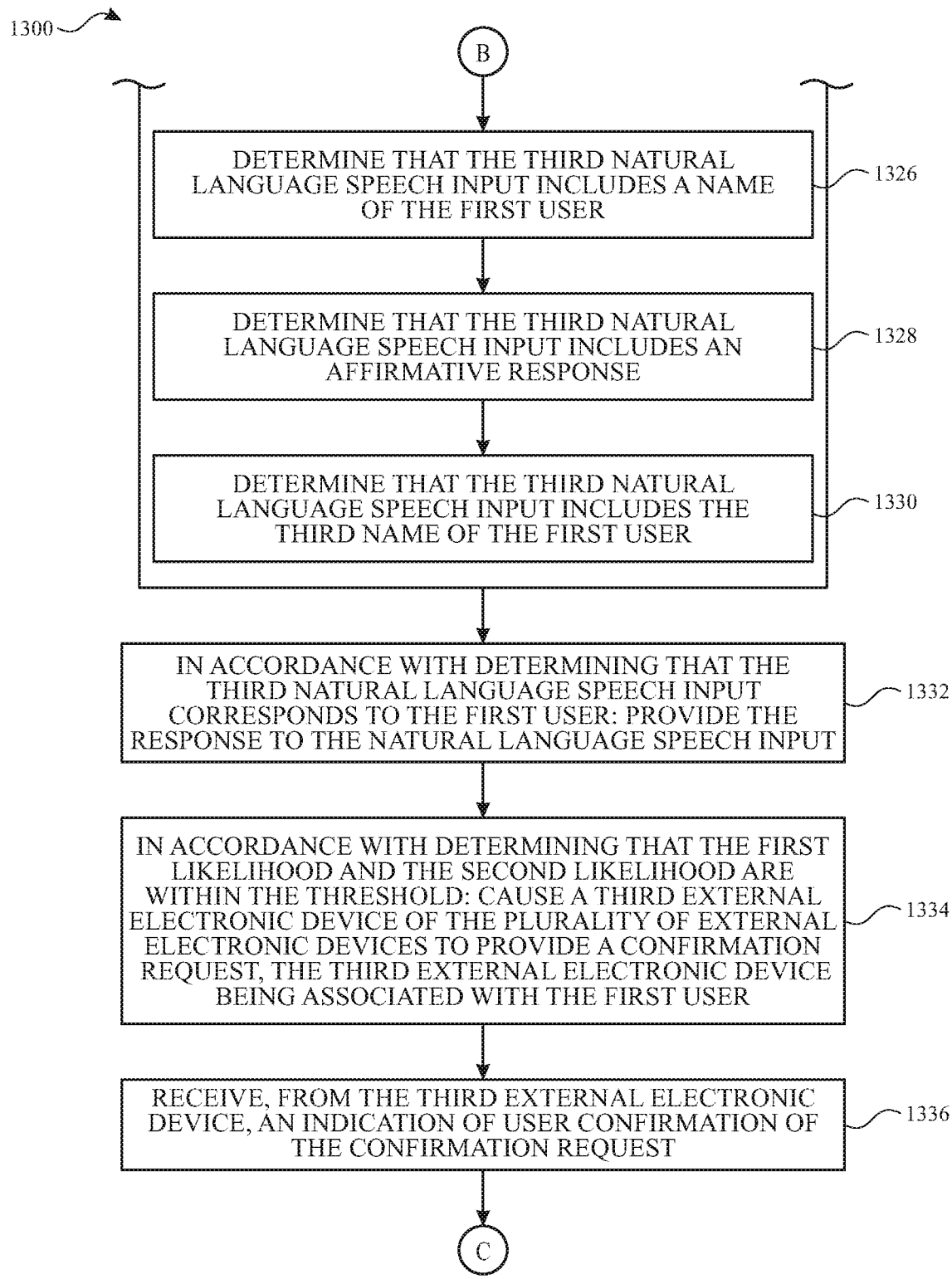
Figure 13D:
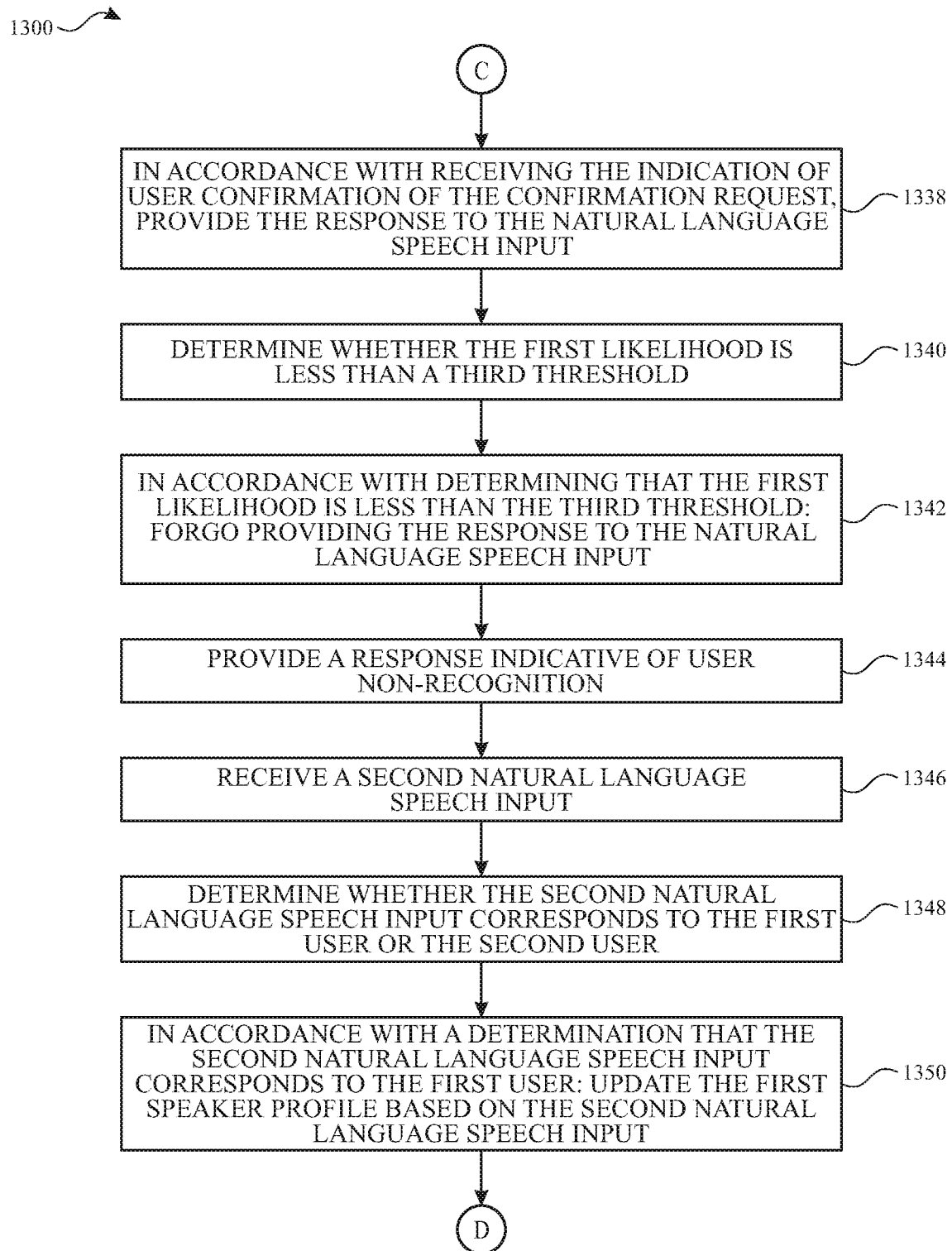
Figure 13E:
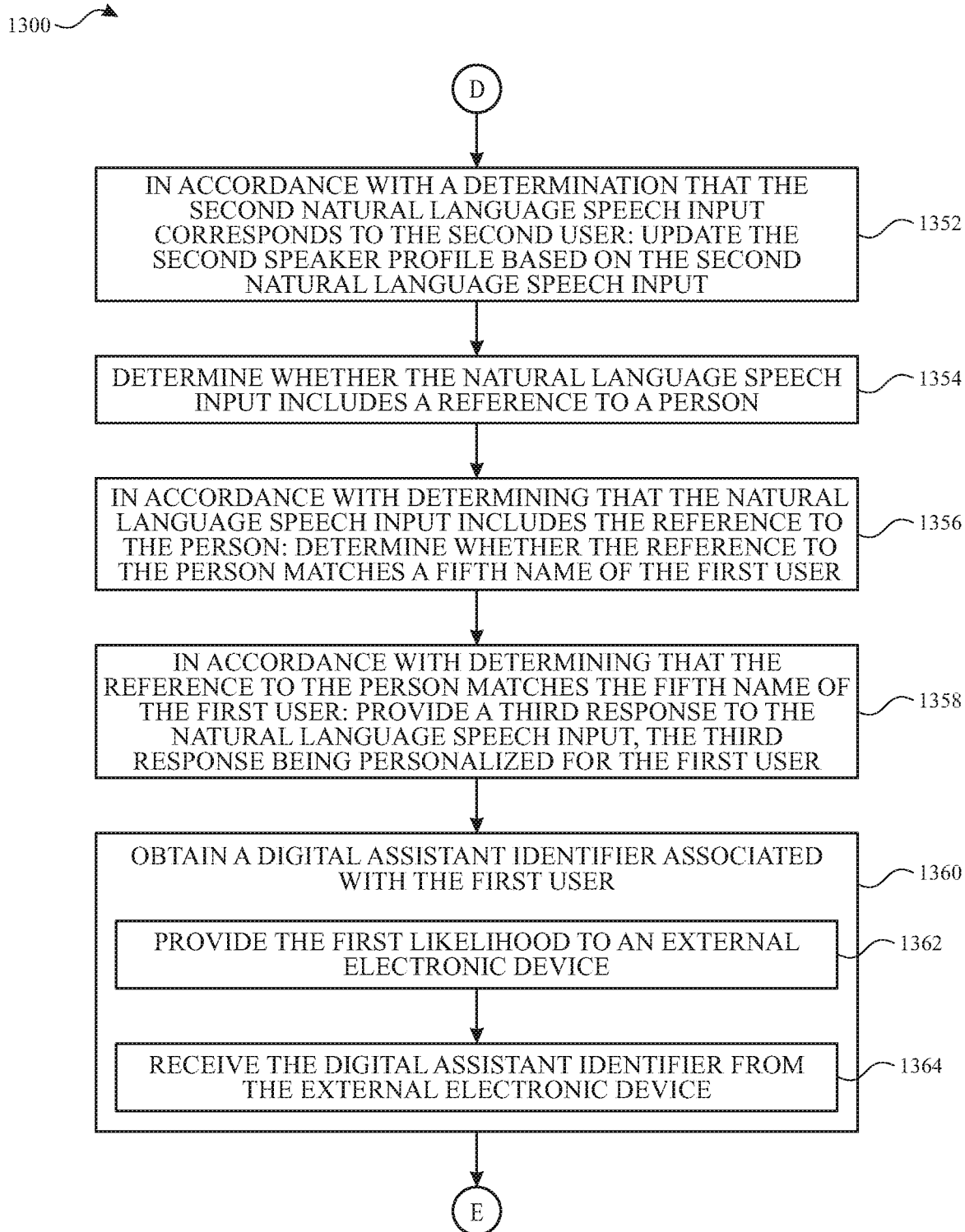
Figure 13F:
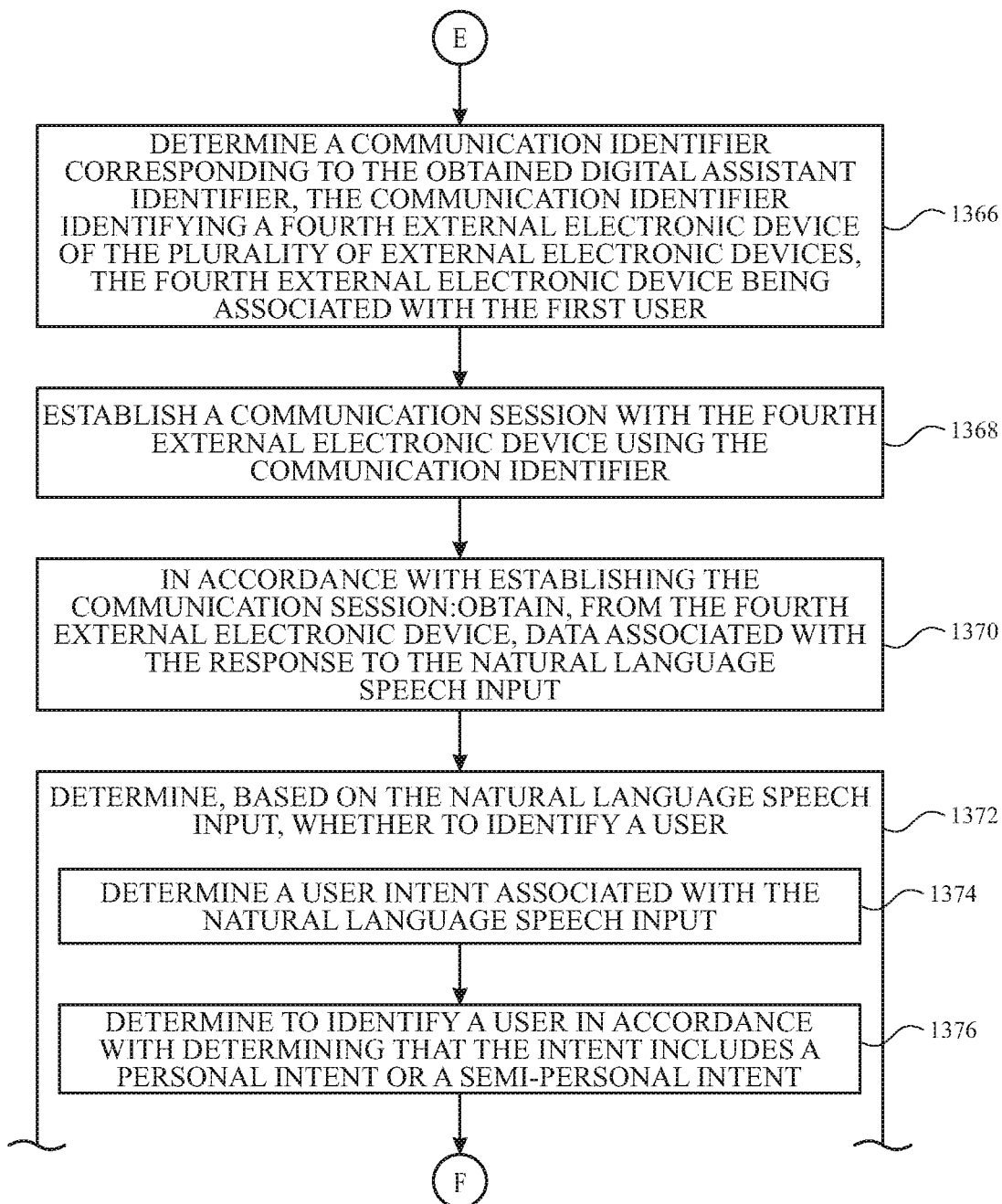
Figure 13G:
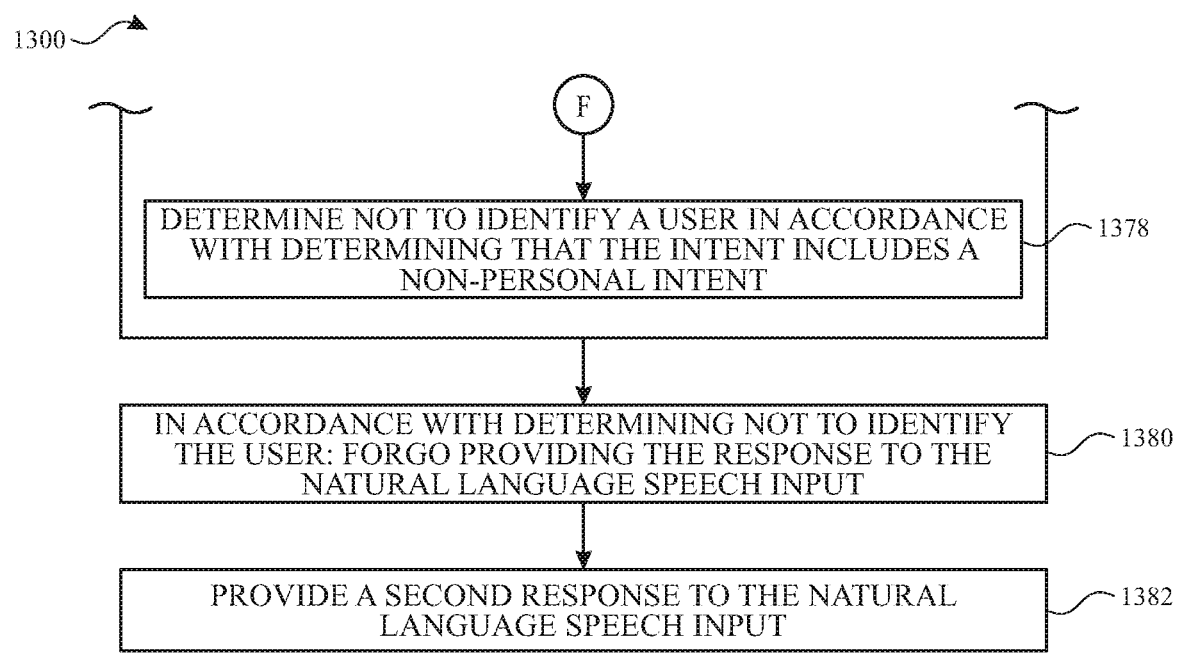
Figure 14A:
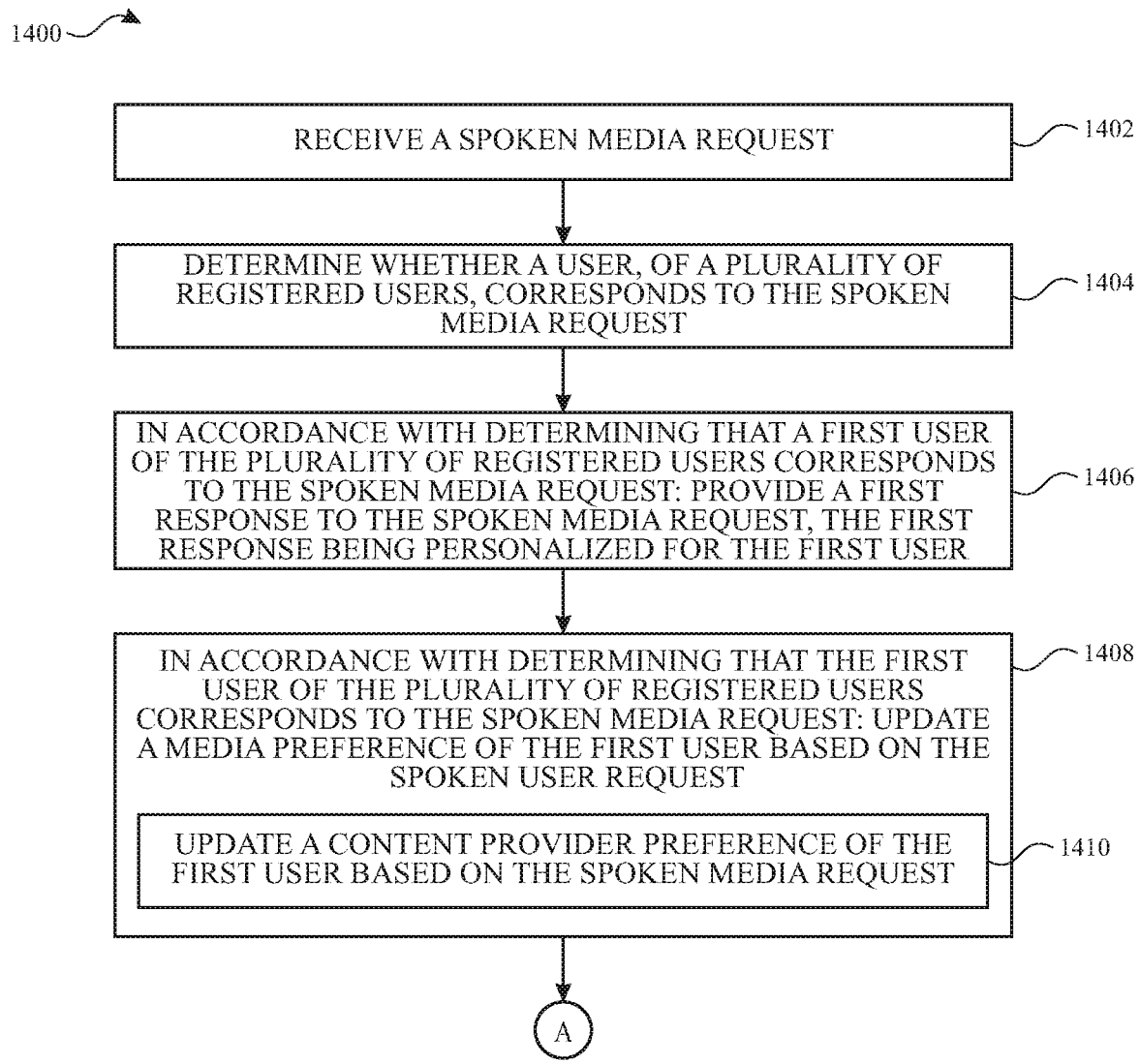
FIGS. 14A-E illustrate a process for providing media content, according to some examples.
Figure 14B:
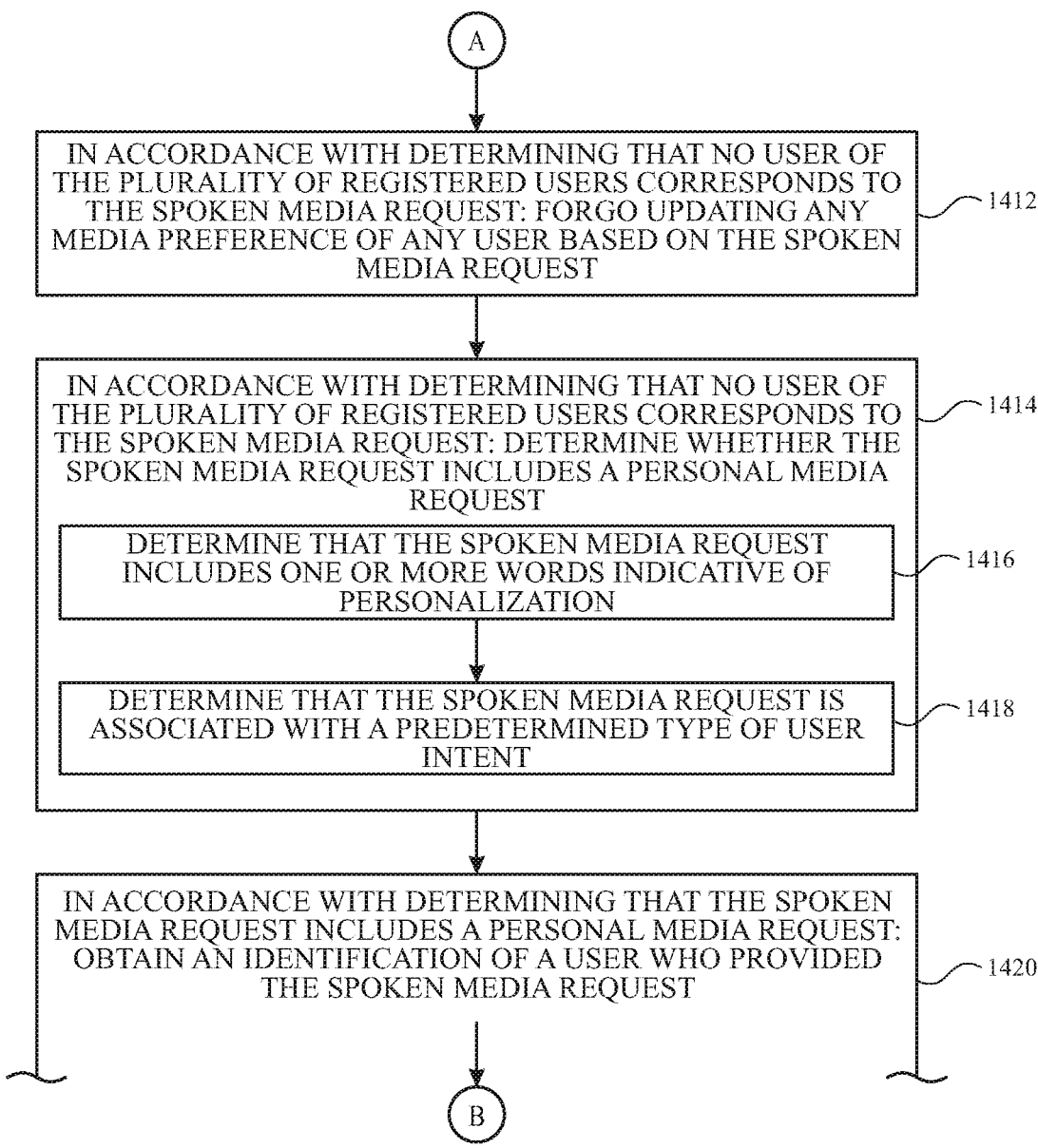
Figure 14C:
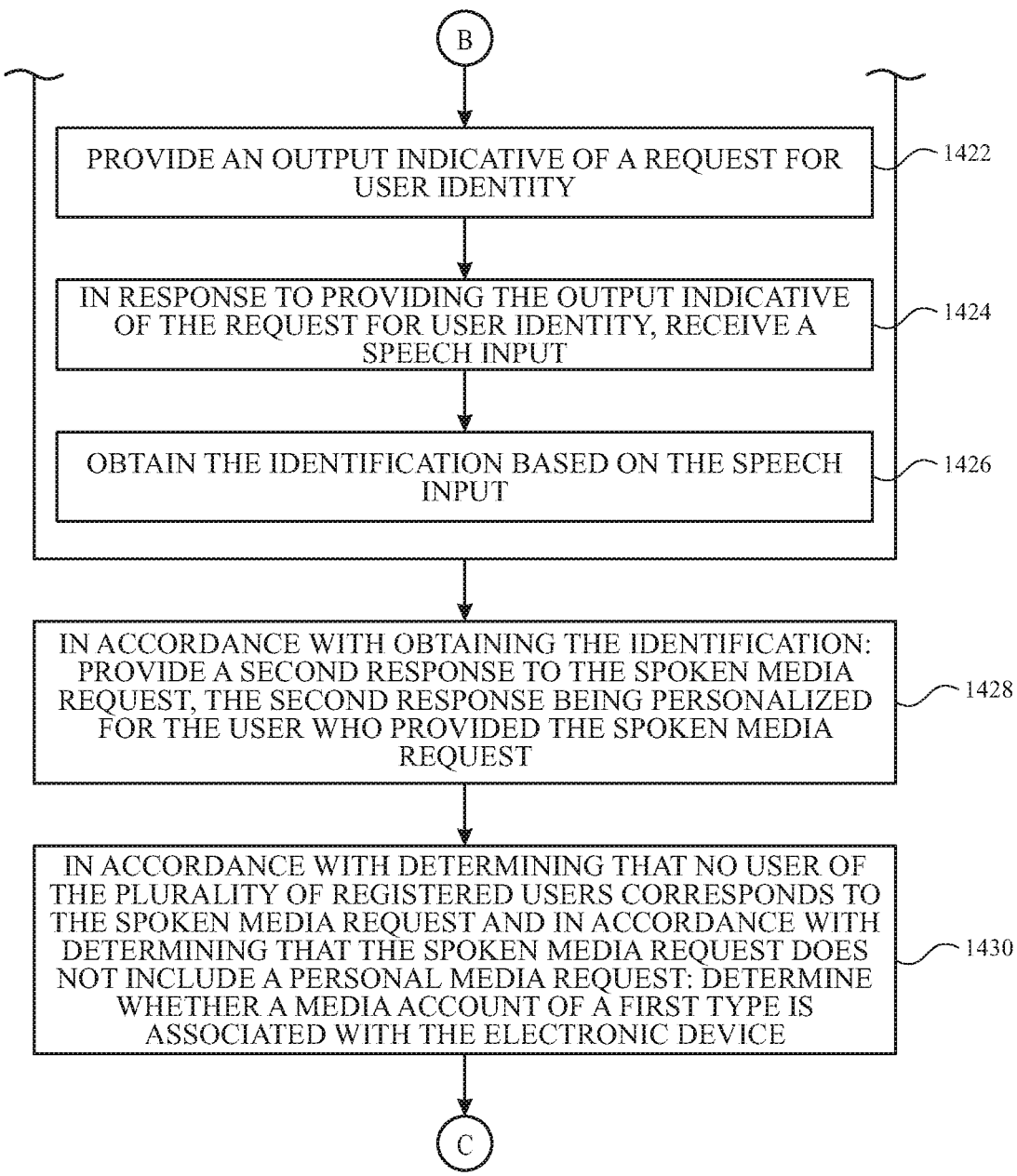
Figure 14D:
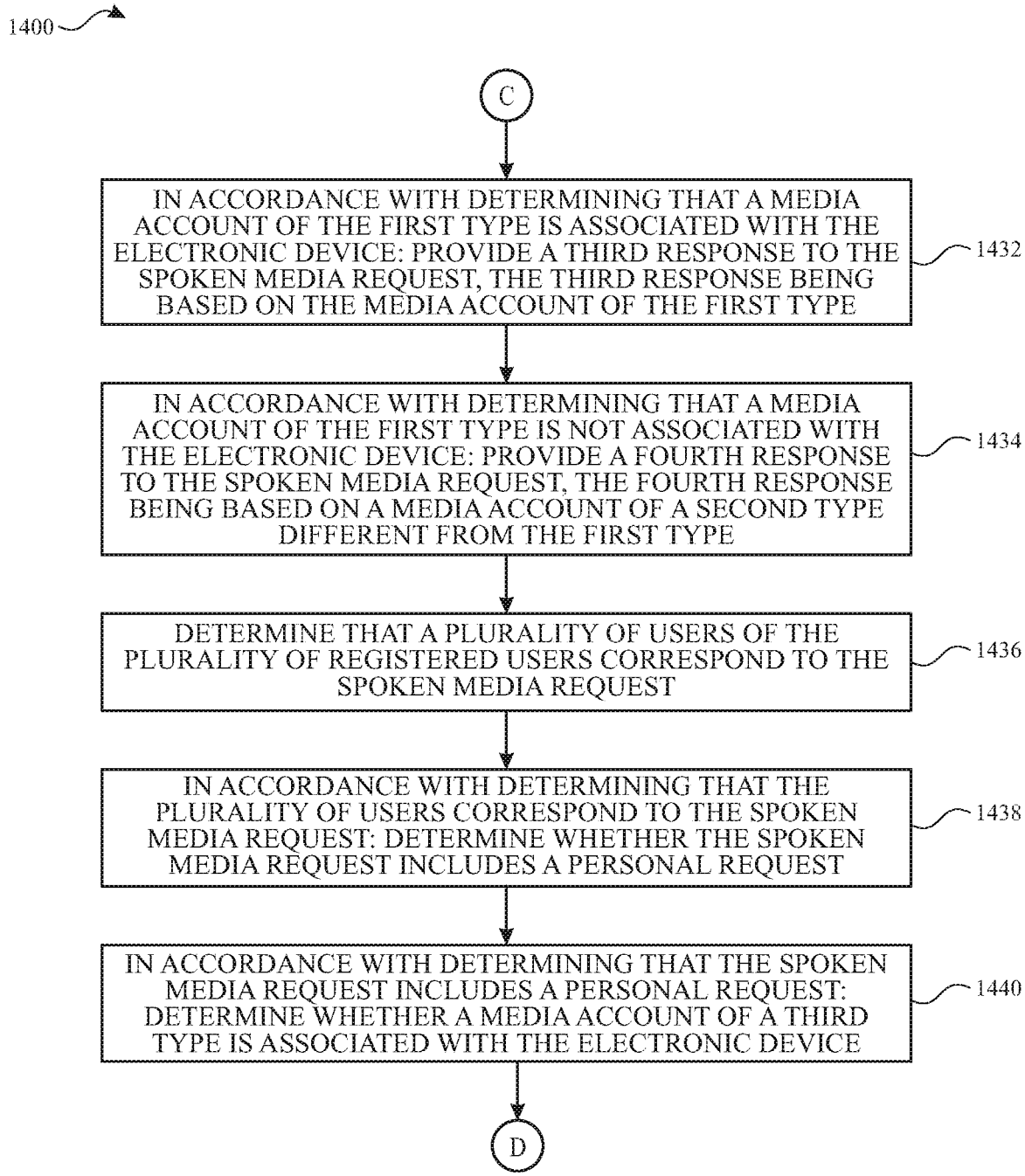
Figure 14E:
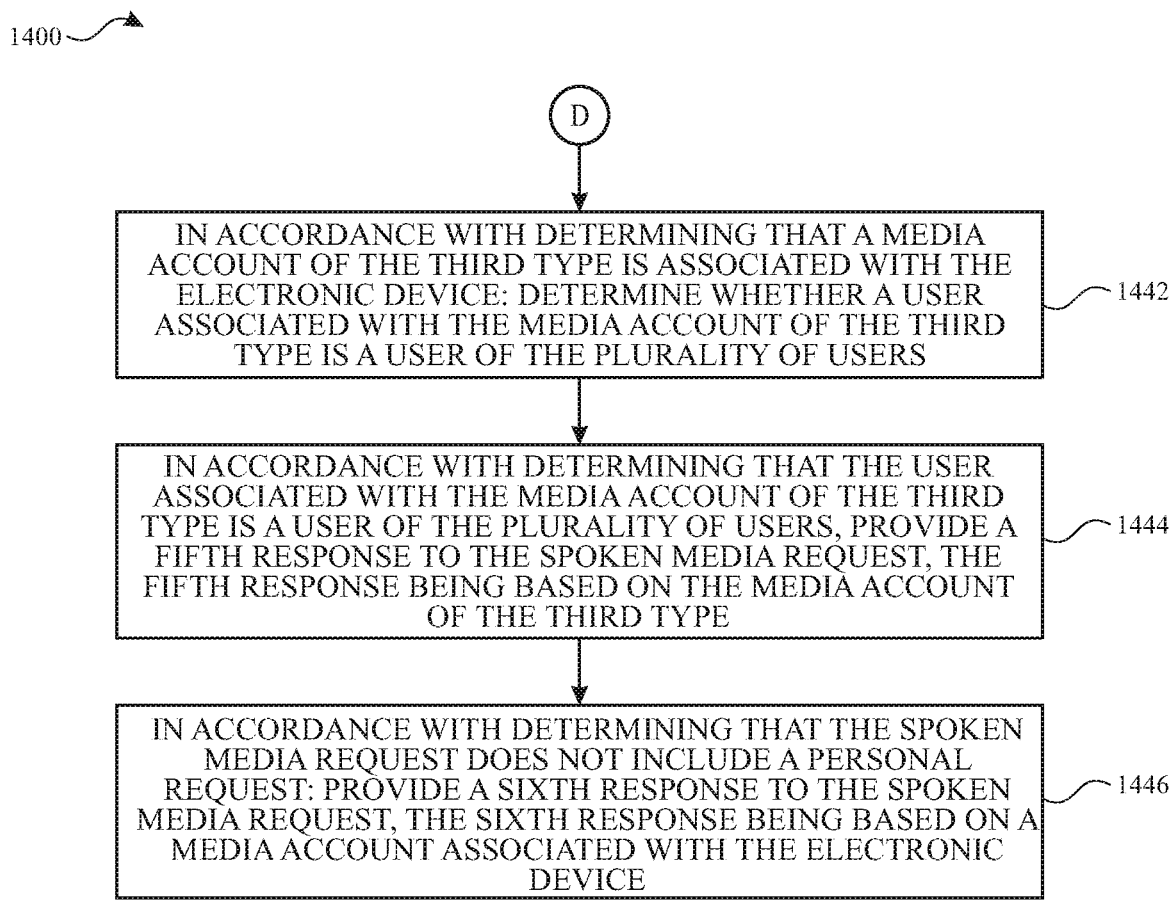

FIG. 12 illustrates exemplary system 1200 for obtaining personal information. System 1200 includes device 800, external device 900, and digital assistant server 1202. In some examples, system 1200 includes other external electronic devices (not shown) associated with other users, e.g., users other than the user associated with device 900. The other external electronic devices may be similar to device 900. For example, the other external electronic devices are implemented as device 400 or 600 and/or include the modules and functions of a digital assistant.

In some examples, digital assistant server 1202 is implemented using system 108 of FIG. 1 and devices 800 and 900 communicate with server 1202, e.g., as shown in FIG. 1. In some examples, device 800 obtains personal information from server 1202, device 900, other external electronic devices, or a combination or sub-combination thereof, according to the techniques discussed below.

Each external electronic device stores personal information associated with a respective user. Exemplary personal information includes a user's contacts information contact names, addresses, phone numbers), communication data and/or metadata (e.g., text messages, emails, call history, voicemails, instant messages, message senders, message times), speaker profile and corresponding digital assistant identifier (discussed below), calendar and/or reminder information (e.g., calendar items, reminder items), notes (e.g., user created text memos and/or voice memos), media data (e.g., music, videos, photos, audiobooks, media preferences (e.g., favorite songs, liked songs, disliked songs,) media account data), health data (e.g., distance traveled, vitals data, calories burned), financial data (e.g., credit card balance, bank account balance, recent purchases), application data (e.g., internet search history, installed applications, social media data (e.g., posts, friend lists)), location data (e.g., a location of the external device, a user's frequently visited locations), data associated with a user's residence (e.g., number of locks, whether lights are on or off, thermostat settings), and voice shortcut data.

In some examples, an external electronic device sends certain personal information to server 1202 and/or to device 800. In some examples, the external electronic device sends such information only upon user approval (e.g., through a user setting, through informed user consent). The personal information sent includes a speaker profile, information associated with contacts of a user (e.g., contact names), user calendar and/or reminder information reminder list names), or a combination or sub-combination thereof, for instance.

In some examples, a speaker profile for a user corresponds to (e.g., maps to) a digital assistant identifier. In some examples, the information sent to server 1202 further includes the digital assistant identifier. A digital assistant identifier is associated with a user and identifies an instance of a digital assistant associated with the user. For example, the digital assistant identifier "DA id #1" may identify an instance of a digital assistant associated with a first user (e.g., operating on the first user's device 900). In some examples, by identifying a user using his or her speaker profile, a digital assistant identifier associated with the user is determined (e.g., using the mapping between the speaker profile and the digital assistant identifier). Device 800 uses a digital assistant identifier to obtain personal information according to the techniques discussed below.

In some examples, device 800 obtains a digital assistant identifier associated with a user. In some examples, obtaining a digital assistant identifier includes receiving a speech input and identifying a user according to the techniques discussed herein. For example, device 800 determines likelihoods that received speech input corresponds to registered users and sends the likelihoods to server 1202. In some examples, device 800 sends the received speech input to server 1202. Based on the received likelihoods and/or speech input, server 1202 identifies a user according to the techniques discussed herein. In some examples, server 1202 determines a digital assistant identifier associated with the identified user (e.g., using a mapping between the identified user's speaker profile and the digital assistant identifier) and sends the digital assistant identifier to device 800. For example, as shown in step 1210, device 800 obtains from server 1202 the digital assistant identifier "DA id #1" associated with a first identified user.

In some examples, device 800 determines a digital assistant identifier (e.g., without using server 1202). For example, based on a received speech input, device 800 identifies a user using his or her speaker profile according to the techniques discussed herein. Device 800 then uses a mapping between the identified user's speaker profile and a digital assistant identifier to determine the digital assistant identifier associated with the identified user, for instance.

In some examples, device 800 determines or obtains a digital assistant identifier associated with a user other than the identified user. For example, if the speech input includes a reference to a person (e.g., "where is my mom's phone?"), device 800 determines or obtains a digital assistant identifier associated with that person. For example, using STT processing module 730 and/or natural language processing module 732, server 1202 determines the person's name (and thus their speaker profile) and determines the digital assistant identifier associated with the person (e.g., a user's mom) based on a mapping between speaker profiles and digital assistant identifiers. In some examples, server 1202 then sends the digital assistant identifier to device 800.

In some examples, device 800 determines a communication identifier corresponding to an obtained digital assistant identifier. A communication identifier identifies a particular electronic device operating an instance of a digital assistant. In some examples, device 800 stores a mapping of digital assistant identifiers to communication identifiers and uses such mapping to determine a communication identifier corresponding to an obtained digital assistant identifier. For example, device 800 obtains the digital assistant identifier "DA id #1" and determines the corresponding communication identifier "Com id #1" identifying device 900 (e.g., the first user's device). In this manner, device 800 can map an obtained digital assistant identifier associated with a user to a communication identifier identifying the user's device.

In some examples, using a communication identifier, device 800 establishes a communication session with a device identified by the communication identifier. For example, using the communication identifier "Com id #1," device 800 establishes a communication session with device 900, enabling exchange of data and/or commands between the devices. In some examples, the data and/or commands are exchanged via one or more of the communication protocols discussed above with respect to RF circuitry 208.

In some examples, in accordance with establishing a communication session, steps 1220 and 1230 are performed, as shown in FIG. 12. In some examples, performing steps 1220 and 1230 enables device 800 to obtain personal information to provide responses personalized for a user.

At step 1220, device 800 sends a command to an external device (e.g., 900). In some examples, the command requests the external device to perform an action associated with a task determined based on received speech input. For example, server 1202 and/or device 800 determines a task based on received speech input according to the techniques discussed herein. In examples where server 1202 determines the task, server 1202 sends the determined task (e.g., executable instructions to perform the task) to device 800. In some examples, device 800 determines a command based on a determined task and sends the command to the external device. For example, a task of obtaining Stephen's messages is determined from the speech input "Hey Siri, read my messages" and device 800 determines a command requesting device 900 (e.g., Stephen's device) to provide Stephen's messages. As another example, a task of obtaining the location of an external device associated with an identified user's mom is determined from the speech input "where is my mom's phone?" and device 800 determines a command requesting the external device to provide its location.

In some examples, in accordance with receiving a command, the external device performs an action requested by the command and provides results based on the action to device 800. For example, at step 1230, the external device provides personal information to device 800. Device 800 receives the personal information and uses the personal information to provide responses personalized for an identified user as discussed herein. For example, in accordance with receiving the command requesting provision of Stephen's messages, device 900 retrieves Stephen's messages and provides the messages to device 800. Using the received messages, device 800 provides the response "Ok Stephen reading your messages: first message: Corey says meeting at 2'o clock," e.g., as shown in FIG. 8.

In some examples, device 800 receives personal information from server 1202. As discussed, in some examples, server 1202 stores limited types and/or amounts of personal information associated with users (e.g., reminder list names), while much of users' personal information (e.g., message contents) may be stored on the respective devices of the users (e.g., 900). Thus, in examples where personal information stored on server 1202 can be used to provide a personalized response, server 1202 sends personal information to device 800 (e.g., in addition to or without external device(s) sending personal information). For example, based on received speech input, server 1202 identifies a user and determines a task. Based on the identified user and the determined task, server 1202 determines the user's personal information appropriate for the task and sends the personal information to device 800. For example, based on speech input "what's the name of my reminder list?" (e.g., received by device 800), server 1202 identifies a user and determines a task of providing a name of the user's reminder list. Server 1202 determines the name of the identified user's reminder list, and provides the name to device 800.

7. Process for Responding to Speech Inputs

FIGS. 13A-G illustrate process 1300 for responding to speech inputs, according to various examples. Process 1300 is performed, for example, using one or more electronic devices implementing a digital assistant. In some examples, process 1300 is performed using a client-server system (e.g., system 100), and the blocks of process 1300 are divided up in any manner between the server (e.g., DA server 106) and a client device. In other examples, the blocks of process 1300 are divided up between the server and multiple client devices (e.g., a mobile phone and a smart watch). Thus, while portions of process 1300 are described herein as being performed by particular devices of a client-server system, it will be appreciated that process 1300 is not so limited. In other examples, process 1300 is performed using only a client device (e.g., user device 104) or only multiple client devices. In process 1300, some blocks are, optionally, combined, the order of some blocks is, optionally, changed, and some blocks are, optionally, omitted. In some examples, additional steps may be performed in combination with the process 1300.

At block 1302, a plurality of speaker profiles for a plurality of users are received from one or more external electronic devices. In some examples, the plurality of speaker profiles include a first speaker profile for a first user, the first speaker profile including a plurality of representations of the voice of the first user and a second speaker profile for a second user, the second speaker profile including a plurality of representations of the voice of the second user. In some examples, at least one of the plurality of representations of the voice of the first user is determined based on a first utterance of the first user, where the first utterance is received by a first external electronic device of the one or more external electronic devices, and where the first external electronic device is associated with the first user. In some examples, at least one of the plurality of representations of the voice of the second user is determined based on a second utterance of the second user, where the second utterance is received by a second external electronic device of the one or more external electronic devices, and where the second external electronic device is associated with the second user.

At block 1304, a natural language speech input s received (e.g., block 903).

At block 1306, a representation of the natural language speech input is determined, e.g., using a speaker model, according to some examples.

At block 1308, a first likelihood that the natural language speech input corresponds to the first user of the plurality of users and a second likelihood that the natural language speech input corresponds to the second user of the plurality of users are determined based on comparing the natural language speech input to the plurality of speaker profiles (e.g., block 932). In some examples, the second likelihood is less than the first likelihood. In some examples, determining the first likelihood includes comparing the representation of the natural language speech input to each of the plurality of representations of the voice of the first user, as shown in block 1310. In some examples, determining the second likelihood includes comparing the representation of the natural language speech input to each of the plurality of representations of the voice of the second user, as shown in block 1312.

At block 1314, it is determined whether the first likelihood and the second likelihood are within a first threshold (e.g., difference threshold) (e.g., block 932).

At block 1316, it is determined whether the first likelihood is greater than a second threshold (e.g., an upper threshold) (e.g., block 938), in some examples.

At block 1318, in accordance with determining that the first likelihood and the second likelihood are not within the first threshold, a response to the natural language speech input is provided, the response being personalized for the first user (e.g., block 949). In some examples, providing the response is performed further in accordance with determining that the first likelihood is greater than the second threshold. In some examples, the natural language speech input includes a request to provide a message associated with the first user and providing the response to the natural language speech input includes providing the message. In some examples, the natural language speech input includes a request to provide media and providing the response to the natural language speech input includes providing media associated with the first user. In some examples, the natural language speech input includes a request to communicate with a contact associated with the first user (e.g., "Call mom") and providing the response to the natural language speech input includes providing an output indicative of a communication with the contact (e.g., "Calling mom"). In some examples, the response to the natural language speech input includes a fourth name of the first user.

At block 1320, in some examples, in accordance with determining that the first likelihood and the second likelihood are within the threshold: an output indicative of a request for user identity is provided (e.g., block 920, 930, 939, and/or 947).

At block 1322, in response to providing the output indicative of the request for user identity, a third natural language speech input is received (e.g., block 920, 939, and/or 947), in some examples.

At block 1324, it is determined whether the third natural language speech input corresponds to the first user, in some examples. In some examples, determining that the third natural language speech input corresponds to the first user includes determining that the third natural language speech input includes a name of the first user, as shown in block 1326 (e.g., block 920 and/or 921). In some examples, the output indicative of the request for user identity includes a request for the first user to confirm their identity, the request including a second name of the first user (e.g., block 939). In some examples, determining that the third natural language speech input corresponds to the first user includes determining that the third natural language speech input includes an affirmative response (e.g., block 939), as shown in block 1328. In some examples, the output indicative of the request for user identity includes a request for user disambiguation between the first user and the second user, the request including a third name of the first user and a name of the second user (e.g., block 947). In some examples, determining that the third natural language speech input corresponds to the first user includes determining that the third natural language speech input includes the third name of the first user (e.g., block 947), as shown in block 1330.

At block 1332, in accordance with determining that the third natural language speech input corresponds to the first user, the response to the natural language speech input is provided, in some examples.

At block 1334, in some examples, in accordance with determining that the first likelihood and the second likelihood are within the threshold, a third external electronic device of the plurality of external electronic devices is caused to provide a confirmation request, the third external electronic device being associated with the first user (e.g., block 930).

At block 1336, in some examples, an indication of user confirmation of the confirmation request is received from the third external electronic device (e.g., block 931).

At block 1338, in some examples, in accordance with receiving the indication of user confirmation of the confirmation request, the response to the natural language speech input is provided (e.g., block 950).

At block 1340, in some examples, it is determined whether the first ikelihood is less than a third threshold (e.g., a lower threshold) (e.g., block 932).

At block 1342, in some examples, in accordance with determining that the first likelihood is less than the third threshold, providing the response is forgone. In some examples, in accordance with determining that the first likelihood is less than the third threshold, a response indicative of user non-recognition is provided, as shown in block 1344 (e.g., block 951). In some examples, providing the response to the natural language speech input is performed further in accordance with a determination that the first likelihood is not less than the third threshold.

At block 1346, in some examples, a second natural language speech input is received.

At block 1348, in some examples, it is determined whether the second natural language speech input corresponds to the first user or the second user.

At block 1350, in some examples, in accordance with a determination that the second natural language speech input corresponds to the first user, the first speaker profile is updated based on the second natural language speech input. At block 1352, in some examples, in accordance with a determination that the second natural language speech input corresponds to the second user, the second speaker profile is updated based on the second natural language speech input.

At block 1354, in some examples, it is determined whether the natural language speech input includes a reference to a person (e.g., block 906).

At block 1356, in some examples, in accordance with determining that the natural language speech input includes the reference to the person: it is determined whether the reference to the person matches a fifth name of the first user (e.g., block 913).

At block 1358, in some examples, in accordance with determining that the reference to the person matches the fifth name of the first user, a third response to the natural language speech input is provided, the third response being personalized for the first user (e.g., block 952). In some examples, providing the response to the natural language speech input is performed in accordance with determining that the natural language speech input does not include the reference to the person.

At block 1360, a digital assistant identifier associated with the first user is obtained. In some examples, obtaining the digital assistant identifier includes providing the first likelihood to an external electronic device, as shown in block 1362. In some examples, obtaining the digital assistant identifier includes receiving the digital assistant identifier from the external electronic device, where the digital assistant identifier is determined by the external electronic device based on the first likelihood, as shown in block 1364.

At block 1366, in some examples, a communication identifier corresponding to the obtained digital assistant identifier is determined. The communication identifier identifies a fourth external electronic device of the plurality of external electronic devices, the fourth external electronic device being associated with the first user.

At block 1368, in some examples, a communication session with the fourth external electronic device is established using the communication identifier.

At block 1370, in some examples, in accordance with establishing the communication session, data associated with the response to the natural language speech input is obtained from the fourth external electronic device. In some examples, providing the response to the natural language speech input is performed in accordance with obtaining the data associated with the response to the natural language speech input.

At block 1372, in some examples, it is determined based on the natural language speech input, whether to identify a user (e.g., block 905). In some examples, determining the first likelihood and the second likelihood are performed in accordance with determining to identify the user.

In some examples, determining whether to identify a user includes determining a user intent associated with the natural language speech input, as shown in block 1374. In some examples, determining whether to identify a user includes determining to identify a user in accordance with determining that the intent includes a personal intent or a semi-personal intent, as shown in block 1376. In some examples, determining whether to identify a user includes determining not to identify a user in accordance with determining that the intent includes a non-personal intent, as shown in block 1378.

At block 1380, in some examples, in accordance with determining not to identify the user, providing the response to the natural language speech input is forgone.

At block 1382, in some examples, in accordance with determining not to identify the user, a second response to the natural language speech input is provided (e.g., block 953). In some examples, providing the response to the natural language speech input is performed in accordance with determining to identify the user.

The operations described above with reference to FIGS. 13A-G are optionally implemented by components depicted in FIGS. 1-4, 6A-B, 7A-C, 8, 10A-H, and 12. For example, the operations of process 1300 may be implemented by device 800, device 900, system 1200, or any combination or sub-combination thereof. It would be clear to a person having ordinary skill in the art how other processes are implemented based on the components depicted in FIGS. 1-4, 6A-B, 7A-C, 8, 10A-11, and 12.

8. Process for Providing Media Content

FIGS. 14A-E illustrate process 1400 for providing media content, according to various examples. Process 1400 is performed, for example, using one or more electronic devices implementing a digital assistant. In some examples, process 1400 is performed using a client-server system (e.g., system 100), and the blocks of process 1400 are divided up in any manner between the server (e.g., DA server 106) and a client device. In other examples, the blocks of process 1400 are divided up between the server and multiple client devices (e.g., a mobile phone and a smart watch). Thus, while portions of process 1400 are described herein as being performed by particular devices of a client-server system, it will be appreciated that process 1300 is not so limited. In other examples, process 1400 is performed using only a client device (e.g., user device 104) or only multiple client devices. In process 1400, some blocks are, optionally, combined, the order of some blocks is, optionally, changed, and some blocks are, optionally, omitted. In some examples, additional steps may be performed in combination with process 1400.

At block 1402, a spoken media request is received (e.g., block 1102).

At block 1404, it is determined whether a user, of a plurality of registered users, corresponds to the spoken media request (e.g., block 1106).

At block 1406, in accordance with determining that a first user of the plurality of registered users corresponds to the spoken media request, a first response to the spoken media request is provided, the first response being personalized for the first user (e.g., block 1108). In some examples, the spoken media request includes a name of a second user of the plurality of registered users. In some examples, the second user of the plurality of registered users is different from the first user of the plurality of registered users. In some examples, the first response to the spoken media request includes playback of media item associated with the second user. In some examples, the spoken media request includes a name of a media collection associated with a third user of the plurality of registered users. In some examples, the third user of the plurality of registered users is different from the first user of the plurality of registered users. In some examples, the first response to the spoken media request includes playback of a media item from the media collection associated with the third user.

In some examples, the first response to the spoken media request includes one or more words indicative of personalization for the first user. In some examples, the one or more words include a name of the first user. In some examples, the first response to the spoken media request includes playback of a media item from a first media account associated with the first user. In some examples, providing the first response to the spoken media request includes updating a second media account associated with the first user.

At block 1408, in some examples, in accordance with determining that the first user of the plurality of registered users corresponds to the spoken media request: a media preference of the first user is updated based on the spoken user request. In some examples, the spoken media request includes a request to switch a content provider. In some examples, the first response to the spoken media request indicates that the content provider has been switched. In some examples, updating the media preference of the first user includes updating a content provider preference of the first user based on the spoken media request, as shown in block 1410.

At block 1412, in some examples, in accordance with determining that no user of the plurality of registered users corresponds to the spoken media request, updating any media preference of any user based on the spoken media request is forgone.

At block 1414, in accordance with determining that no user of the plurality of registered users corresponds to the spoken media request: it is determined whether the spoken media request includes a personal media request (e.g., block 1110).

In some examples, determining whether the spoken media request includes a personal media request includes: determining that the spoken media request includes one or more words indicative of personalization, as shown in block 1416. In some examples, determining whether the spoken media request includes a personal media request includes: determining that the spoken media request is associated with a predetermined type of user intent, as shown in block 1418.

At block 1420, in accordance with determining that the spoken media request includes a personal media request: an identification of a user who provided the spoken media request is obtained (e.g., block 1112). In some examples, obtaining the identification of the user who provided the spoken media request includes: providing an output indicative of a request for user identity (block 1422), in response to providing the output indicative of the request for user identity, receiving a speech input (block 1424), and obtaining the identification based on the speech input (block 1426).

At block 1428, in accordance with obtaining the identification: second response to the spoken media request is provided, the second response being personalized for the user who provided the spoken media request (e.g., block 1108).

At block 1430, in some examples, in accordance with determining that no user of the plurality of registered users corresponds to the spoken media request and in accordance with determining that the spoken media request does not include a personal media request, it is determined whether a media account of a first type is associated with the electronic device (e.g., block 1116).

At block 1432, in some examples, in accordance with determining that a media account of the first type is associated with the electronic device: a third response to the spoken media request is provided, the third response being based on the media account of the first type (e.g., block 1118).

At block 1434, in some examples, in accordance with determining that a media account of the first type is not associated with the electronic device: a fourth response to the spoken media request is provided, the fourth response being based on a media account of a second type different from the first type (e.g., block 1120).

At block 1436, in some examples, it is determined that a plurality of users of the plurality of registered users correspond to the spoken media request (e.g., block 1106).

At block 1438, in some examples, in accordance with determining that the plurality of users correspond to the spoken media request: it is determined whether the spoken media request includes a personal request (e.g., block 1122).

At block 1440, in some examples, in accordance with determining that the spoken media request includes a personal request: it is determined whether a media account of a third type is associated with the electronic device (e.g., block 1124).

At block 1442, in some examples, in accordance with determining that a media account of the third type is associated with the electronic device, it is determined whether a user associated with the media account of the third type is a user of the plurality of users (e.g., block 1126).

At block 1444, in some examples, in accordance with determining that the user associated with the media account of the third type is a user of the plurality of users, a fifth response to the spoken media request is provided, the fifth response being based on the media account of the third type (e.g., block 1128).

At block 1446, in some examples, in accordance with determining that the spoken media request does not include a personal request: a sixth response to the spoken media request is provided, the sixth response being based on a media account associated with the electronic device (e.g., blocks 1118 or 1120).

The operations described above with reference to FIGS. 14A-E are optionally implemented by components depicted in FIGS. 1-4, 6A-B, 7A-C, 8, 10A-H, and 12. For example, the operations of process 1400 may be implemented by device 800, device 900, system 1200, or any combination or sub-combination thereof. It would be clear to a person having ordinary skill in the art how other processes are implemented based on the components depicted in FIGS. 1-4, 6A-B, 7A-C, 8, 10A-H, and 12.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to identify a user to provide personalized responses. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify a user and provide information relevant to the identified user. Accordingly, use of such personal information data enables devices to provide personalized responses. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of collecting speaker profiles for users, the present technology can be configured to allow users to select to "opt in" or "opt out" of participation in the collection of personal information data during registration for services or anytime thereafter. In another example, users can select not to provide speaker profiles (and/or other personal information). In yet another example, users can select to limit the length of time speaker profiles are maintained or entirely prohibit the development of a speaker profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, responses can be provided to user speech inputs based on non-personal information data or a bare minimum amount of personal information, such as the content being requested by the device associated with a user, other non-personal information available to the device, or publicly available information.

What is claimed is:

1. A non-transitory computer-readable storage medium storing one or more programs, the one or more programs comprising instructions, which when executed by one or more processors of an electronic device, cause the electronic device to:
    receive, from one or more external electronic devices, a plurality of speaker profiles for a plurality of users;
    receive a natural language speech input;
    determine, based on comparing the natural language speech input to the plurality of speaker profiles:
        a first likelihood that the natural language speech input corresponds to a first user of the plurality of users; and
        a second likelihood that the natural language speech input corresponds to a second user of the plurality of users, the first likelihood being greater than the second likelihood;
    determine whether the difference between the first likelihood and the second likelihood is less than a first threshold;
    in accordance with determining that the first likelihood is greater than the second likelihood and the difference between the first likelihood and the second likelihood is greater than or equal to the first threshold:
        provide a response to the natural language speech input, the response being personalized for the first user; and
    in accordance with determining that the difference between the first likelihood and the second likelihood is less than the first threshold and in accordance with a determination that an intent associated with the natural language speech input includes a personal intent:
        cause a first external electronic device of the one or more external electronic devices to provide a confirmation request, wherein the first external electronic device is associated with the first users;
        receive, from the first external electronic device, an indication of user confirmation of the confirmation request; and
        in accordance with receiving the indication of user confirmation of the confirmation request, provide the response to the natural language speech input.

2. The non-transitory computer-readable storage medium of claim 1, wherein the plurality of speaker profiles include:
    a first speaker profile for the first user, the first speaker profile including a plurality of representations of the voice of the first user; and
    a second speaker profile for the second user, the second speaker profile including a plurality of representations of the voice of the second user.

3. The non-transitory computer-readable storage medium of claim 2, wherein:
    at least one of the plurality of representations of the voice of the first user are determined based on a first utterance of the first user, wherein the first utterance is received by the first external electronic device of the one or more external electronic devices; and
    at least one of the plurality of representations of the voice of the second user are determined based on a second utterance of the second user, wherein the second utterance is received by a second external electronic device of the one or more external electronic devices, and wherein the second external electronic device is associated with the second user.

4. The non-transitory computer-readable storage medium of claim 2, wherein the one or more programs further comprise instructions, which when executed by the one or more processors, cause the electronic device to:

determine a representation of the natural language speech input; and wherein:
  determining the first likelihood includes comparing the representation of the natural language speech input to each of the plurality of representations of the voice of the first user; and
  determining the second likelihood includes comparing the representation of the natural language speech input to each of the plurality of representations of the voice of the second user.

5. The non-transitory computer-readable storage medium of claim 2, wherein the one or more programs further comprise instructions, which when executed by the one or more processors, cause the electronic device to:
  receive a second natural language speech input;
  determine whether the second natural language speech input corresponds to the first user or the second user; and
  in accordance with a determination that the second natural language speech input corresponds to the first user:
    update the first speaker profile based on the second natural language speech input; and
  in accordance with a determination that the second natural language speech input corresponds to the second user:
    update the second speaker profile based on the second natural language speech input.

6. The non-transitory computer-readable storage medium of claim 1, wherein the one or more programs further comprise instructions, which when executed by the one or more processors, cause the electronic device to:
  in accordance with determining that the difference between the first likelihood and the second likelihood is less than the threshold:
    provide an output indicative of a request for user identity;
    in response to providing the output indicative of the request for user identity, receive a third natural language speech input;
    determine whether the third natural language speech input corresponds to the first user; and
    in accordance with determining that the third natural language speech input corresponds to the first user:
      provide the response to the natural language speech input.

7. The non-transitory computer-readable storage medium of claim 6, wherein:
  determining that the third natural language speech input corresponds to the first user includes determining that the third natural language speech input includes a name of the first user.

8. The non-transitory computer-readable storage medium of claim 6, wherein:
  the output indicative of the request for user identity includes a request for the first user to confirm their identity, the request including a name of the first user; and
  determining that the third natural language speech input corresponds to the first user includes determining that the third natural language speech input includes an affirmative response.

9. The non-transitory computer-readable storage medium of claim 6, wherein:
  the output indicative of the request for user identity includes a request for user disambiguation between the first user and the second user, the request including a name of the first user and a name of the second user; and
  determining that the third natural language speech input corresponds to the first user includes determining that the third natural language speech input includes the name of the first user.

10. The non-transitory computer-readable storage medium of claim 1, wherein the one or more programs further comprise instructions, which when executed by the one or more processors, cause the electronic device to:
  determine whether the first likelihood is less than a third threshold; and
  in accordance with determining that the first likelihood is less than the third threshold:
    forgo providing the response to the natural language speech input; and
    provide a response indicative of user non-recognition; and
  wherein providing the response to the natural language speech input is performed further in accordance with a determination that the first likelihood is not less than the third threshold.

11. The non-transitory computer-readable storage medium of claim 1, wherein the response to the natural language speech input includes a name of the first user.

12. The non-transitory computer-readable storage medium of claim 1, wherein the one or more programs further comprise instructions, which when executed by the one or more processors, cause the electronic device to:
  determine, based on the natural language speech input, whether to identify a user; and
  wherein determining the first likelihood and the second likelihood are performed in accordance with determining to identify the user.

13. The non-transitory computer-readable storage medium of claim 12, wherein determining whether to identify a user includes:
  determining a user intent associated with the natural language speech input; and
  determining to identify a user in accordance with determining that the intent includes a personal intent or a semi-personal intent; and
  determining not to identify a user in accordance with determining that the intent includes a non-personal intent.

14. The non-transitory computer-readable storage medium of claim 12, wherein the one or more programs further comprise instructions, which when executed by the one or more processors, cause the electronic device to:
  in accordance with determining not to identify the user:
    forgo providing the response to the natural language speech input; and
    provide a second response to the natural language speech input,
  wherein providing the response to the natural language speech input is performed in accordance with determining to identify the user.

15. The non-transitory computer-readable storage medium of claim 1, wherein:
  the natural language speech input includes a request to provide a message associated with the first user; and
  providing the response to the natural language speech input includes providing the message.

16. The non-transitory computer-readable storage medium of claim 1, wherein:
  the natural language speech input includes a request to provide media; and providing the response to the natural language speech input includes providing media associated with the first user.

17. The non-transitory computer-readable storage medium of claim 1, wherein:
the natural language speech input includes a request to communicate with a contact associated with the first user; and
providing the response to the natural language speech input includes providing an output indicative of a communication with the contact.

18. The non-transitory computer-readable storage medium of claim 1, wherein the one or more programs further comprise instructions, which when executed by the one or more processors, cause the electronic device to;
determine whether the natural language speech input includes a reference to a person;
in accordance with determining that the natural language speech input includes the reference to the person:
determine whether the reference to the person matches a name of the first user;
in accordance with determining that the reference to the person matches the name of the first user:
provide a third response to the natural language speech input, the third response being personalized for the first user; and
wherein providing the response to the natural language speech input is performed in accordance with determining that the natural language speech input does not include the reference to the person.

19. The non-transitory computer-readable storage medium of claim 1, wherein the one or more programs further comprise instructions, which when executed by the one or more processors, cause the electronic device to:
obtain a digital assistant identifier associated with the first user;
determine a communication identifier corresponding to the obtained digital assistant identifier, the communication identifier identifying a third external electronic device of the plurality of external electronic devices, the third external electronic device being associated with the first user;
establish a communication session with the third external electronic device using the communication identifier; and
in accordance with establishing the communication session:
obtain, from the third external electronic device, data associated with the response to the natural language speech input; and
wherein providing the response to the natural language speech input is performed in accordance with receiving the data associated with the response to the natural language speech input.

20. The non-transitory computer-readable storage medium of claim 19, wherein obtaining the digital assistant identifier includes:
providing the first likelihood to a fifth external electronic device; and
receiving the digital assistant identifier from the fifth external electronic device, wherein the digital assistant identifier is determined by the external electronic device based on the first likelihood.

21. An electronic device, comprising:
one or more processors;
a memory; and
one or more programs, wherein the one or more programs are stored in the memory and configured to be executed by the one or more processors, the one or more programs including instructions for:
receiving, from one or more external electronic devices, a plurality of speaker profiles for a plurality of users;
receiving a natural language speech input;
determining, based on comparing the natural language speech input to the plurality of speaker profiles:
a first likelihood that the natural language speech input corresponds to a first user of the plurality of users; and
a second likelihood that the natural language speech input corresponds to a second user of the plurality of users, the first likelihood being greater than the second likelihood;
determining whether the difference between the first likelihood and the second likelihood is less than a first threshold;
in accordance with determining that the first likelihood is greater than the second likelihood and that the difference between the first likelihood and the second likelihood is greater than or equal to the first threshold:
providing a response to the natural language speech input, the response being personalized for the first user; and
in accordance with determining that the difference between the first likelihood and the second likelihood is less than the first threshold and in accordance with a determination that an intent associated with the natural language speech input includes a personal intent:
causing a first external electronic device of the one or more external electronic devices to provide a confirmation request, wherein the first external electronic device is associated with the first user;
receiving, from the first external electronic device, an indication of user confirmation of the confirmation request; and
in accordance with receiving the indication of user confirmation of the confirmation request, providing the response to the natural language speech input.

22. A method for responding to speech input, the method comprising:
at an electronic device with one or more processors and memory:
receiving, from one or more external electronic devices, a plurality of speaker profiles for a plurality of users;
receiving a natural language speech input;
determining, based on comparing the natural language speech input to the plurality of speaker profiles:
a first likelihood that the natural language speech input corresponds to a first user of the plurality of users; and
a second likelihood that the natural language speech input corresponds to a second user of the plurality of users, the first likelihood being greater than the second likelihood;

determining whether the difference between the first likelihood and the second likelihood is less than a first threshold;

in accordance with determining that the first likelihood is greater than the second likelihood and that the difference between the first likelihood and the second likelihood is greater than or equal to the first threshold:

providing a response to the natural language speech input, the response being personalized for the first user; and in accordance with determining that the difference between the first likelihood and the second likelihood is less than the first threshold and in accordance with a determination that an intent associated with the natural language speech input includes a personal intent:

causing a first external electronic device of the one or more external electronic devices to provide a confirmation request, wherein the first external electronic device is associated with the first user;

receiving, from the first external electronic device, an indication of user confirmation of the confirmation request; and in accordance with receiving the indication of user confirmation of the confirmation request, providing the response to the natural language speech input.

23. The electronic device of claim 21, wherein the plurality of speaker profiles include:

a first speaker profile for the first user, the first speaker profile including a plurality of representations of the voice of the first user; and a second speaker profile for the second user, the second speaker profile including a plurality of representations of the voice of the second user.

24. The electronic device of claim 23, wherein the one or more programs further include instructions for:

receiving a second natural language speech input;

determining whether the second natural language speech input corresponds to the first user or the second user; and in accordance with a determination that the second natural language speech input corresponds to the first user:

updating the first speaker profile based on the second natural language speech input; and in accordance with a determination that the second natural language speech input corresponds to the second user:

updating the second speaker profile based on the second natural language speech input.

25. The electronic device of claim 21, wherein the one or more programs further include instructions for:

in accordance with determining that the difference between the first likelihood and the second likelihood is less than the threshold:

providing an output indicative of a request for user identity;

in response to providing the output indicative of the request for user identity, receiving a third natural language speech input;

determining whether the third natural language speech input corresponds to the first user; and in accordance with determining that the third natural language speech input corresponds to the first user:

providing the response to the natural language speech input.

26. The electronic device of claim 25, wherein:

determining that the third natural language speech input corresponds to the first user includes determining that the third natural language speech input includes a name of the first user.

27. The electronic device of claim 25, wherein:

the output indicative of the request for user identity includes a request for the first user to confirm their identity, the request including a name of the first user; and determining that the third natural language speech input corresponds to the first user includes determining that the third natural language speech input includes an affirmative response.

28. The electronic device of claim 25, wherein:

the output indicative of the request for user identity includes a request for user disambiguation between the first user and the second user, the request including a name of the first user and a name of the second user; and determining that the third natural language speech input corresponds to the first user includes determining that the third natural language speech input includes the name of the first user.

29. The electronic device of claim 21, wherein the one or more programs further include instructions for:

determining whether the first likelihood is less than a third threshold; and in accordance with determining that the first likelihood is less than the third threshold:

forgoing providing the response to the natural language speech input; and providing a response indicative of user non-recognition; and wherein providing the response to the natural language speech input is performed further in accordance with a determination that the first likelihood is not less than the third threshold.

30. The electronic device of claim 21, wherein the one or more programs further include instructions for:

determining, based on the natural language speech input, whether to identify a user; and wherein determining the first likelihood and the second likelihood are performed in accordance with determining to identify the user.

31. The electronic device of claim 30, wherein determining whether to identify a user includes:

determining a user intent associated with the natural language speech input; and determining to identify a user in accordance with determining that the intent includes a personal intent or a semi-personal intent; and determining not to identify a user in accordance with determining that theintent includes a non-personal intent.

32. The electronic device of claim 21, wherein:

the natural language speech input includes a request to provide a message associated with the first user; and providing the response to the natural language speech input includes providing the message.

33. The electronic device of claim 21, wherein:

the natural language speech input includes a request to provide media; and providing the response to the natural language speech input includes providing media associated with the first user.

34. The electronic device of claim 21, wherein:
the natural language speech input includes a request to communicate with a contact associated with the first user; and
providing the response to the natural language speech input includes providing an output indicative of a communication with the contact.

35. The electronic device of claim 21, wherein the one or more programs further include instructions for:
determining whether the natural language speech input includes a reference to a person;
in accordance with determining that the natural language speech input includes the reference to the person:
determining whether the reference to the person matches a name of the first user;
in accordance with determining that the reference to the person matches the name of the first user:
providing a third response to the natural language speech input, the third response being personalized for the first user; and
wherein providing the response to the natural language speech input is performed in accordance with determining that the natural language speech input does not include the reference to the person.

36. The electronic device of claim 21, wherein the one or more programs further include instructions for:
obtaining a digital assistant identifier associated with the first user;
determining a communication identifier corresponding to the obtained digital assistant identifier, the communication identifier identifying a third external electronic device of the plurality of external electronic devices, the third external electronic device being associated with the first user;
establishing a communication session with the third external electronic device using the communication identifier; and
in accordance with establishing the communication session:
obtaining, from the third external electronic device, data associated with the response to the natural language speech input; and
wherein providing the response to the natural language speech input is performed in accordance with receiving the data associated with the response to the natural language speech input.

37. The method of claim 22, wherein the plurality of speaker profiles include:
a first speaker profile for the first user, the first speaker profile including a plurality of representations of the voice of the first user; and
a second speaker profile for the second user, the second speaker profile including a plurality of representations of the voice of the second user.

38. The method of claim 37, further comprising:
receiving a second natural language speech input;
determining whether the second natural language speech input corresponds to the first user or the second user; and
in accordance with a determination that the second natural language speech input corresponds to the first user:
updating the first speaker profile based on the second natural language speech input; and
in accordance with a determination that the second natural language speech input corresponds to the second user:
updating the second speaker profile based on the second natural language speech input.

39. The method of claim 22, further comprising:
in accordance with determining that the difference between the first likelihood and the second likelihood is less than the threshold:
providing an output indicative of a request for user identity;
in response to providing the output indicative of the request for user identity, receiving a third natural language speech input;
determining whether the third natural language speech input corresponds to the first user; and
in accordance with determining that the third natural language speech input corresponds to the first user:
providing the response to the natural language speech input.

40. The method of claim 39, wherein:
determining that the third natural language speech input corresponds to the first user includes determining that the third natural language speech input includes a name of the first user.

41. The method of claim 39, wherein:
the output indicative of the request for user identity includes a request for the first user to confirm their identity, the request including a name of the first user; and
determining that the third natural language speech input corresponds to the first user includes determining that the third natural language speech input includes an affirmative response.

42. The method of claim 39, wherein:
the output indicative of the request for user identity includes a request for user disambiguation between the first user and the second user, the request including a name of the first user and a name of the second user; and
determining that the third natural language speech input corresponds to the first user includes determining that the third natural language speech input includes the name of the first user.

43. The method of claim 22, further comprising:
determining whether the first likelihood is less than a third threshold; and
in accordance with determining that the first likelihood is less than the third threshold:
forgoing providing the response to the natural language speech input; and
providing a response indicative of user non-recognition; and
wherein providing the response to the natural language speech input is performed further in accordance with a determination that the first likelihood is not less than the third threshold.

44. The method of claim 22, further comprising:
determining, based on the natural language speech input, whether to identify a user; and
wherein determining the first likelihood and the second likelihood are performed in accordance with determining to identify the user.

45. The method of claim 44, wherein determining whether to identify a user includes:
determining a user intent associated with the natural language speech input; and
determining to identify a user in accordance with determining that the intent includes a personal intent or a semi-personal intent; and determining not to identify a user in accordance with determining that the intent includes a non-personal intent.

46. The method of claim 22, wherein:

the natural language speech input includes a request to provide a message associated with the first user; and providing the response to the natural language speech input includes providing the message.

47. The method of claim 22, wherein:

the natural language speech input includes a request to provide media; and providing the response to the natural language speech input includes providing media associated with the first user.

48. The method of claim 25, wherein:

the natural language speech input includes a request to communicate with a contact associated with the first user; and providing the response to the natural language speech input includes providing an output indicative of a communication with the contact.

49. The method of claim 25, further comprising:

determining whether the natural language speech input includes a reference to a person;

in accordance with determining that the natural language speech input includes the reference to the person:
  determining whether the reference to the person matches a name of the first user;
  in accordance with determining that the reference to the person matches the name of the first user:
    providing a third response to the natural language speech input, the third response being personalized for the first user; and wherein providing the response to the natural language speech input is performed in accordance with determining that the natural language speech input does not include the reference to the person.

50. The method of claim 22, further comprising:

obtaining a digital assistant identifier associated with the first user;

determining a communication identifier corresponding to the obtained digital assistant identifier, the communication identifier identifying a third external electronic device of the plurality of external electronic devices, the third external electronic device being associated with the first user;

establishing a communication session with the third external electronic device using the communication identifier; and in accordance with establishing the communication session:
  obtaining, from the third external electronic device, data associated with the response to the natural language speech input; and wherein providing the response to the natural language speech input is performed in accordance with receiving the data associated with the response to the natural language speech input.

\* \* \* \* \*

UNITED STATES PATENT AND TRADEMARK OFFICE
CERTIFICATE OF CORRECTION

PATENT NO. : 11,423,898 B2
APPLICATION NO. : 16/815984
DATED : August 23, 2022
INVENTOR(S) : Stephen H. Shum et al.

Page 1 of 1

It is certified that error appears in the above-identified patent and that said Letters Patent is hereby corrected as shown below:

In the Claims

In Column 82, Line 35, Claim 1, delete "users;" and insert -- user; --.

In Column 85, Line 16, Claim 18, delete "to;" and insert -- to: --.

In Column 88, Line 55, Claim 31, delete "theintent" and insert -- the intent --.

Signed and Sealed this
Eighteenth Day of April, 2023

Katherine Kelly Vidal
*Director of the United States Patent and Trademark Office*